United States Patent
Toda et al.

(10) Patent No.: US 6,961,175 B2
(45) Date of Patent: Nov. 1, 2005

(54) SCREEN, ITS MANUFACTURING METHOD AND IMAGE DISPLAY SYSTEM

(75) Inventors: Atsushi Toda, Kanagawa (JP); Yoshihiko Kuroki, Kanagawa (JP); Michihiro Ohnishi, Kanagawa (JP); Hirotaka Akao, Tokyo (JP); Ko Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 10/181,240

(22) PCT Filed: Mar. 26, 2002

(86) PCT No.: PCT/JP02/02897
§ 371 (c)(1),
(2), (4) Date: Feb. 5, 2003

(87) PCT Pub. No.: WO03/050612
PCT Pub. Date: Jun. 19, 2003

(65) Prior Publication Data
US 2004/0070824 A1 Apr. 15, 2004

(30) Foreign Application Priority Data
Dec. 13, 2001 (JP) ........................ 2001-380670

(51) Int. Cl.⁷ .......................... G03B 21/56; G03B 21/60
(52) U.S. Cl. ...................................... 359/452; 359/449
(58) Field of Search .............................. 359/443, 449, 359/459, 460, 452, 453

(56) References Cited

U.S. PATENT DOCUMENTS

| | | | |
|---|---|---|---|
| 413,572 A | 10/1889 | Steedman et al. | |
| 1,998,054 A | * 4/1935 | McBurney | 359/452 |
| 2,234,950 A | 3/1941 | Barclay | 428/52 |
| 2,341,982 A | 2/1944 | Dillehay et al. | 442/297 |
| 3,726,583 A | 4/1973 | Fujisaki et al. | 359/452 |
| 3,751,135 A | * 8/1973 | Clausen et al. | 359/453 |
| 3,759,604 A | 9/1973 | Thelen | 359/588 |
| 3,836,230 A | 9/1974 | Adams et al. | 349/176 |
| 4,354,738 A | 10/1982 | Forehand et al. | 350/117 |
| 4,725,448 A | * 2/1988 | Fitzpatrick | 359/453 |
| 5,193,015 A | 3/1993 | Shanks | 359/443 |
| 5,307,205 A | 4/1994 | Ludwig, Jr. et al. | 359/453 |
| 5,361,163 A | 11/1994 | Matsuda et al. | 359/452 |
| 5,473,469 A | 12/1995 | Magocs et al. | 359/449 |
| 5,668,662 A | 9/1997 | Magocs et al. | 359/452 |
| 5,715,083 A | 2/1998 | Takayama | 359/443 |

(Continued)

FOREIGN PATENT DOCUMENTS

| | | |
|---|---|---|
| EP | 0 154 053 | 2/1990 |
| EP | 0 421 809 | 4/1991 |
| JP | 33-14668 | 9/1933 |
| JP | 53-58235 | 5/1978 |
| JP | 56-17339 | 2/1981 |

(Continued)

OTHER PUBLICATIONS

Patent Abstracts of Japan, Publication No. 02–310554, Date of Publication of Application Dec. 26, 1990.

*Primary Examiner*—Christopher Mahoney
(74) *Attorney, Agent, or Firm*—Frommer Lawrence & Haug LLP; William S. Frommer; Thomas F. Presson

(57) ABSTRACT

A projection screen comprises a red-reflecting particle layer, green-reflecting particle layer and blue-reflecting particle layer sequentially stacked on a substrate. In each particle layer, particles are accumulated by eleven cycles in a regularly alignment such as close-packed structure. Diameter of red-reflecting particles is approximately 280 nm, diameter of green-reflecting particles is approximately 235 nm, and diameter of blue-reflecting particles is approximately 212 nm. Each particles layer is accumulated by self-organized technique. The substrate used here can absorb light of wavelengths other than those of red, green and blue three primary colors.

59 Claims, 103 Drawing Sheets

U.S. PATENT DOCUMENTS

| | | | |
|---|---|---|---|
| 5,831,774 A | | 11/1998 | Toshima et al. ............ 359/703 |
| 6,064,521 A | * | 5/2000 | Burke ........................ 359/452 |
| 6,144,491 A | | 11/2000 | Orikasa et al. ............. 359/452 |
| 6,163,348 A | * | 12/2000 | Izumi et al. ................ 359/460 |
| 6,233,095 B1 | | 5/2001 | Niwa et al. ................. 359/443 |
| 6,347,871 B2 | | 2/2002 | Matsunaga et al. ......... 359/613 |
| 6,428,169 B1 | * | 8/2002 | Deter et al. .................... 353/20 |
| 6,483,556 B1 | * | 11/2002 | Karakawa et al. ............ 353/31 |
| 6,529,322 B1 | * | 3/2003 | Jones et al. ................. 359/443 |
| 6,680,792 B2 | * | 1/2004 | Miles ......................... 359/291 |

FOREIGN PATENT DOCUMENTS

| | | | | |
|---|---|---|---|---|
| JP | 56-38921 | 9/1981 | | |
| JP | 64-7027 | 1/1989 | | |
| JP | 1-289940 | 11/1989 | | |
| JP | 2-228638 | 9/1990 | | |
| JP | 02 310554 | 12/1990 | | |
| JP | 3-109591 | 5/1991 | | |
| JP | 3-127040 | 5/1991 | | |
| JP | 3-150546 | 6/1991 | | |
| JP | 3-249634 | 11/1991 | | |
| JP | 3-280001 | 12/1991 | | |
| JP | 4-75336 | 7/1992 | | |
| JP | 4-296838 | 10/1992 | | |
| JP | 6-289491 | 10/1994 | | |
| JP | 6-324402 | 11/1994 | | |
| JP | 3010871 | 3/1995 | | |
| JP | 7-168129 | 7/1995 | | |
| JP | 7-92589 | 10/1995 | | |
| JP | 7-261274 | 10/1995 | | |
| JP | 7-270915 | 10/1995 | | |
| JP | 8-15779 | 1/1996 | | |
| JP | 8-43849 | 2/1996 | | |
| JP | 8-339036 | 12/1996 | | |
| JP | 9-34015 | 2/1997 | | |
| JP | 9 113888 | 5/1997 | | |
| JP | 9-185126 | 7/1997 | | |
| JP | 9-230506 | 9/1997 | | |
| JP | 9-289621 | 11/1997 | | |
| JP | 10-16119 | 1/1998 | | |
| JP | 10-213851 | 8/1998 | | |
| JP | 11-14959 | 1/1999 | | |
| JP | 11-15079 | 1/1999 | | |
| JP | 2001-91717 | 4/2000 | | |
| JP | 2000-281911 | 10/2000 | | |
| JP | 2000-329953 | 11/2000 | | |
| JP | 2000-341031 | 12/2000 | | |
| JP | 2001-33878 | 2/2001 | | |
| JP | 2001-42144 | 2/2001 | | |
| JP | 2001-209037 | 8/2001 | | |
| JP | 2002-91344 | 3/2002 | | |
| WO | WO 92/22009 | 12/1992 | | |
| WO | WO 95/31751 | 11/1995 | | |
| WO | WO 96/21883 | 7/1996 | | |
| WO | WO 97/01788 | 1/1997 | | |
| WO | WO 97/04352 | 2/1997 | | |
| WO | WO 98/36320 | 8/1998 | | |
| WO | WO 9836320 A1 | * | 8/1998 | .......... G03B/21/56 |
| WO | WO 99/64928 | 12/1999 | | |
| WO | WO 00/45220 | 8/2000 | | |
| WO | WO 00/47001 | 8/2000 | | |
| WO | WO 01/84192 | 11/2001 | | |

* cited by examiner

D = 280nm

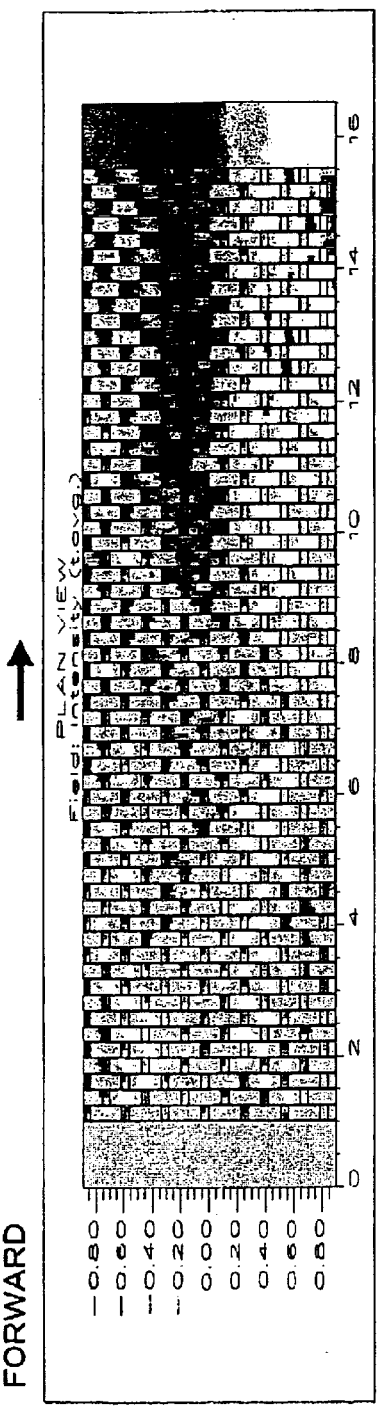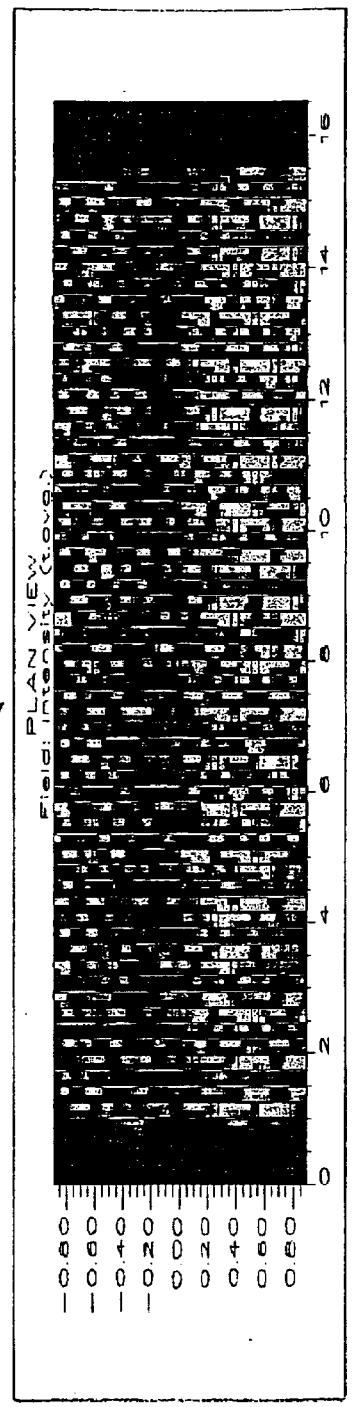
*Fig. 11A* *Fig. 11B*

WAVELENGTH λ =525nm

FORWARD

BACKWARD

WAVELENGTH $\lambda = 540nm$

WAVELENGTH $\lambda$ =580nm
FORWARD
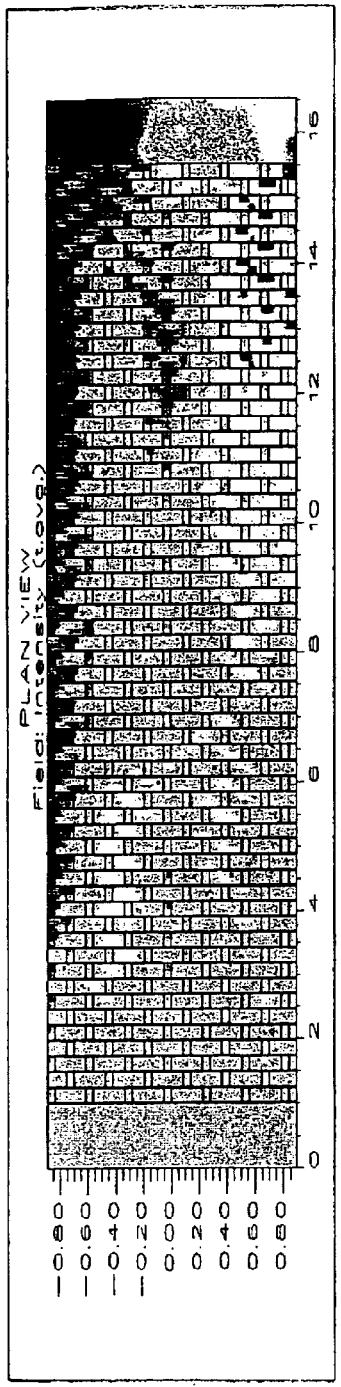
*Fig. 15A*
BACKWARD
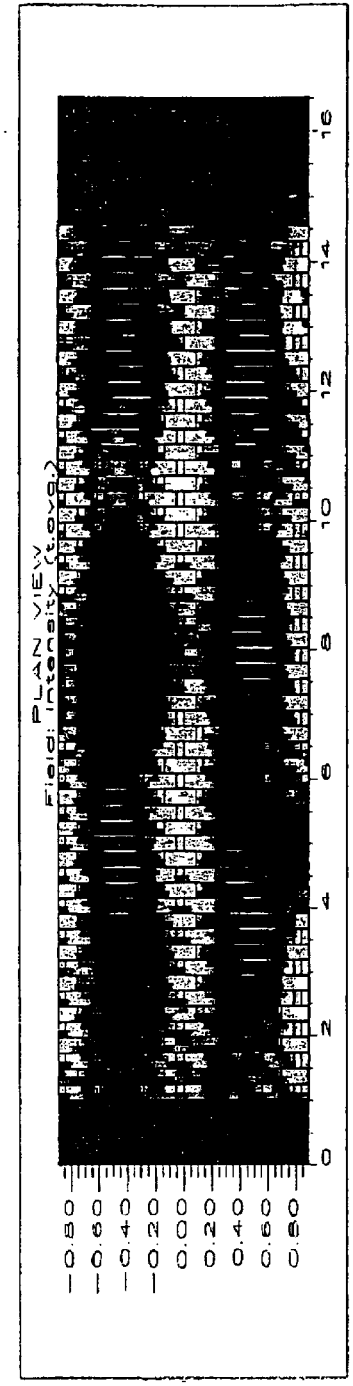
*Fig. 15B*

WAVELENGTH λ=600nm

WAVELENGTH $\lambda = 625$ nm
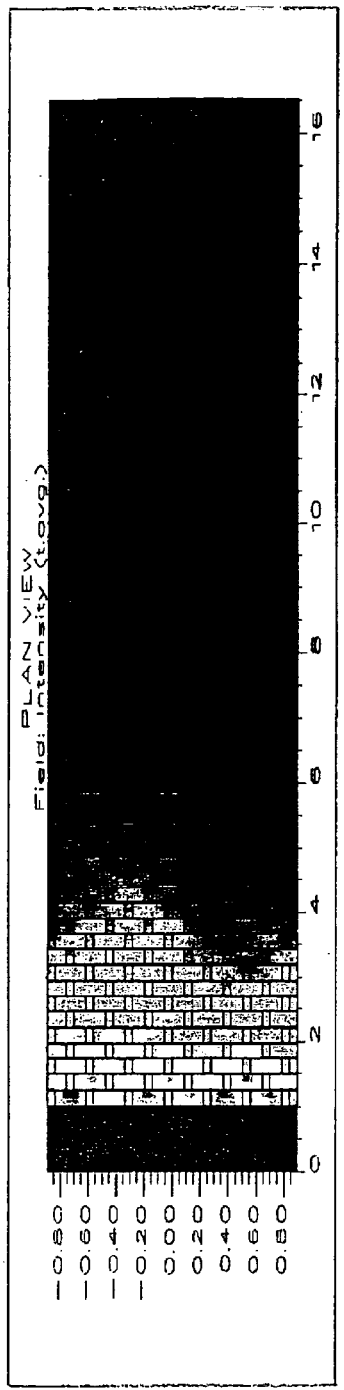
FORWARD 
*Fig. 17A*
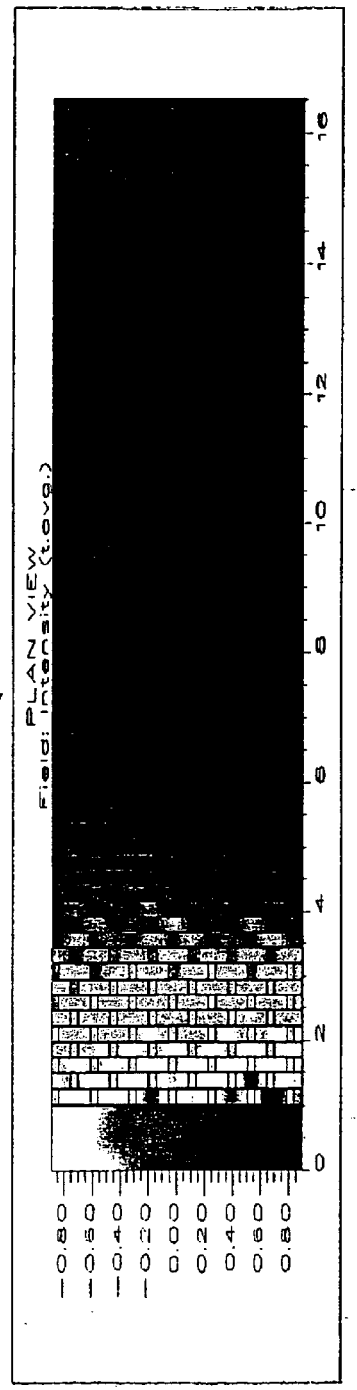
BACKWARD 
*Fig. 17B*

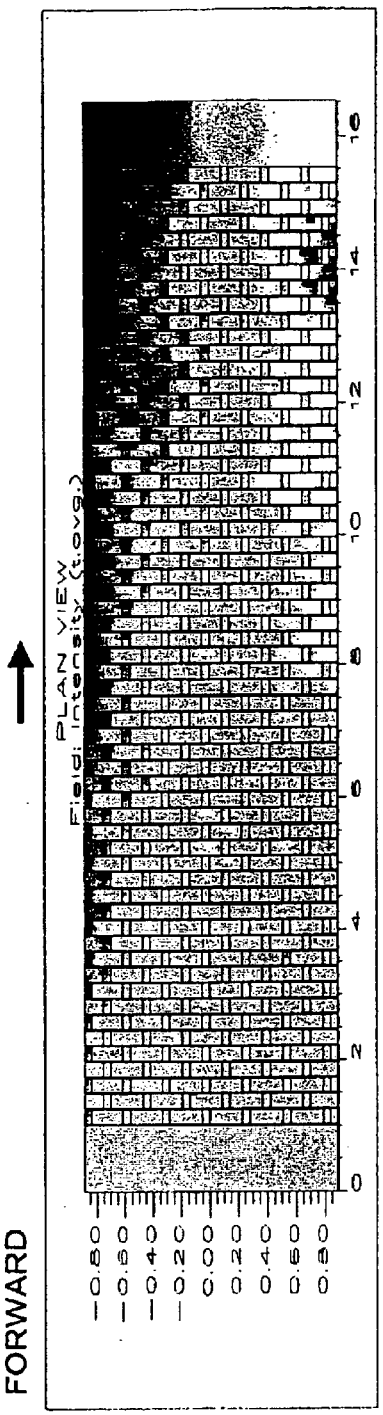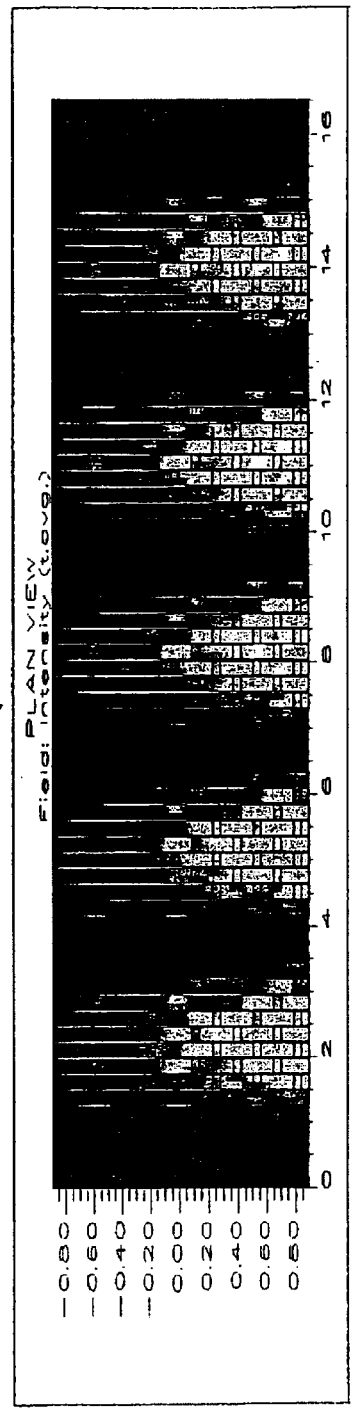
*Fig. 19A* *Fig. 19B*

$\lambda = 600$ nm

λ = 603 nm

λ = 605 nm $\lambda = 607$ nm

FORWARD →

BACKWARD ↓

λ = 610 nm $\lambda = 615$ nm

FORWARD →

BACKWARD ↓

λ = 620 nm $\lambda = 625$ nm

FORWARD

BACKWARD $\lambda = 630$ nm

FORWARD

BACKWARD $\lambda = 632$ nm

FORWARD

BACKWARD $\lambda = 636$ nm

λ = 500 nm
FORWARD
BACKWARD

λ = 525 nm $\lambda = 540$ nm

λ = 580 nm

FORWARD

BACKWARD $\lambda = 610$ nm

λ = 650 nm

FORWARD ←

BACKWARD →

REFLECTION FOR BLUE

CALCULATION MODEL

FILLING FACTOR 0.74

λ = 450 nm $\lambda = 475$ nm $\lambda = 490$ nm $\lambda = 520$ nm $\lambda = 570$ nm

FORWARD

BACKWARD

λ = 610 nm

λ = 640 nm
FORWARD
BACKWARD

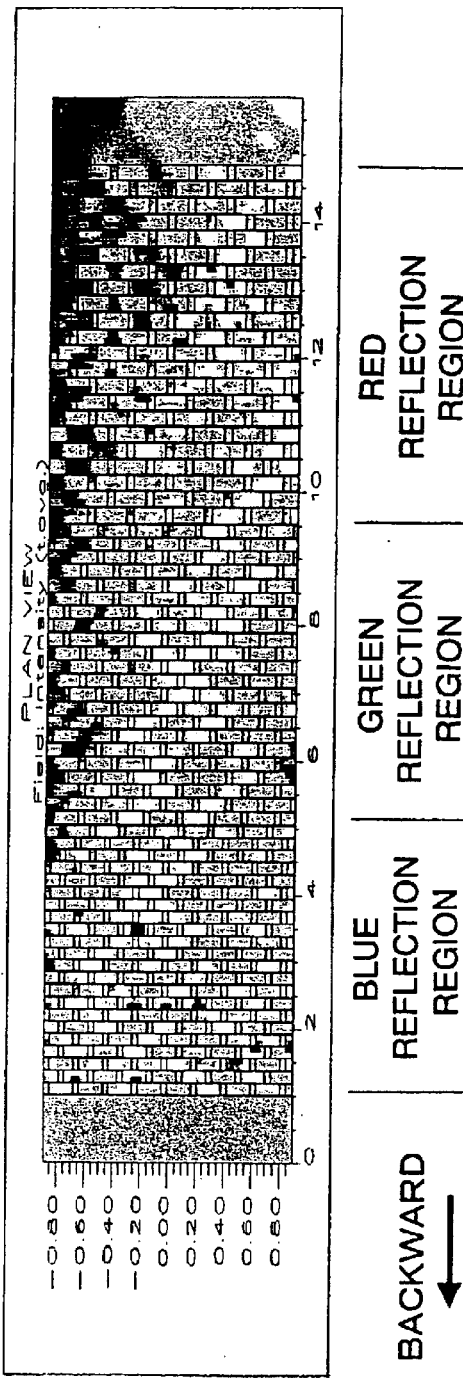
Fig. 52A
Fig. 52B

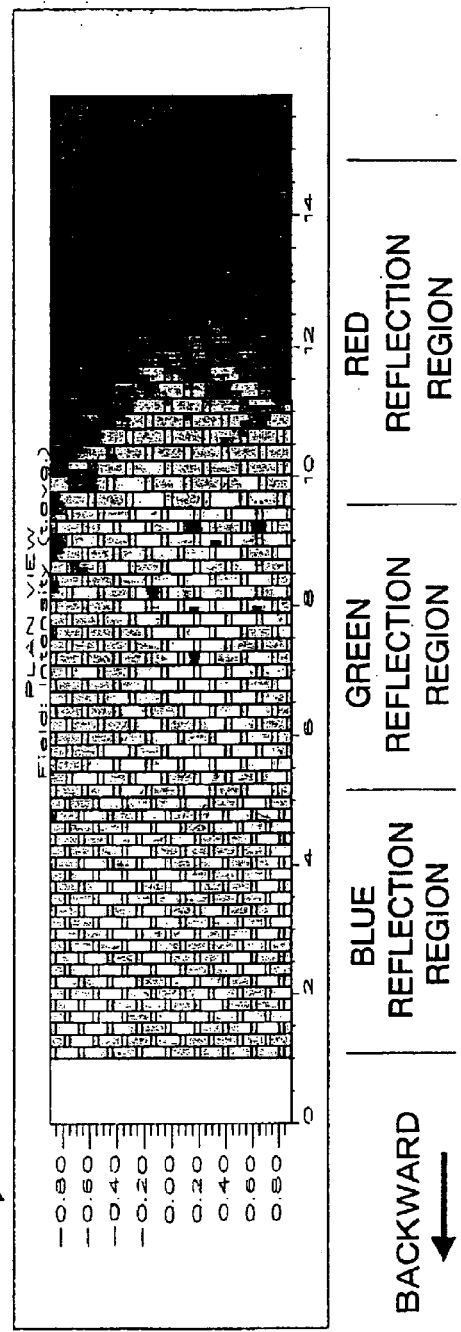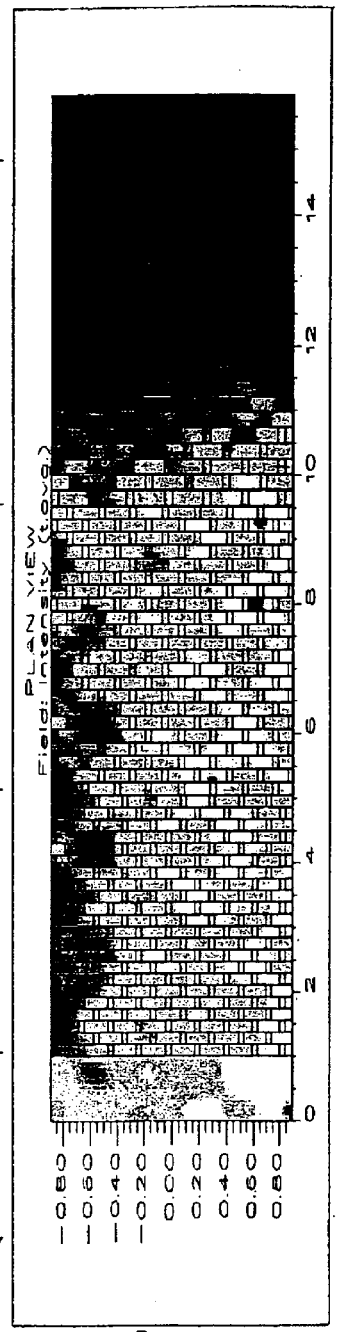

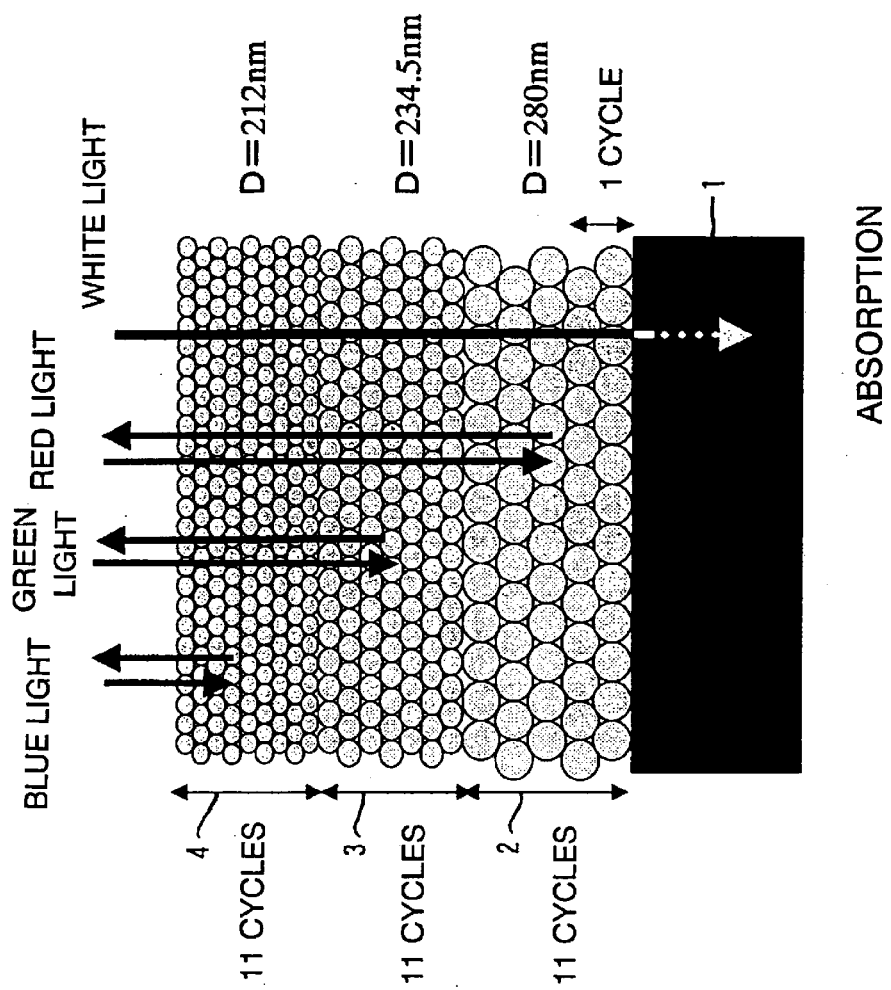

SLOW DEPOSITION
IN A WATER SOLUTION

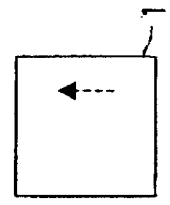
Fig. 57D
DRY THE SUBSTRATE
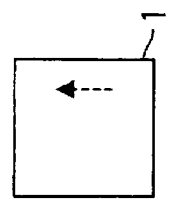
Fig. 57C
PULL UP THE SUBSTRATE
Fig. 57B
IMMERSE THE SUBSTRATE
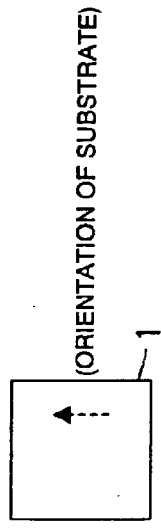
Fig. 57A
(ORIENTATION OF SUBSTRATE)
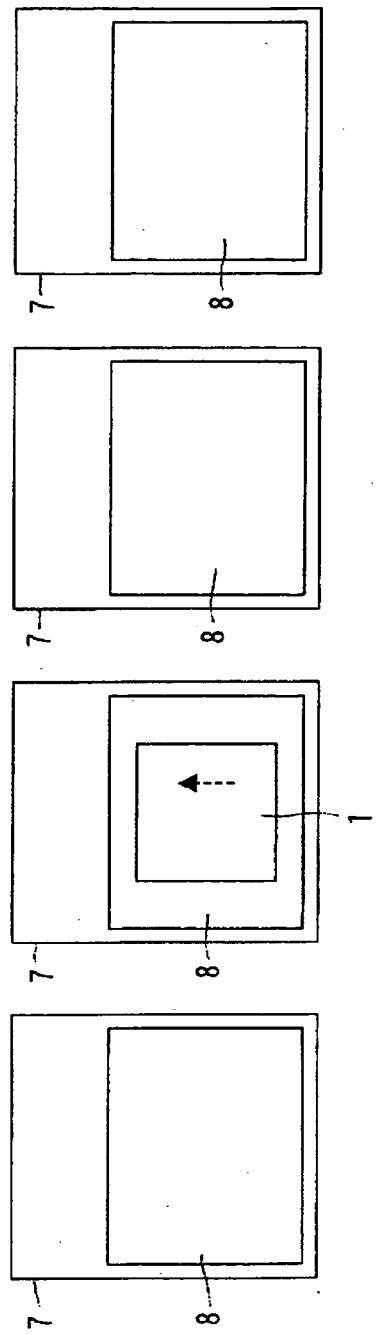

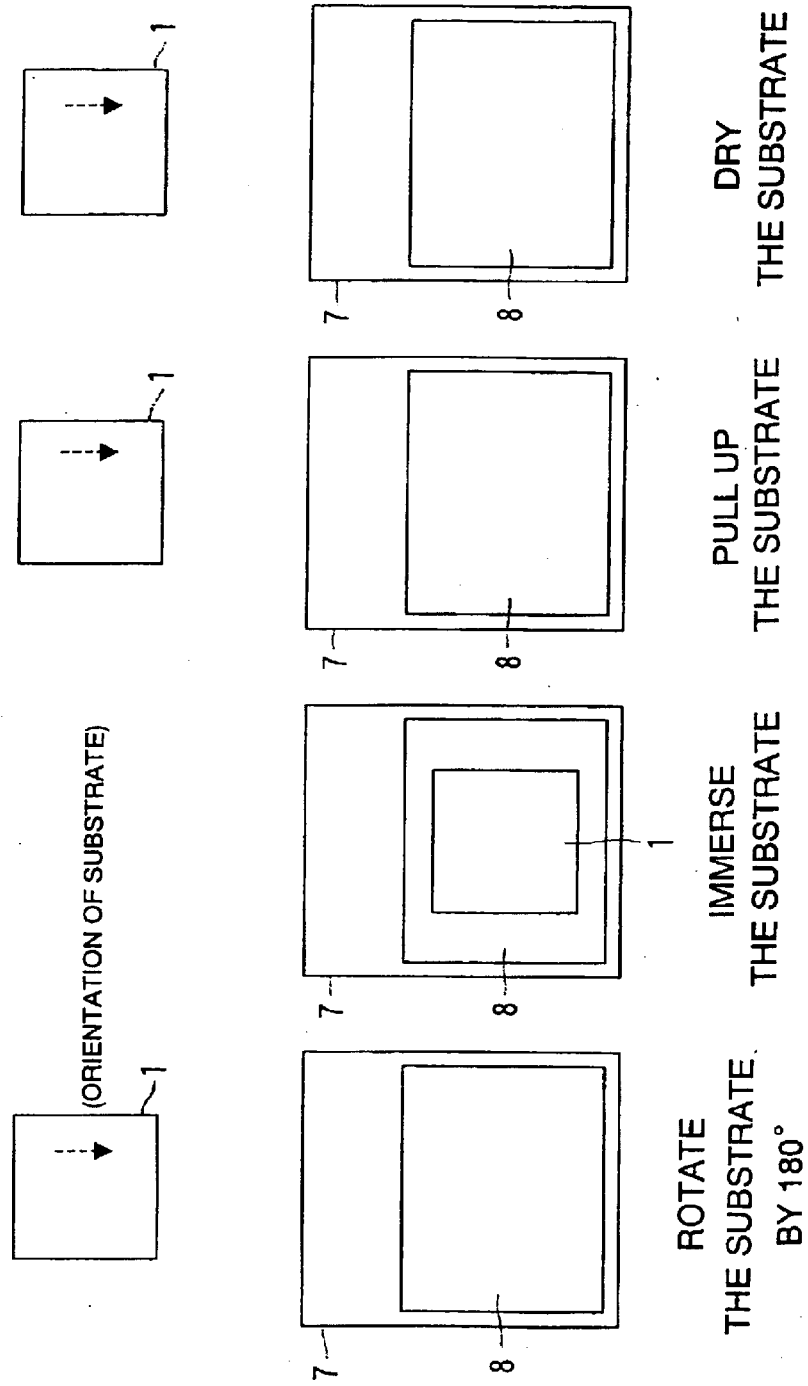

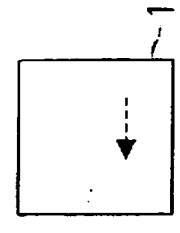
Fig. 59A
Fig. 59B
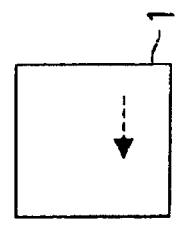
Fig. 59C
Fig. 59D
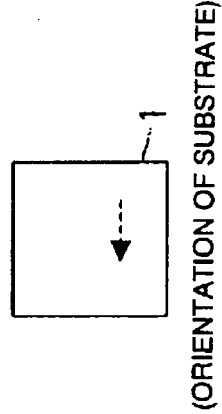
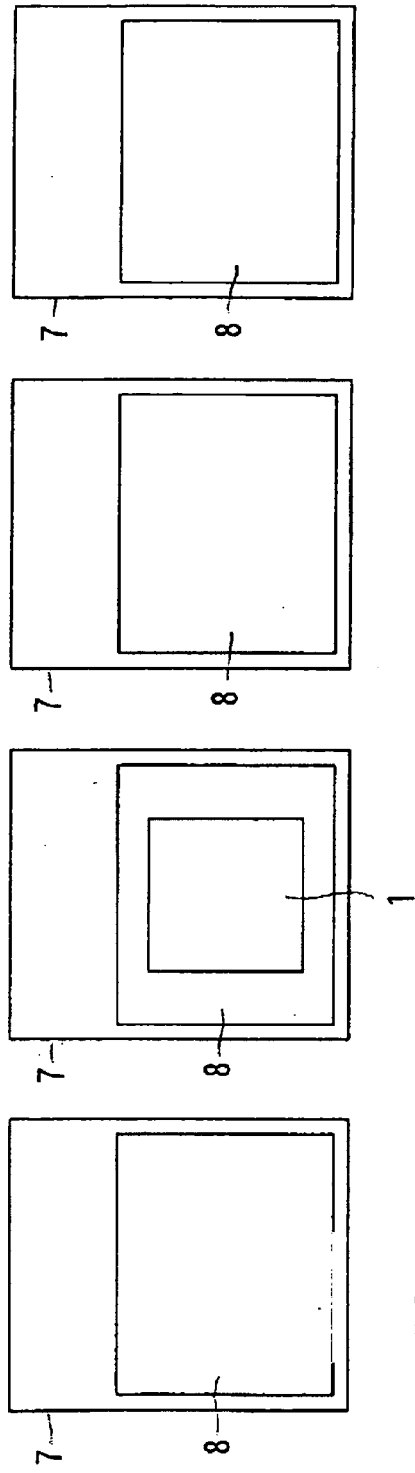
(ORIENTATION OF SUBSTRATE)
ROTATE THE SUBSTRATE BY 45°
IMMERSE THE SUBSTRATE
PULL UP THE SUBSTRATE
DRY THE SUBSTRATE

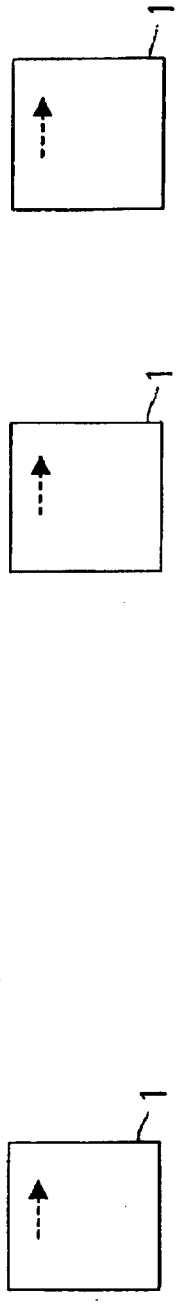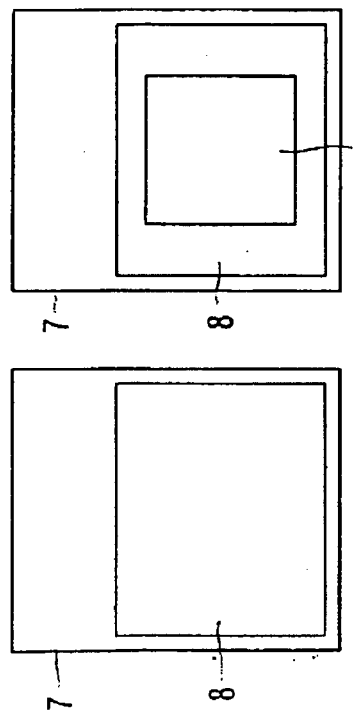

FORWARD $\lambda = 625$ nm

BACKWARD

16 CYCLES

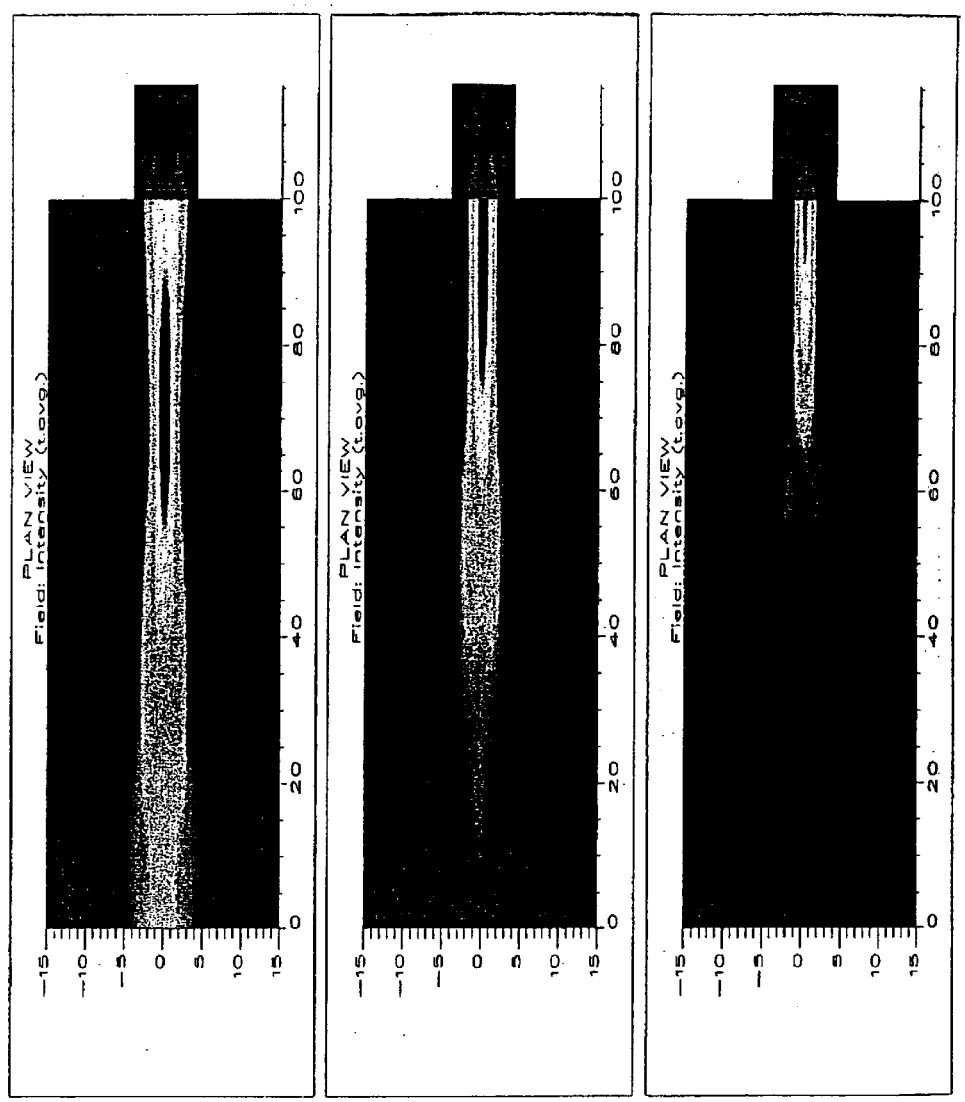

CRYSTAL AXIS

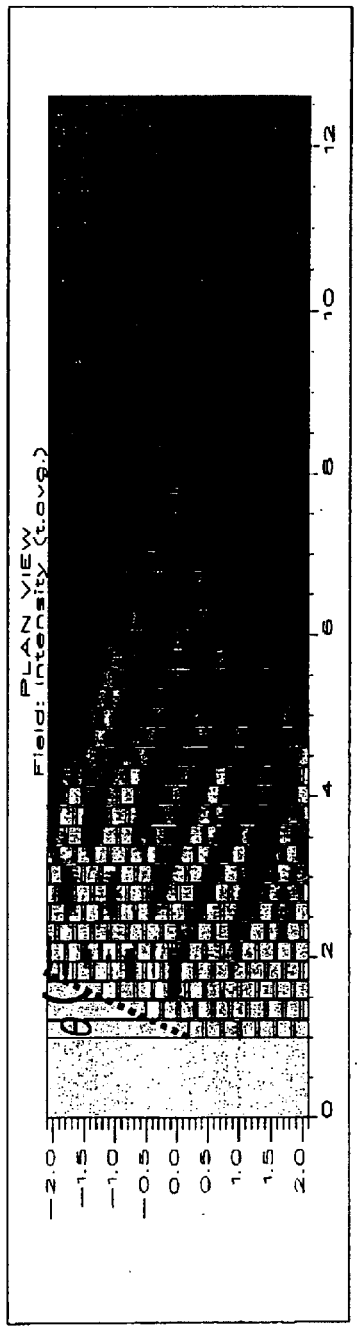
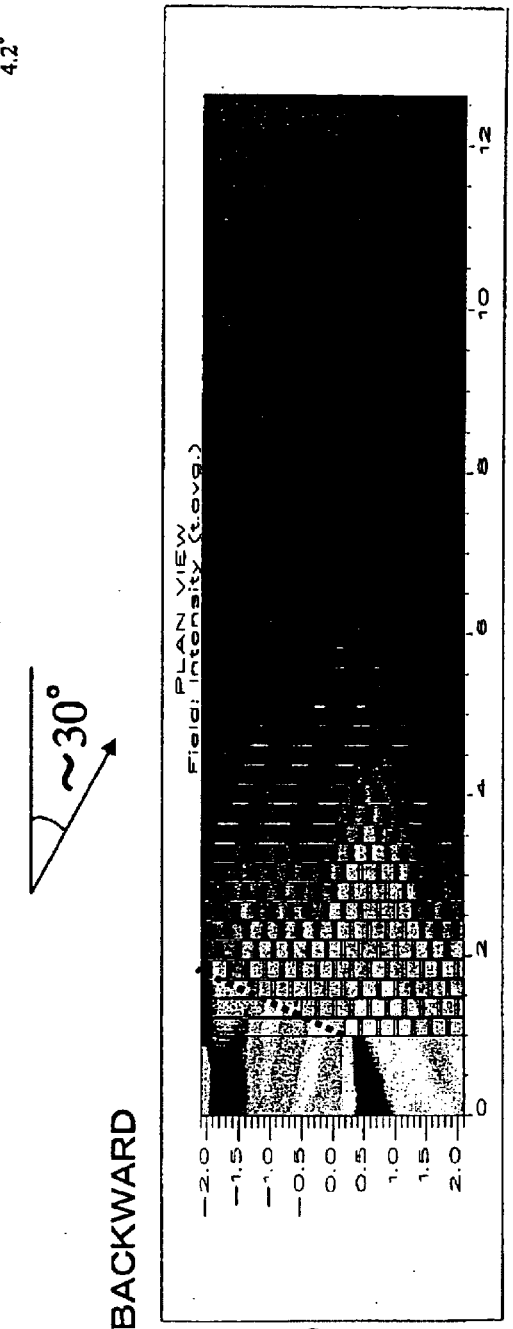
Fig. 71A
Fig. 71B $$2d \cdot \sin\theta = m\lambda$$

$1/\lambda_0 < 1/\lambda_1$

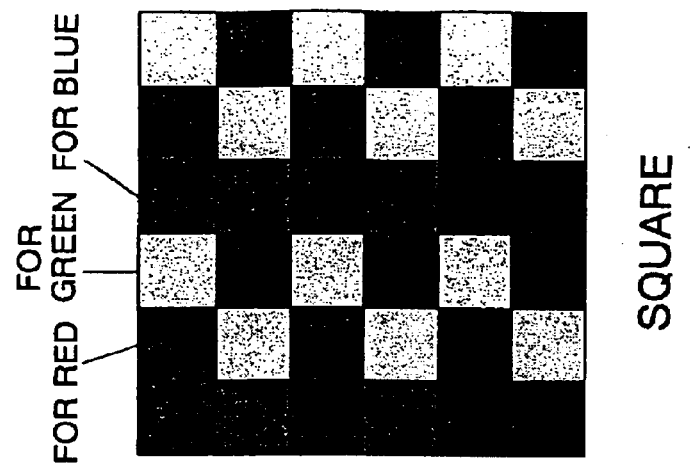
Fig. 97C SQUARE
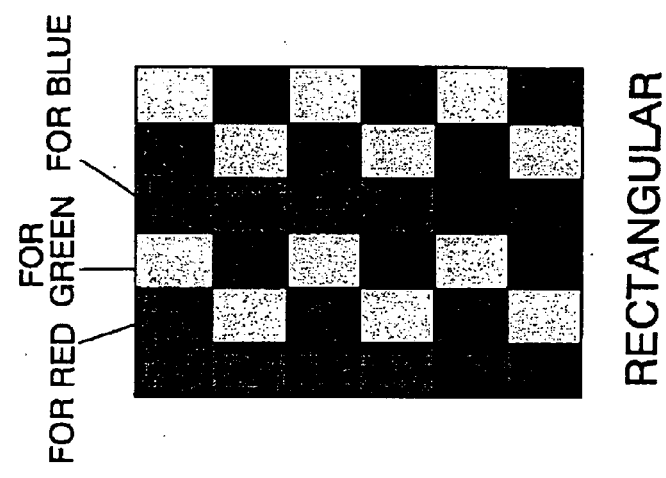
Fig. 97B RECTANGULAR
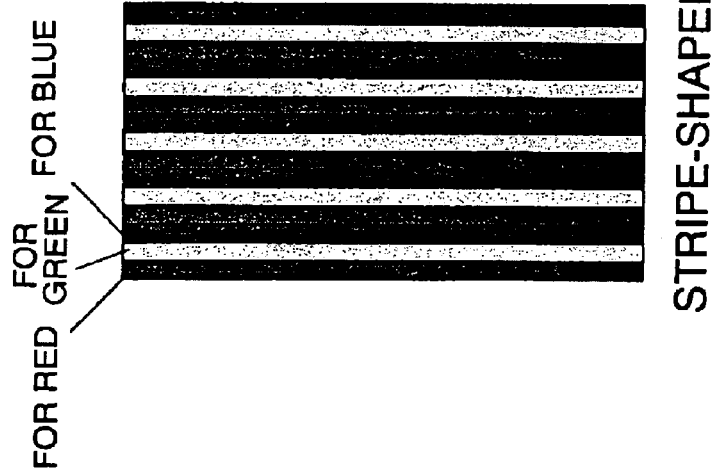
Fig. 97A STRIPE-SHAPED

SCREEN, ITS MANUFACTURING METHOD AND IMAGE DISPLAY SYSTEM

TECHNICAL FIELD

This invention relates to a screen, its manufacturing method and image display system especially suitable for use in projection of various kinds of images.

BACKGROUND ART

Conventionally, projector screens are basically white background screens that can reflect or scatter almost all part of light in the visible wavelength region. In this case, since such a screen also scatters or reflects external light irrelevant to images if it intrudes onto the screen, images deteriorate in contrast. Therefore, projection is usually carried out in a dark room.

However, even during projection in a dark room, any light filtering from the exterior or any light irrelevant to images inside the dark room deteriorates the contrast of the images, and raises the luminance level of black-displaying portions.

In displays such as CRT or liquid crystal displays that are widely used, since light of each primary color has a wide spectral full width at half maximum (FWHM), the color reproduction range on a chromaticity diagram is narrow, and it is difficult to represent pure colors. Also in liquid crystal or CRT projector-type displays, light forming an image scattered or reflected from a screen similarly has a wide spectral full width at half maximum, the color reproduction range on a chromaticity diagram is narrow, and it is difficult to represent pure colors.

It is therefore an object of the invention is to provide a screen that can presents clean images in which black-displaying portions are lowered in luminance level even upon intrusion of any external light irrelevant to images, without deteriorating the contrast of images, and also to provide a manufacturing method of the screen and an image display system using the screen.

A further object of the invention is to provide a screen not deteriorating the contrast of images even under an ordinary fluorescent lamp or in the open air and therefore not requiring projection in a dark room, and also to provide a manufacturing method of the screen and an image display system using the screen.

A still further object of the invention is to provide a screen that can maintain a high contrast by efficiently, selectively reflecting light of images exclusively and cutting light of other wavelengths and can simultaneously lower the luminance level of black-displaying portions in the case where the full width at half maximum of emission spectrum of a semiconductor laser or a light emitting diode (LED) is narrow and images are formed by projecting light excellent in color purity, and to provide a manufacturing method of the screen and an image display system using the screen.

A yet further object of the invention is to provide a screen that can ensure a wide color reproduction range on a chromaticity diagram even when projecting light from a display like a liquid crystal projector, for example, having a wide full width at half maximum of the spectrum of each primary color, and can represent pure colors, and to provide a manufacturing method of the screen and an image display system using the screen.

DISCLOSURE OF INVENTION

To accomplish the above-indicated objects, according to the first aspect of the invention, there is provided a screen comprising a structure in which particles having a size not larger than 1 $\mu$m are regularly aligned.

According to the second aspect of the invention, there is provided a screen configured to reflect light of specific wavelengths by using a photonic crystal.

The photonic crystal is an artificial crystal made by regularly aligning transparent mediums (for example, two different kinds of transparent mediums) largely different in refractive index (dielectric constant) to cycles near the wavelength of light, e.g. to cycles of hundreds to one thousand and hundreds of nanometer. Depending on the order of the periodical structure, it is called a one-dimensional photonic crystal, two-dimensional photonic crystal or three-dimensional photonic crystal. The photonic crystal is equivalent to the regularly aligned structure of particles in the feature having a periodical structure and having the function of reflect light. In other words, the regularly aligned structure of particles may be regarded as one kind of photonic crystals.

According to the third aspect of the invention, there is provided a screen comprising a structure using dielectric multi-layered films to reflect light of specific wavelengths.

The dielectric multi-layered film may be regarded as a one-dimensional photonic crystal.

According to the fourth aspect of the invention, there is provided a method for manufacturing a screen having a structure in which particles having a size not larger than 1 $\mu$m are regularly aligned, characterized in that the particles are aligned by self-organization.

Self-organization generally pertains to autonomously systemizing oneself in accordance with an external information structure, but herein, it pertains to autonomous accumulation of particles and regular alignment thereof in a system letting the particles accumulate (for example, a liquid) in accordance with parameters characterizing the system.

Accumulation of particles by self-organization is typically brought about in the following manner.

That is, according to the fifth aspect of the invention, there is provided a method for manufacturing a screen having a structure in which particles having a size not larger than 1 $\mu$m are regularly aligned, comprising:

a first step of immersing a substrate into a particle solution containing 2 weight % of particles;

a second step of wetting the surface of the substrate with the particle solution by pulling up the substrate into air at a speed not slower than 30 $\mu$m/s; and a third step of drying the substrate wet with the particle solution in air.

Most preferably, the first to third steps are repeated until a desired optical property of the regularly aligned structure of the particles, i.e. the particle layer, is obtained, or until it reaches a desired thickness. With one cycle of the first to third steps, it is difficult to obtain a uniform thickness of the particle layer on the plane of the substrate surface. Preferably, therefore, before immersing the substrate, during immersion (before pull-up) of the substrate or immediately after pull-up of the substrate, the substrate is changed in orientation by rotating it within the plane of its own. In this case, thickness of the particle layer within the plane of the substrate may be checked after drying the substrate so as to control the orientation of the substrate in accordance with the result. Concentration of the particle solution as much as two weigh % is normally satisfactory to smoothly proceed with accumulation of the particle layer. However, from the viewpoint of efficiently stacking the particle layer, a higher concentration is desirable. On the other hand, although depending upon the material of the particles, if the concentration is higher than 50 weight %, it prevents good formation of the particle layer. Therefore, the concentration is preferably controlled not to exceed 50 weight %. As to the pull-up speed of the substrate, a speed not slower than 30µ/s is normally sufficient to proceed with deposition of the particle layer without problems. However, if the pull-up speed is excessively slow, thickness of the deposited particle layer tends to increase. Therefore, from the viewpoint of efficiently accumulating the particle layer, a higher speed is desirable. The pull-up speed is considered to have no upper limit, but from the practical viewpoint, it is usually limited not to exceed 3 m/s.

According to the sixth aspect of the invention, there is provided an image display system comprising:

a screen configured to reflect light of specific wavelengths by using photonic crystals; and a projector light source including semiconductor light emitting devices for emitting light of the specific wavelengths.

According to the seventh aspect of the invention, there is provided an image display system comprising:

a screen having a structure in which particles having a size not larger than 1 µm are regularly aligned; and a projector light source including semiconductor light emitting devices each for emitting light of a specific wavelength determined by the size and alignment of the particles.

According to the eighth aspect of the invention, there is provided an image display system comprising:

a screen configured to reflect light of specific wavelengths by using a dielectric multi-layered film; and a projector light source including semiconductor light emitting devices for emitting light of the specific wavelengths.

In the present invention, the reason why the size of the particles used for the screen is limited not to exceed 1 µm lies in that, considering the substantially proportional relation between the size of the particles and the wavelength of light reflected by the particles, the size of the particles must be limited not to exceed 1 µm for reliably reflect visible light contributing to formation of images. Especially when the particles are aligned into a close-packed structure, to reliably reflect the light of three primary colors, the size of the particles should be typically controlled in the range from 150 nm to 320 nm approximately.

Basically, any method can be used to stack the particles used for forming the screen provided it can form a regularly aligned structure. Typically, however, the particles can be readily accumulated by using self-organized technique. The particles are typically aligned into a close-packed structure. The close-packed structure is either a close-packed cubic structure in which the particles align to form a face-centered cubit lattice or a hexagonal close-packed structure in which the particles align to form a close-packed hexagonal lattice.

Typically for enabling simultaneous reflection of light of wavelengths corresponding to red, green and blue three primary colors, a structure is employed, which includes three kinds of diameters of particles or three kinds of cycles of the photonic crystals or dielectric multi-layered films. Various granular materials are usable as the particles, and any may be selected depending of its use. Preferably, silica particles or other particles having the same refractive index as that of silica are used. Refractive index of silica is generally in the range of 1.36 to 1.47, although it may change depending on conditions used for its fabrication. In this case, regardless of the material of the particles, when the refractive index of the particles is n, here are used particles having a diameter in the range from $269\times(1.36/n)$ nm to $314\times(1.36/n)$ nm for reflecting red, particles having a diameter in the range of $224\times(1.36/n)$ nm to $251\times(1.36/n)$ nm for reflecting green, and particles having a diameter in the range from $202\times(1.36/n)$ to $224\times(1.36/n)$ nm for reflecting blue. More typically, here are used particles having a diameter in the range from $278\times(1.36/n)$ nm to $305\times(1.36/n)$ nm for reflecting red, particles having a diameter in the range of $224\times(1.36/n)$ nm to $237\times(1.36/n)$ nm for reflecting green, and particles having a diameter in the range from $208\times(1.36/n)$ to $217\times(1.36/n)$ nm for reflecting blue. However, these red-reflecting particles, green-reflecting particles and blue-reflecting particles may be of different materials, if necessary. To enable simultaneous reflection of light of wavelengths corresponding to red, green and blue three primary colors, photonic crystals or particle layers for reflecting red, green and blue, respectively, are stacked on a substrate. The stacking order of these photonic crystals or particle layers is basically free, but photonic crystals or particle layers for red reflection, green reflection and blue reflection may be stacked in this order, or vice versa. The former stacking configuration is advantageous for minimizing influences of Rayleigh scattering whereas the latter is advantageous especially for improving the crystal property of the particle layers. In this case, the stacking period of photonic crystals or particles layers for respective colors is preferably in the range from eight cycles to fifteen cycles for enhancing the wavelength selectivity.

The photonic crystals or particle layers for red reflection, green reflection and blue reflection may be arranged in a lateral array on the substrate. Here again, the stacking period of photonic crystals or particles layers for respective colors is preferably in the range from eight cycles to fifteen cycles for enhancing the wavelength selectivity. The particle layers for red reflection, green reflection and blue reflection may be stripe-shaped, rectangular-shaped or square-shaped, and they are arranged in a predetermined alignment pattern on the substrate. The order of alignment of these photonic crystal or particle layers for red reflection, green reflection and blue reflection is basically free.

In order to absorb visible light of wavelengths other than those of red, green and blue three primary colors, which pass through the photonic crystals, particle layers or dielectric multi-layered films, the screen preferably includes a layer of a bulk substrate capable of absorbing those parts of visible light. Most preferably, this layer or bulk substrate absorbs visible light of all wavelength bands. The layer or bulk substrate absorbing these parts of visible light preferably underlies the photonic crystals, particles or dielectric multi-layered films (on the back surface viewed from the screen-watching direction). A transparent substrate having a layer for absorbing visible light on the back surface thereof may be used as the substrate. Various materials are usable for forming the substrate, such as carbon and other inorganic materials, polyethylene terephthalate (PET) and other polymeric materials, organic materials like resins, and complex materials combining inorganic materials and organic materials. In case the particle layers or photonic crystals are formed on the substrate in a liquid phase, some kinds of substrates are not sufficiently wettable. In this case, preferably before the particle layers or photonic crystals are formed, the substrate is treated to improve the wettability of its surface. More specifically, an irregularity may be formed on the substrate surface by a surface-roughening technique, the surface may be coated with a SiO$_2$ film or the like may be coated, or the surface may be processed with a chemical liquid, for example. Furthermore, in case the particle layers are stacked on the substrate in a liquid, a buffer layer of particles is preferably formed on the substrate beforehand to improve its wettability. Diameter of particles in the particle layer used as the buffer layer is controlled to be smaller than the diameter of the blue-reflecting particles, which is in the range from 208×(1.36/n) to 217×(1.36/n) nm. That is, it is controlled to be smaller than 208×(1.36/n) nm. Although it depends on the substrate material, if the thickness of the substrate is controlled not to be smaller than 20 µm, then the substrate is advantageous, in general, for sufficient strength as the screen that is unlikely to break. On the other hand, if the thickness is not larger than 500 µm, then the screen is more flexible and convenient for handling when rolling it or transporting it. In case the dielectric multi-layered films are used for making the screen, the periodical structure of each dielectric multi-layered film preferably includes 10 cycles or more to enhance its wavelength selectivity.

To diverge the reflected light by using a diffraction effect, the lateral size of the photonic crystals or the aggregate of particles is limited not to exceed 22 cycles. Alternatively, it is possible to use photonic crystals, an aggregate of particles or dielectric multi-layered films that has, in combination, slanted surfaces and another surface having a different angle from that of the slanted surfaces. In this case, the angle θ of the slanted surfaces is adjusted in the range from 70°≦θ≦90°. Alternatively, the photonic crystals, aggregate of particles or dielectric multi-layered films may have a curved surface. It is also acceptable to incline the crystal axis of the photonic crystals, aggregate of particles or dielectric multi-layered films by an angle α in the range from 77.4°≦θ≦90° from the incident direction of light. Further, from the viewpoint of moderating the directivity of light reflected by the screen, the photonic crystals, aggregate of particles or dielectric multi-layered films may have undulations. Furthermore, making an irregularity on the substrate surface also contributes to moderate the directivity of light.

For the purpose of moderating the directivity of light reflected by the screen and uniforming the luminosity over the entire screen, a light-diffusing medium is provided by coating or other appropriate technique. Specifically, the light-diffusing medium may be a diffusion film, micro lens film or micro prism film made, for example, which is made of a polymeric material. To improve the mechanical strength of the screen, gaps among the particles are buried with a binder of a polymeric material. In this case, the particles are changed to voids.

According to the ninth embodiment of the invention, there is provided a screen comprising particles regularly aligned to reflect electromagnetic waves of specific wavelengths.

According to the tenth embodiment of the invention, there is provided a screen comprising:

first particles regularly aligned to reflect an electromagnetic wave of a first wavelength; and second particles regularly aligned to reflect an electromagnetic wave of a second wavelength different from said first wavelength, wherein said first particles and said second particles are different in diameter.

In the ninth and tenth aspects of the invention, the electromagnetic wave is typically visible light. In this case, within the extent consistent to its nature, the foregoing matters already referred to in conjunction with the first to eighth aspects of the invention are here again applicable.

According to the invention having the above-summarized configurations, it is possible to selectively reflect only light of specific wavelengths by means of the photonic crystals, particles or dielectric multi-layered films and to absorb the other part of light of other wavelengths by using an absorption layer, for example.

Moreover, by regularly aligning particles in a self-systemized manner, desired particle layers can be formed easily.

BRIEF DESCRIPTION OF DRAWINGS

FIGS. 9A through 10 is a schematic diagram that shows a model used for calculation of a light field of particles;

FIGS. 11A through 31B are schematic diagrams that show results of calculation of light fields of particles;

FIGS. 50A through 54B are schematic diagrams that show results of calculation of light fields of particles lateral reflection of three primary colors;

FIG. 55 is a cross-sectional view of a screen according to the first embodiment of the invention;

FIGS. 57A through 60D are schematic diagrams for explaining a more concrete manufacturing method of the screen according to the first embodiment of the invention;

FIGS. 62A through 65C are schematic diagrams that show results of calculation of light fields of particles;

FIGS. 69A through 75B are schematic diagrams that show results of calculation of light fields of particles;

FIGS. 97A through 97C are plan views that show parallel-to-substrate patterns of alignment of particle layers for reflection of three primary colors on the screen according to the fifth embodiment of the invention;

BEST MODE FOR CARRYING OUT THE INVENTION

Figure 1B:
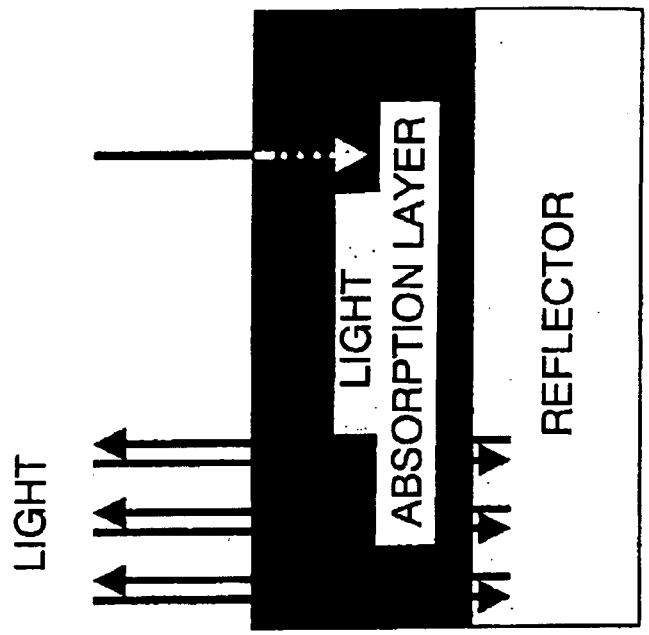
FIGS. 1A through 2B are schematic diagrams for explaining the principle of screens according to the invention.

Embodiments of the invention will now be explained below. In all figures showing the embodiments, common or equivalent components are labeled with common reference numerals.

Figure 1A:
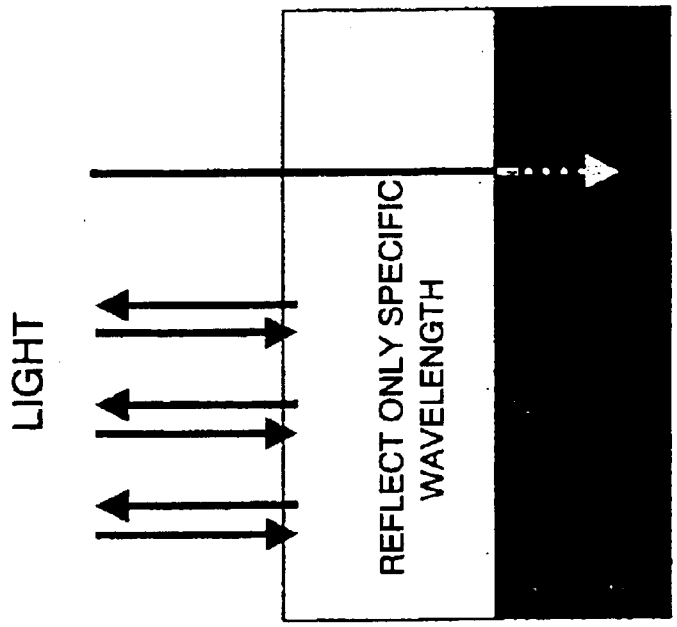

As shown in FIGS. 1A and 1B, a screen capable of lowering the luminance level of black-displaying portions can be realized by combining a reflector and a light absorption layer so as to reflect light of only a specific wavelength and absorb light of the other wavelengths. The screen shown in FIG. 1A is characterized in a high wavelength selectivity whereas the screen shown in FIG. 1B is characterized in a simple structure.

Figure 2B:
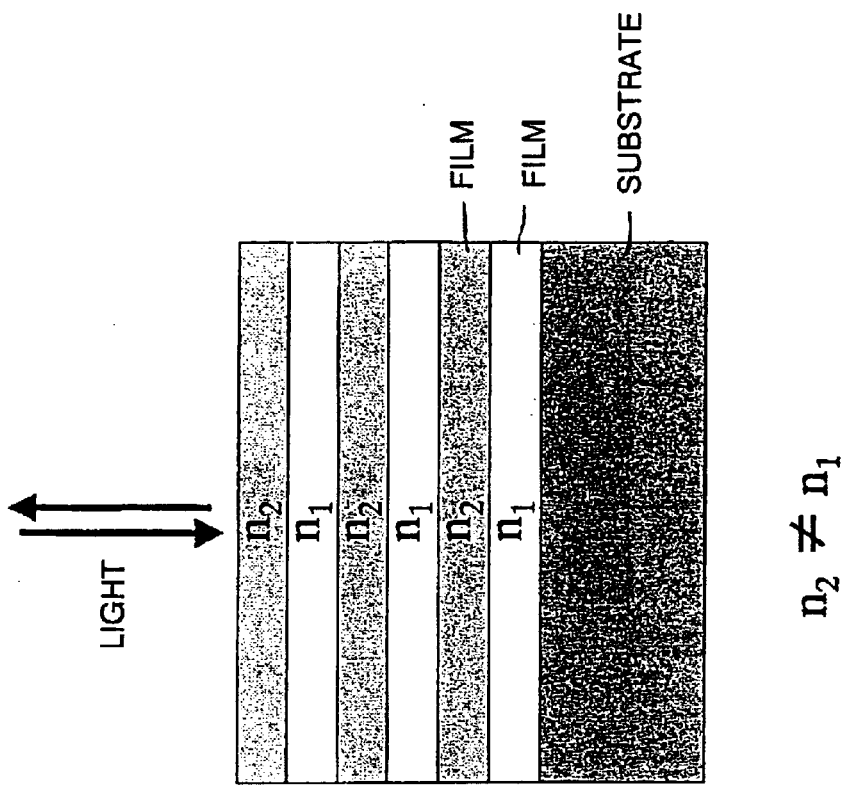
Figure 2A:
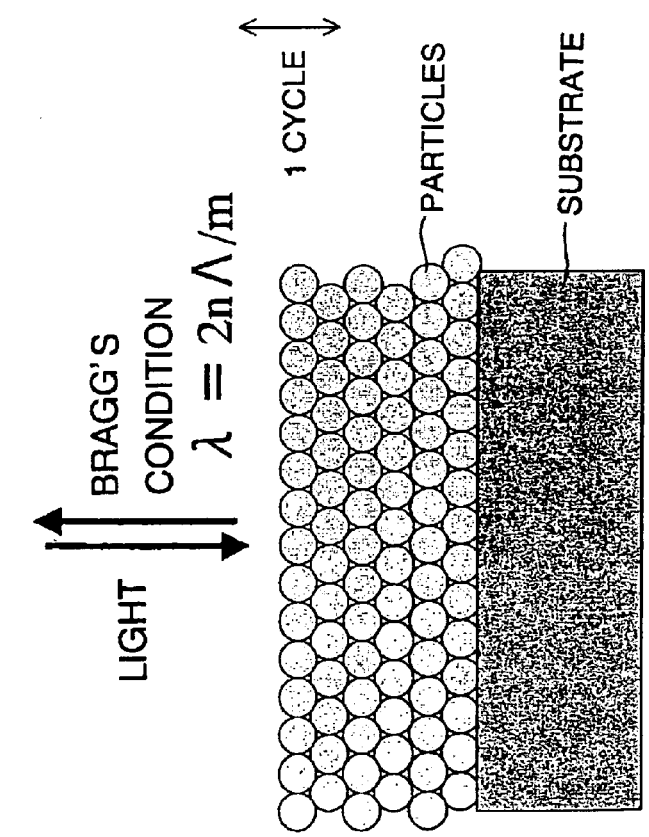

FIGS. 2A and 2B show specific examples of structure for reflecting light of a specific wavelength exclusively. The structure shown in FIG. 2A is made of a regular alignment of particles optimized in size beforehand on a substrate to selectively reflect light of a wavelength satisfying the Bragg's condition ($\lambda = 2n\Lambda/m$, $\lambda$: wavelength of the incident light; n: mode refractive index; $\Lambda$: structural cycle; m: order). The structure shown in FIG. 2B is made by forming a multi-layered film on a substrate by alternately stacking films having the reflective indices $n_1$ and $n_2$ ($\neq n_1$) to selectively reflect light of specific wavelengths by using the interference effect.

Figure 3:
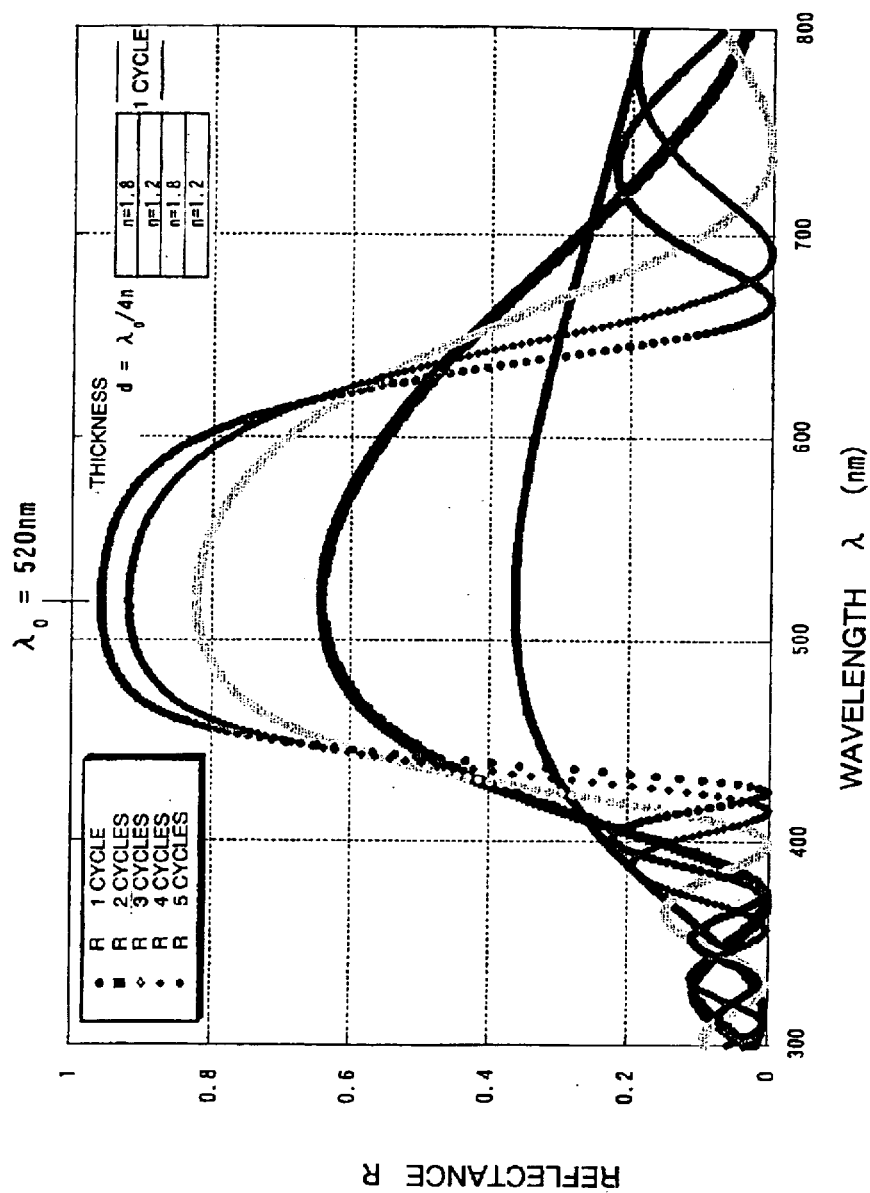
FIG. 3 and FIG. 4 are schematic diagrams that show reflection spectrums of multi-layered films.

First explained is a result of estimation of the reflection spectrums of the multi-layered film by the effective Fresnel's coefficient method. This multi-layered film is an alternative lamination of two kinds of dielectric films different in refractive index, each stacked to the thickness of $m\lambda_0/4n$ relative to the refractive index of each. In general, m is an integer not smaller than 1, but here, it is 1. $\lambda_0$ is the specific wavelength of light. The result is shown in FIG. 3. The calculation is conducted here by setting the refractive index of one dielectric film as n=1.2, the refractive index of the other kind of dielectric film as n=1.8 and $\lambda_0$=520 nm. This result shows that the reflectance increases as the cycle of the multi-layered film increases from 1 to 5 and that a reflectance not less than 90% is obtained when the film is stacked to five cycles. It is also understood that the full width at half maximum is as wide as ~200 nm.

Figure 4:
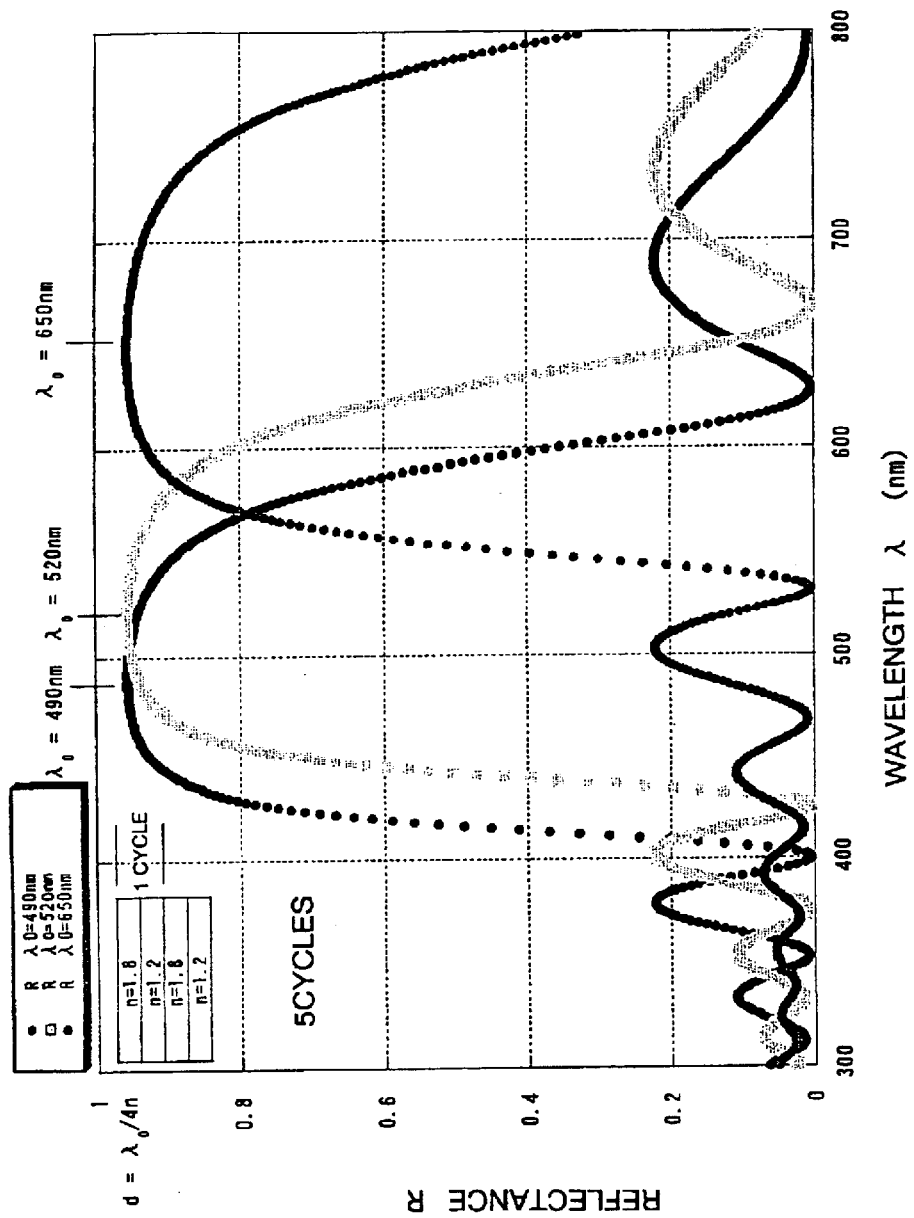

FIG. 4 shows a result of calculation about wavelengths $\lambda_0$=490 nm (blue), $\lambda_0$=520 nm (green) and $\lambda_0$=650 nm (red) of three primary colors under the condition of five cycles. It is understood from the result that, for any of the wavelengths of three primary colors, because of a wide full width at half maximum of the peak, peaks overlap, but light of a specific wavelength can be reflected to a certain extent.

Figure 5:
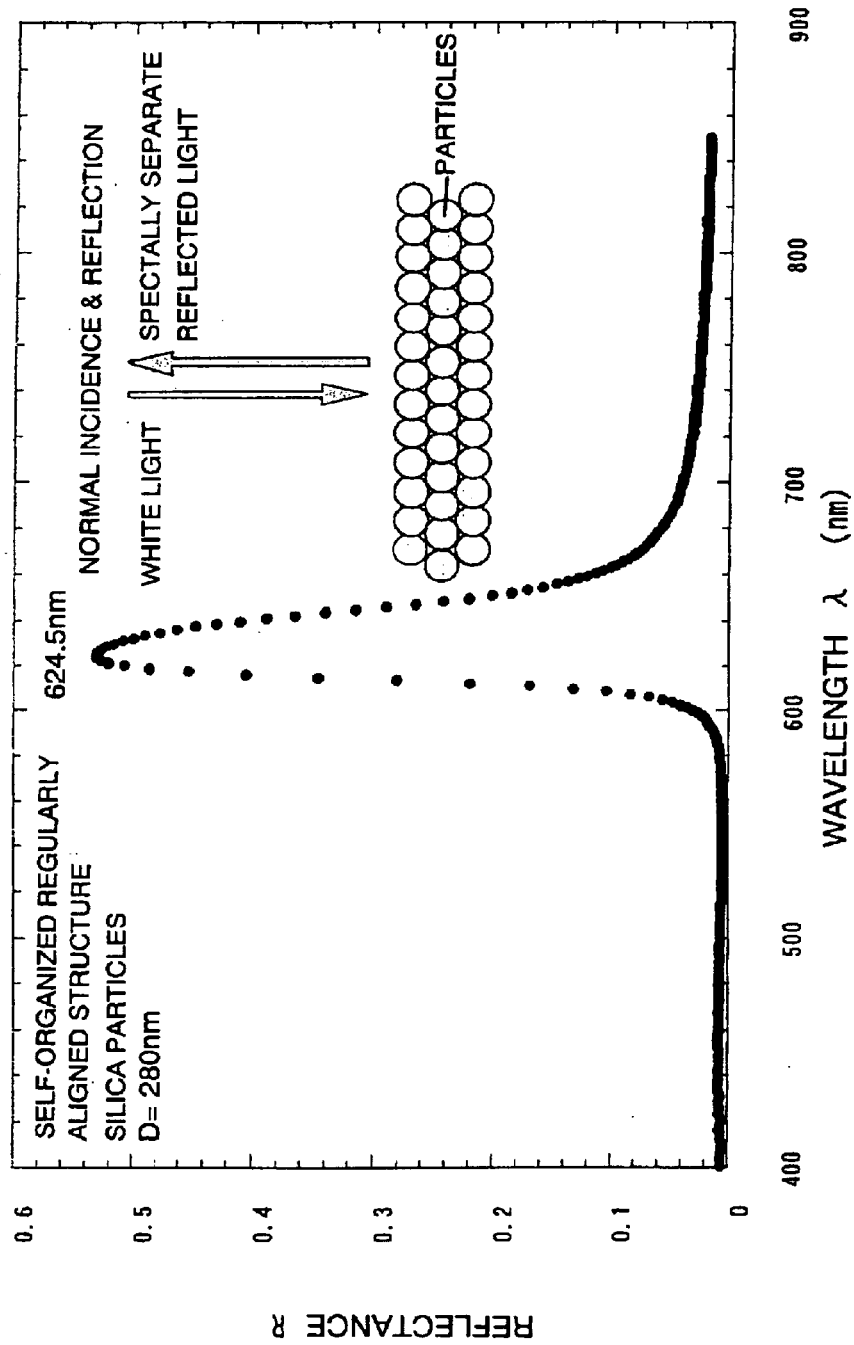
FIG. 5 is a schematic diagram that shows a reflection spectrum of regularly aligned particles.
Figure 6A:
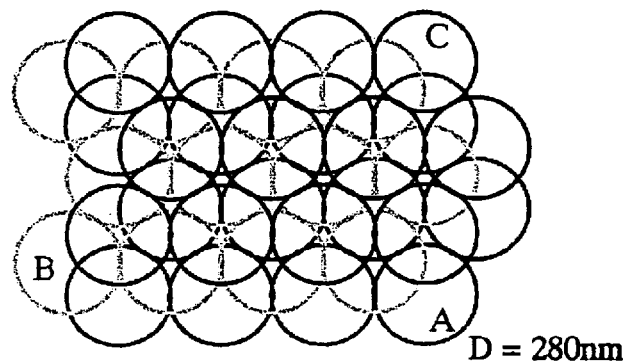
FIGS. 6A through 6C are schematic diagrams for explaining a close-packed structure.
Figure 6B:
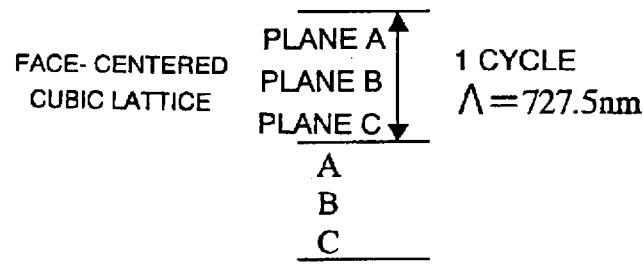
Figure 6C:
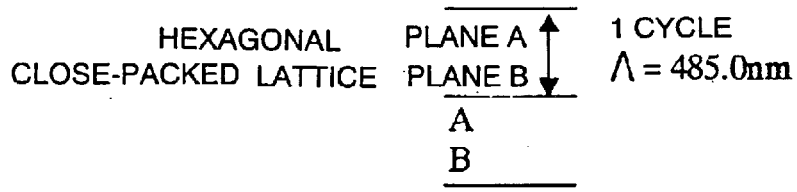

Although the manufacturing method will be explained later in greater detail, FIG. 5 shows measured reflection spectrums of silica particles (diameter D=280 nm) regularly aligned into a close-packed structure by self-organization. In this measurement, however, white light is introduced normally to the particle layer, and normally reflected light is calculated. Through observation by scanning electron microscopy (SEM), it is assumed that particles form a close-packed structure of face-centered cubic lattice or a close-packed hexagonal lattice as shown in FIGS. 6A, 6B and 6C by self-organization. In FIG. 5, a peak is observed near the wavelength 625 nm. It is also observed that the maximum reflectance is relatively as low as ~54% and the full width at half maximum is as narrow as ~30 nm. This reflection is Bragg's reflection by regularly aligned particles. In this manner, the Bragg's reflection occurs due to the periodical structure of the same unit period (<1 µm) as the wavelength order of visible light.

The Bragg's reflection will be explained below in greater detail.

In a close-packed structure, there are three patterns of alignment A, B and C as shown in FIG. 6A. In case of a face-centered cubic lattice, the patterns are stacked in the order of A, B, C, A, B, C, . . . as shown in FIG. 6B. If the particle diameter is D=280 nm, the period is $\Lambda$=727.5 nm. In case of a hexagonal close-packed lattice, however, since the patterns are stacked in the order of A, B, A, B, . . . as shown in FIG. 6C, the period is $\Lambda$=485.0 nm. Taking them into account, wavelengths satisfying the Bragg's condition ($\lambda=2n\Lambda/m$) can be estimated by calculation as shown in Table 1. The mode refractive index n employed here was ~1.3.

TABLE 1

| m | Face-centered Cubic Lattice $\lambda$ (nm) | Hexagonal Close-packed Lattice $\lambda$ (nm) |
|---|---|---|
| 1 | 1891 | 1261 |
| 2 | 946 | 630 |
| 3 | 630 | 420 |
| 4 | 473 | 315 |

The calculation gives two candidates as values nearest to 625 nm. That is, it is shown that intensive peaks observed in the reflection spectrums are the tertiary Bragg's reflection of the face-centered cubit lattice or the secondary Bragg's reflection of the hexagonal close-packed lattice. This means that Bragg's reflection has been confirmed by regular alignment of particles stacked by self-organization.

Figure 7:
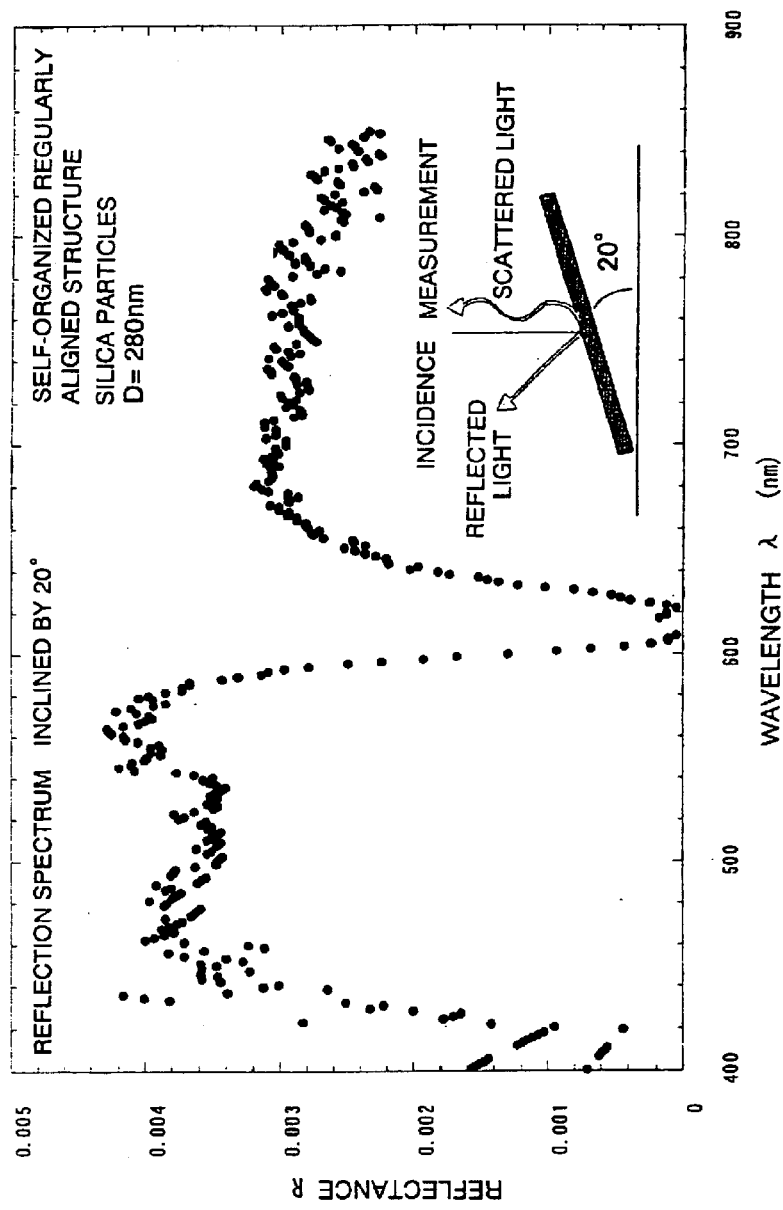
FIG. 7 is a schematic diagram that shows spectrums of scattered light of regularly aligned particles.
Figure 8:
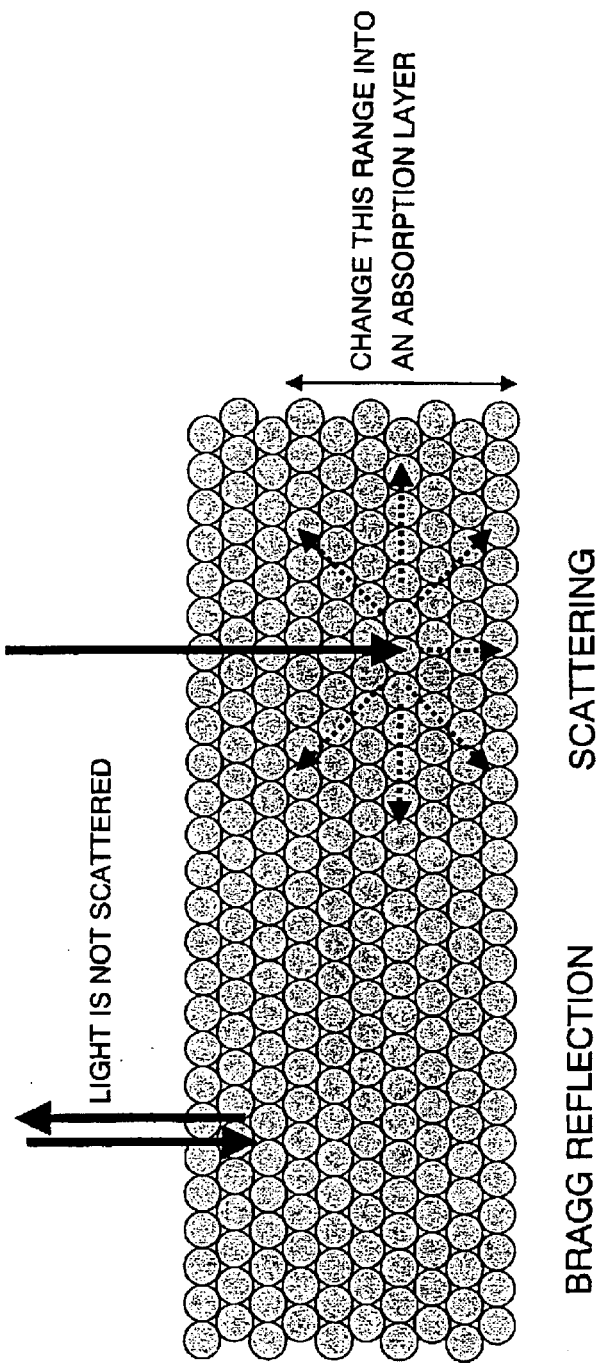
FIG. 8 is a schematic diagram for explaining a reason why light of a specific wavelength is reflected.

FIG. 7 shows measured spectrums of light scattered by the particle layers, which were obtained by inclining the sample surface by 20°. In this case, a reciprocal pattern (dip structure) is confirmed, in which almost no light of wavelengths near 625 nm is reflected. This indicates that scattered light is suppressed by strong Bragg's reflection. This phenomenon can be explained as follows. As shown in FIG. 8, light of wavelengths near 625 nm suffers strong Bragg's reflection near the surface of the particle layer, and cannot travel deeper. Therefore, its scattering is weak, and only the Bragg's reflection is strongly received. On the other hand, light of wavelengths other than 625 nm, which is free from Bragg's reflection and can travel deeper, results in being scattered.

Figure 9:
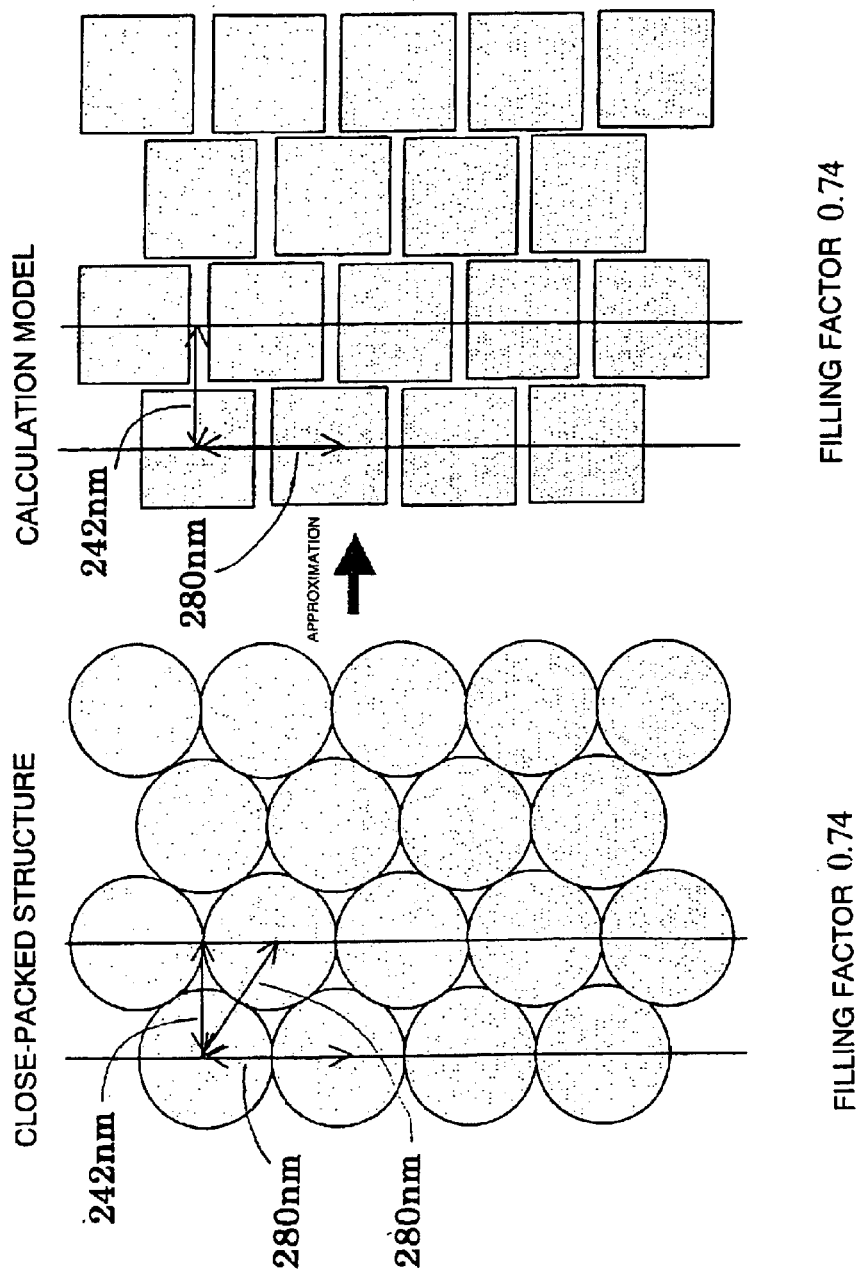
Figure 10:
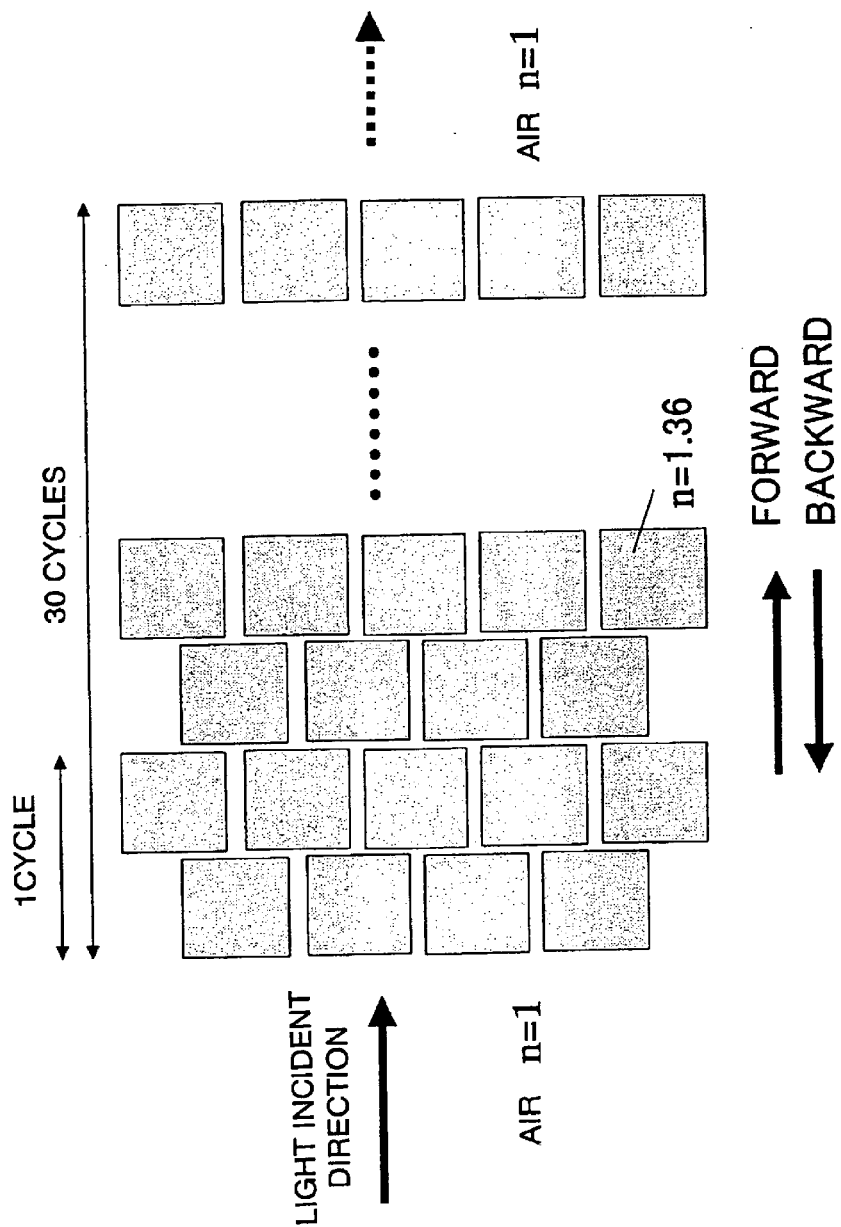
Figure 12A:
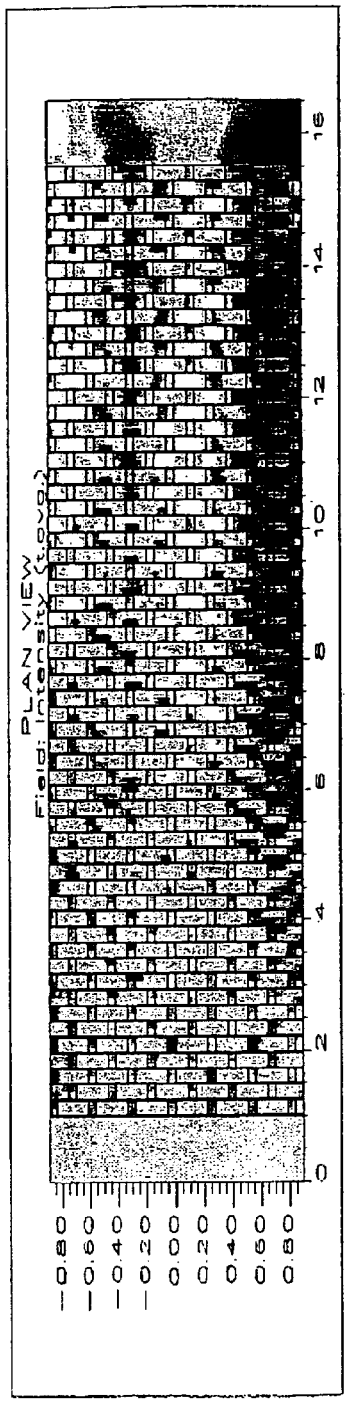
Figure 12B:
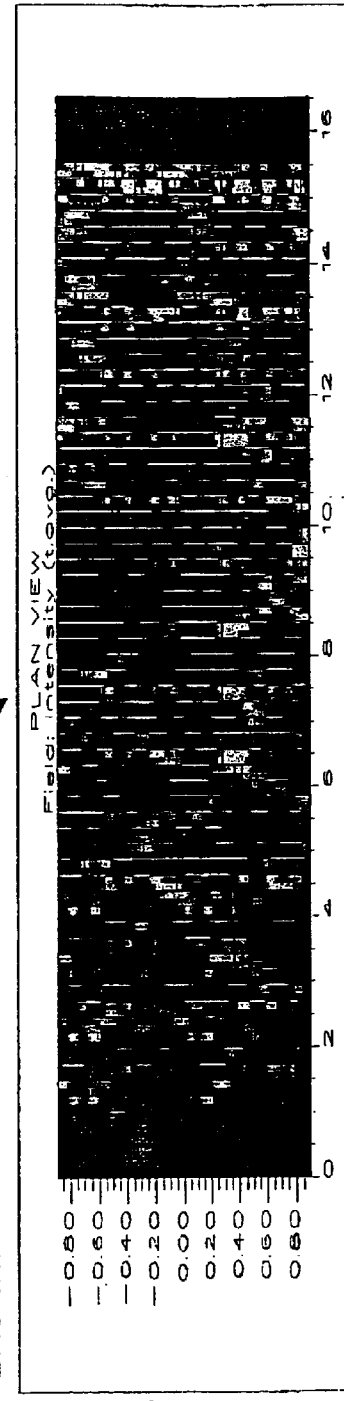
Figure 13A:
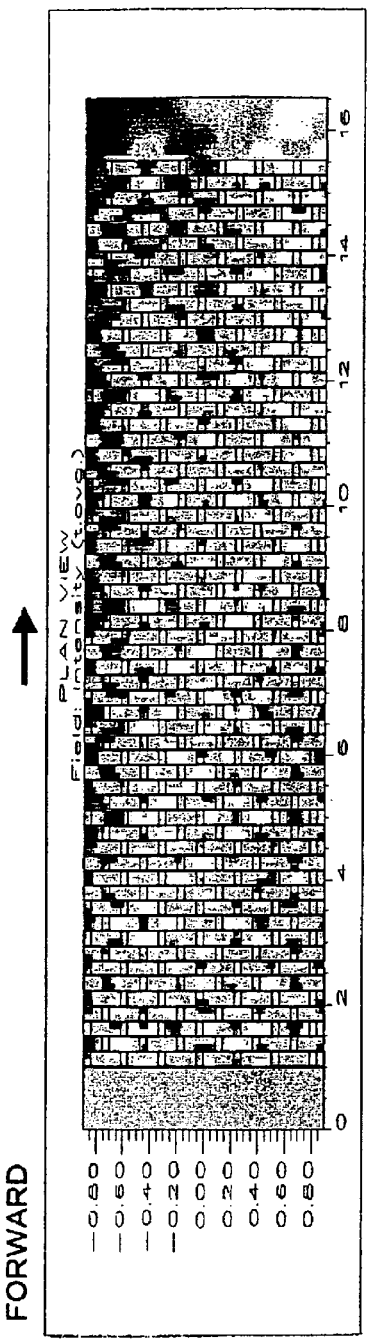
Figure 13B:
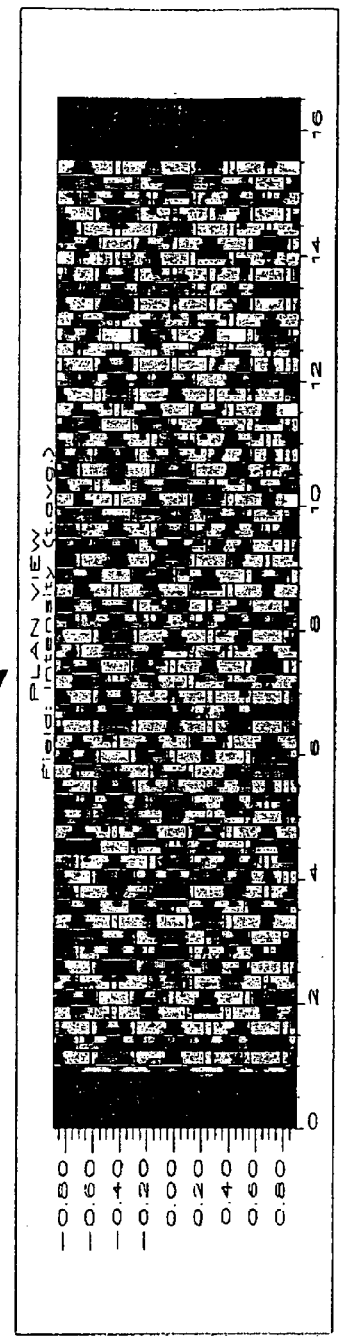
Figure 14A:
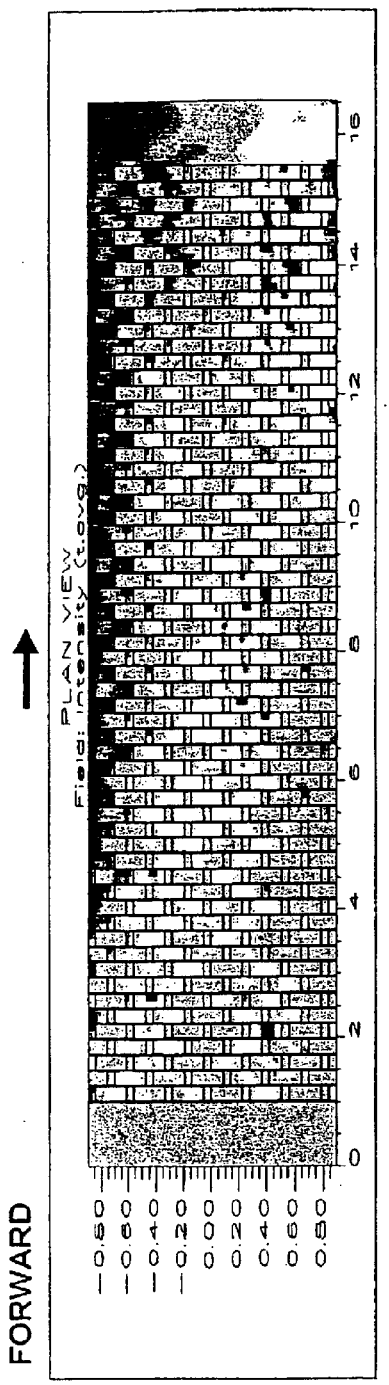
Figure 14B:
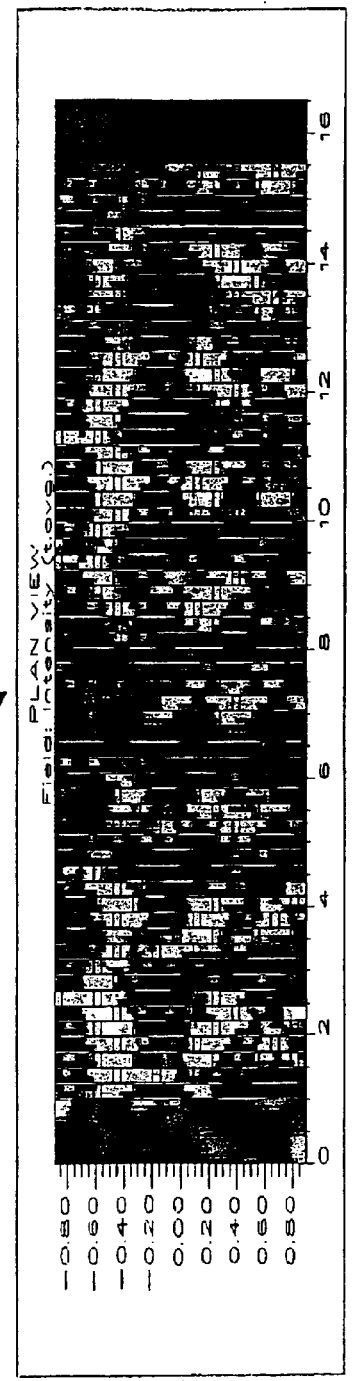
Figure 16A:
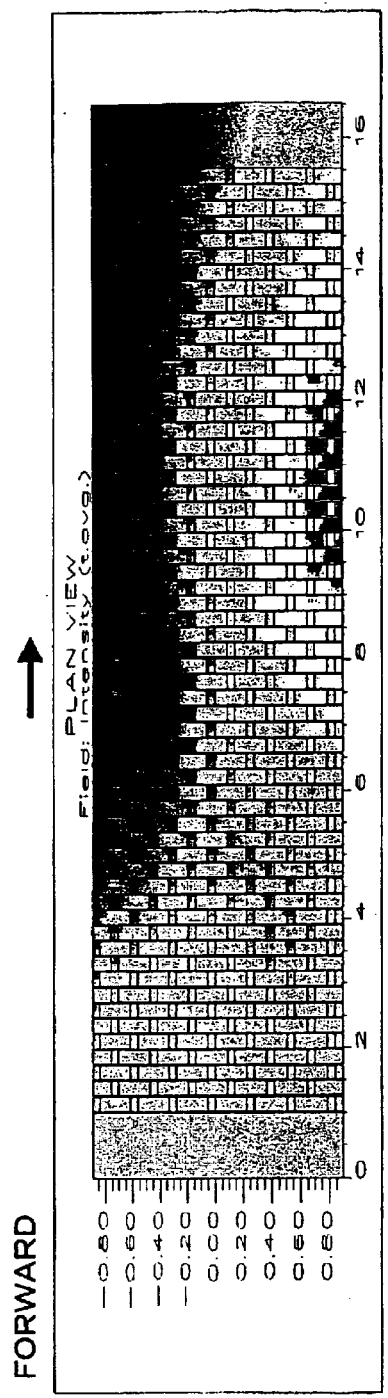
Figure 16B:
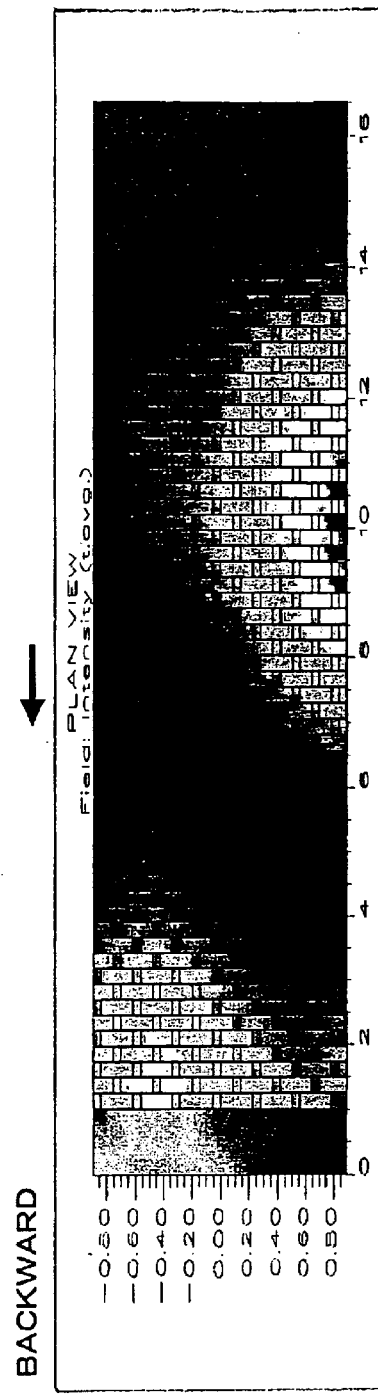
Figure 18A:
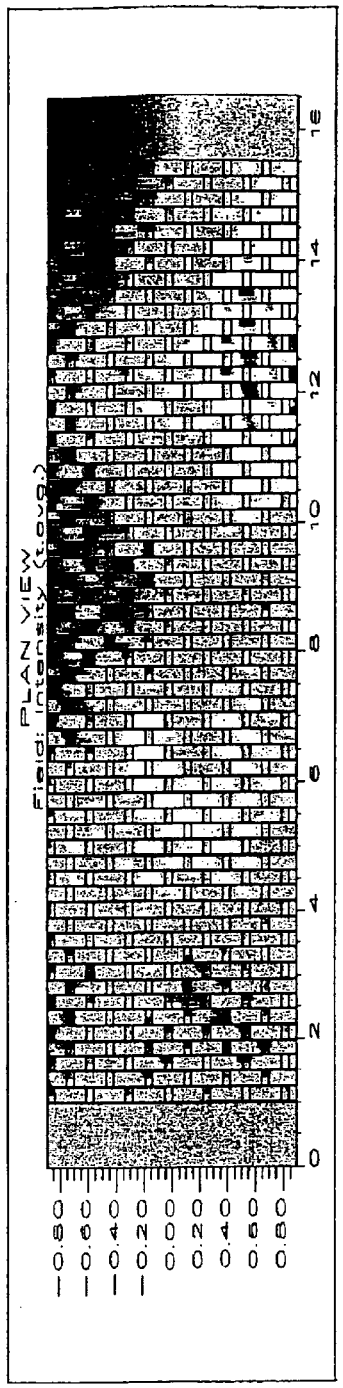
Figure 18B:
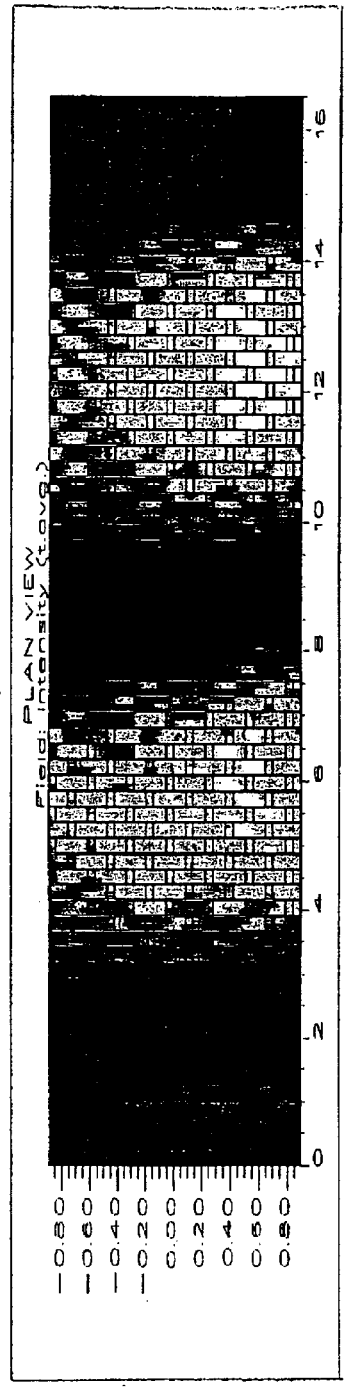
Figure 20B:
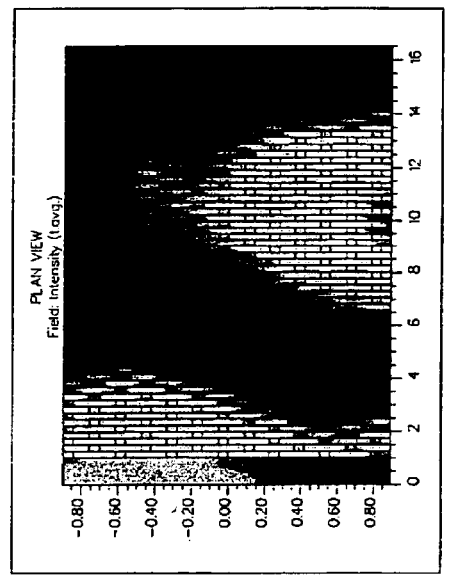
Figure 20A:
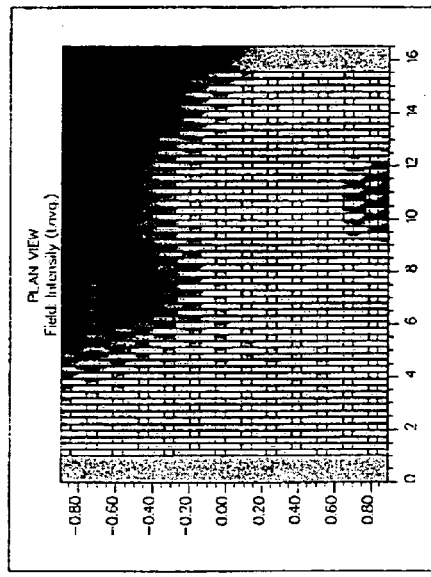
Figure 21B:
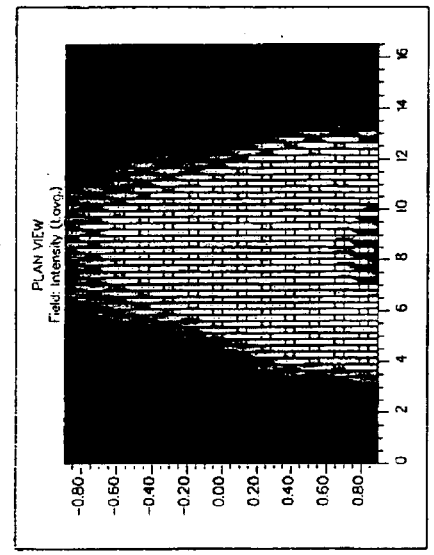
Figure 21A:
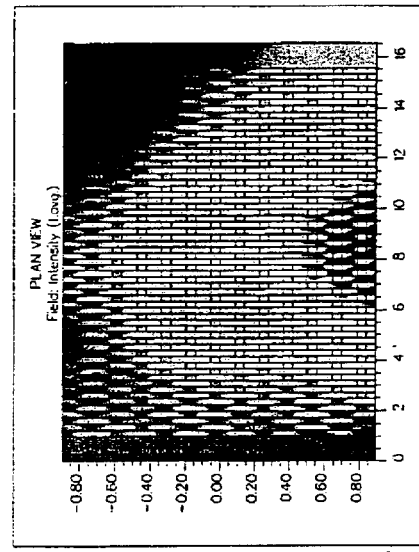
Figure 22A:
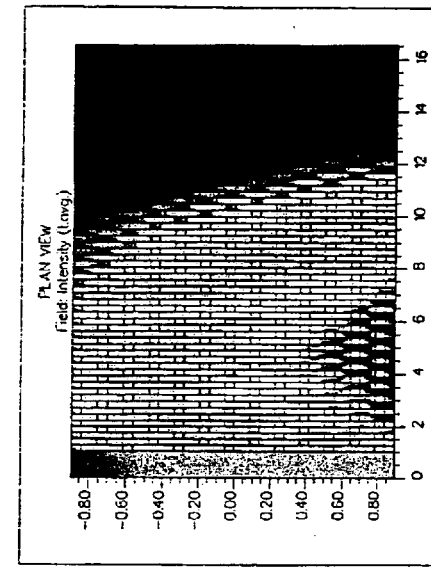
Figure 22B:
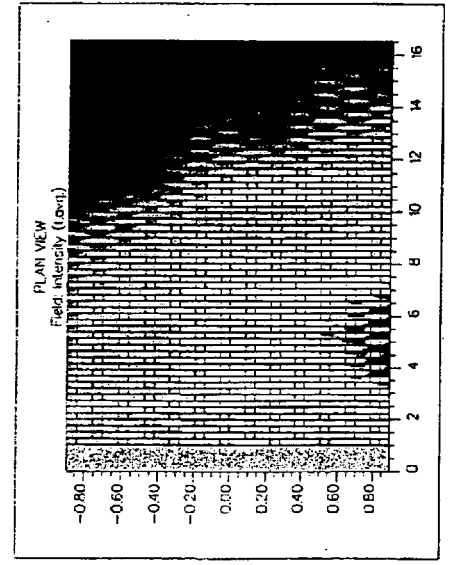
Figure 23A:
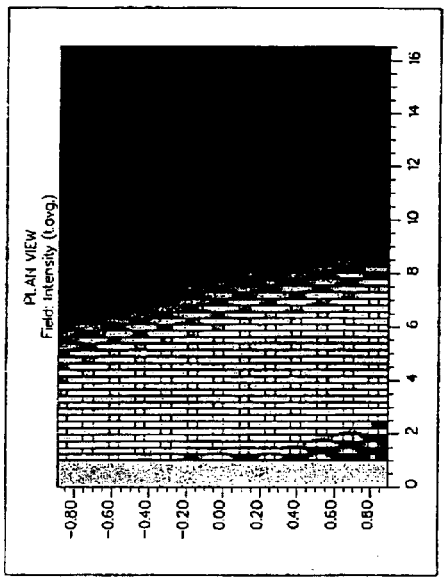
Figure 23B:
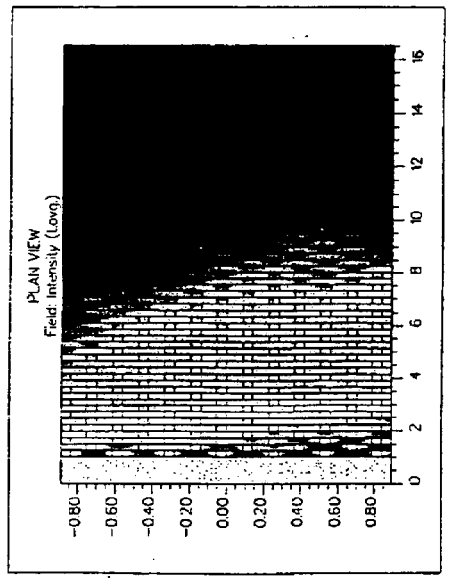
Figure 24B:
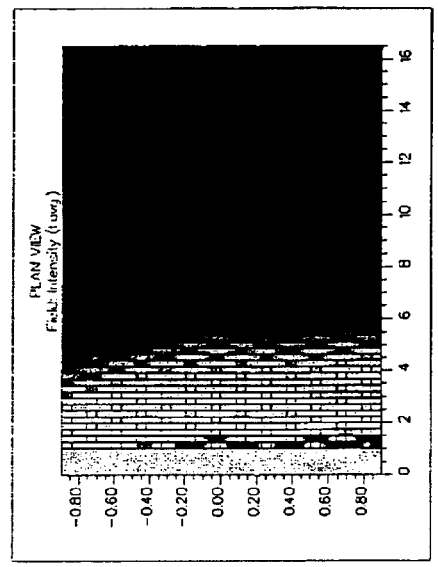
Figure 24A:
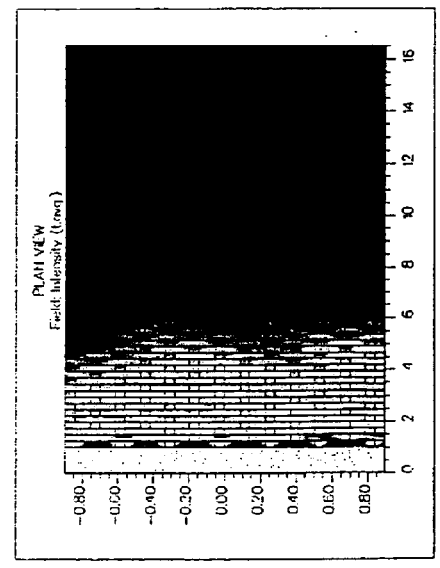
Figure 25A:
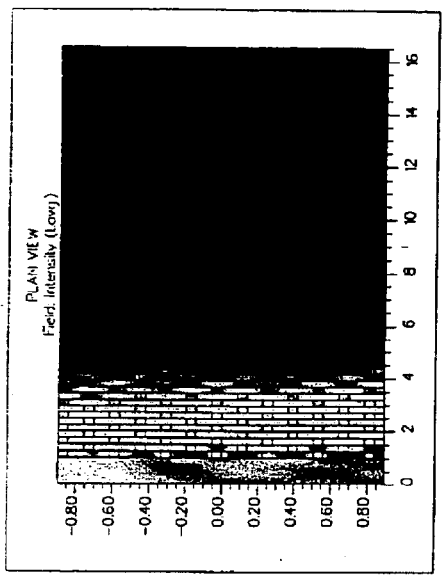
Figure 25B:
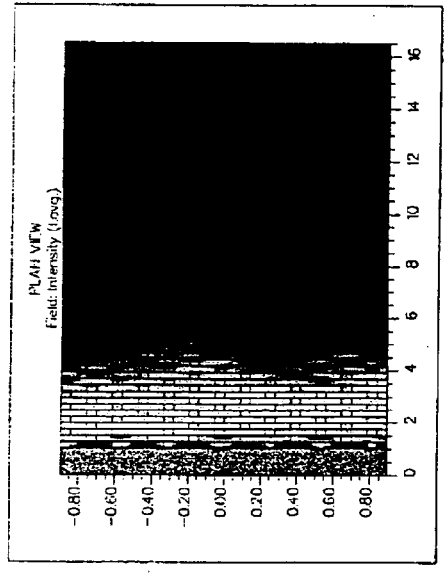
Figure 26A:
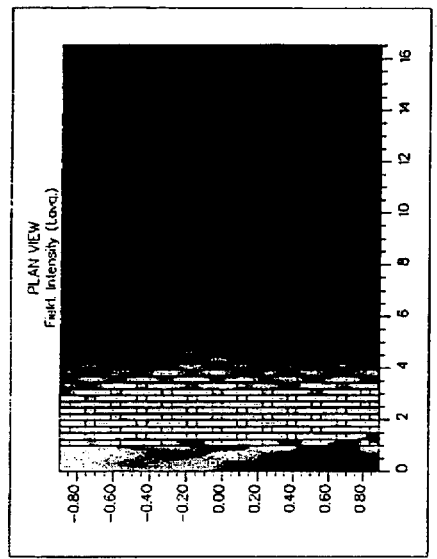
Figure 26B:
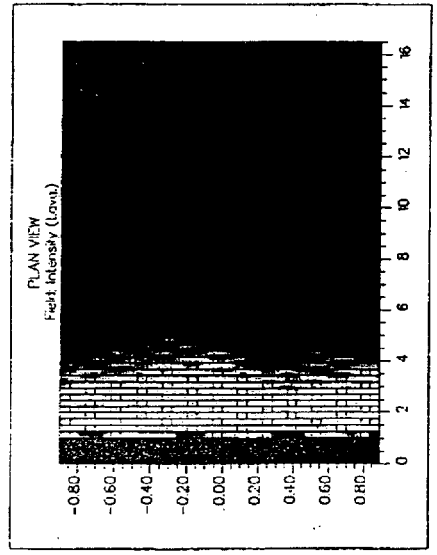
Figure 27B:
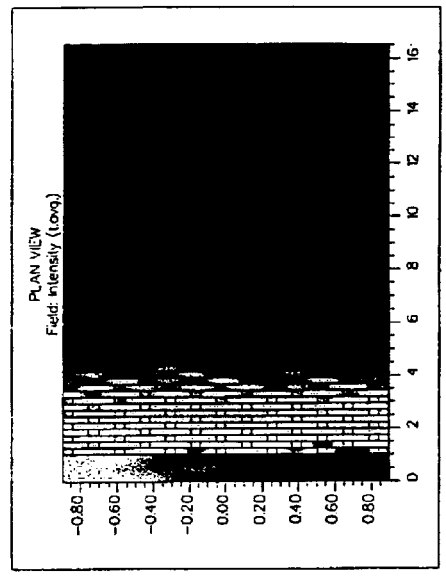
Figure 27A:
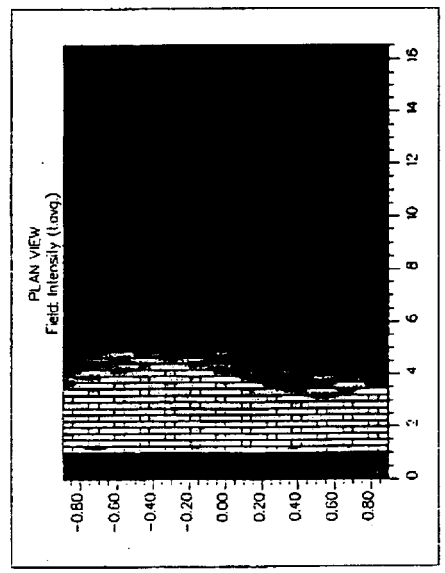
Figure 28B:
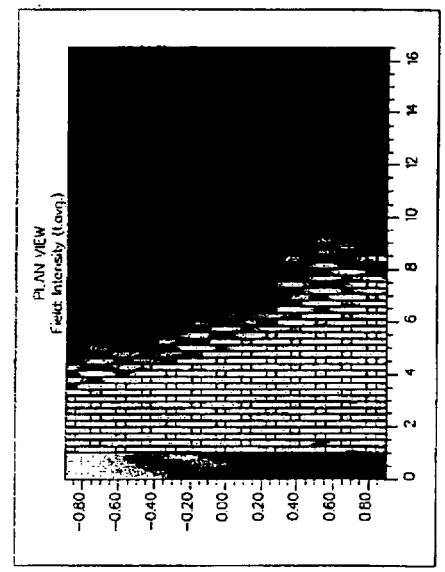
Figure 28A:
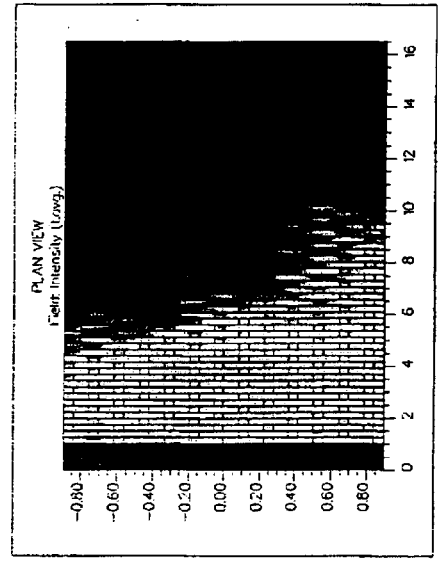
Figure 29B:
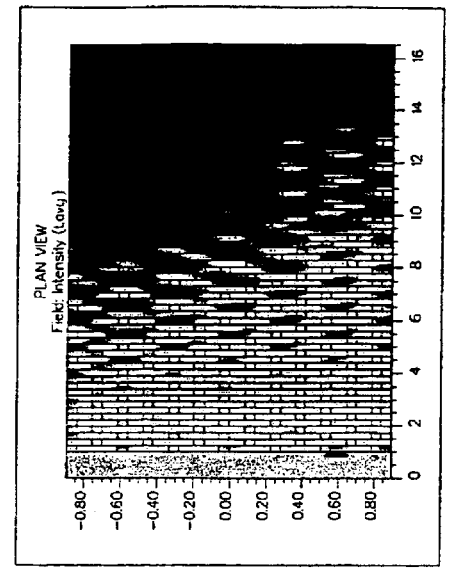
Figure 29A:
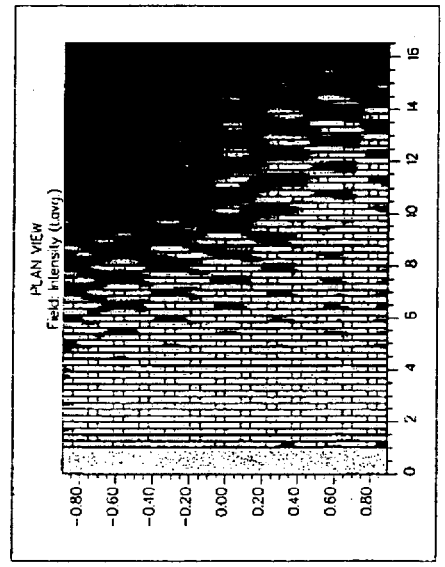
Figure 30B:
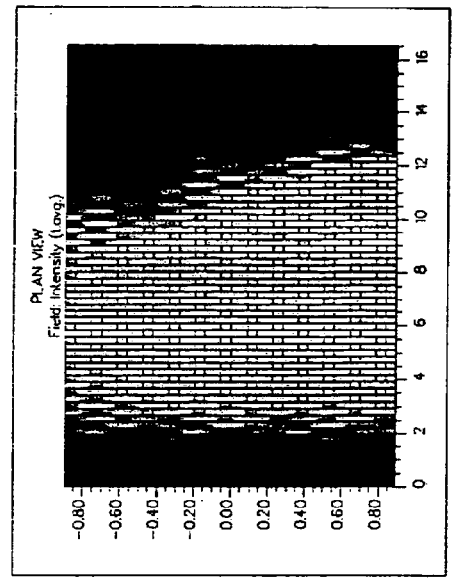
Figure 30A:
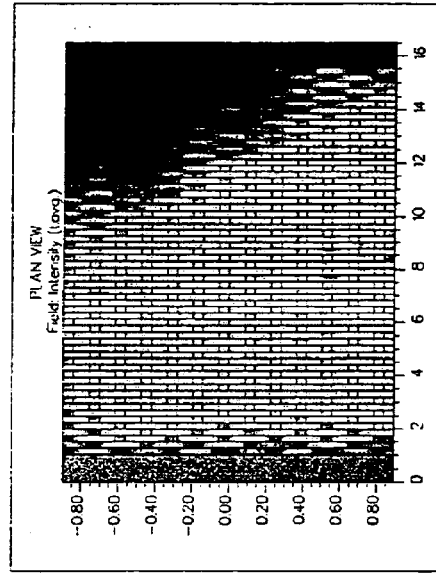
Figure 31B:
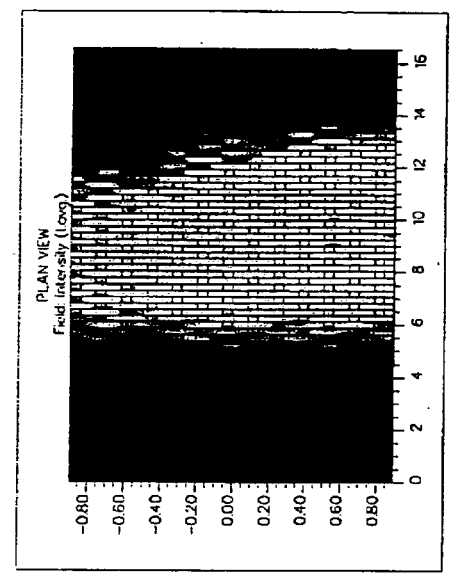
Figure 31A:
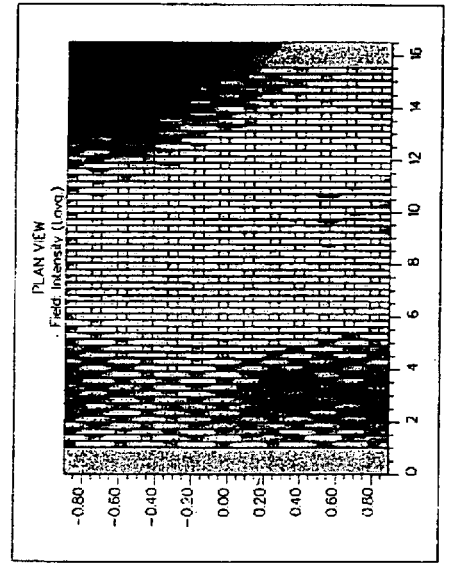

Additionally, using the particles aligned into the close-packed structure referred to above, wavelength bands exhibiting strong reflection of light were estimated by light field calculation using a Maskwell equation. Note here that, while each actual particle had a round shape as shown in FIG. 9A, calculation was carried out by approximating each particle into an approximately square shape as shown in FIG. 9B. In the calculation, lateral (x) and vertical (y) intervals of square-shaped particles were assumed to be equal to those of round-shaped particles (x=242 nm, y=280 nm). Both were equalized also in filling coefficient. Refractive index of the particles was assumed to be n=1.36, and taking account of the thickness of the samples, their stacking cycles were assumed to be 30 cycles (FIG. 10). Results of the calculation are shown in FIGS. 11 through 19. Density distribution of light was calculated here by dividing the light entering into the particle layer from the left in the figure into the part traveling in the forward direction (from left to right in the figure as being indicated as "FORWARD" as well) and the other part traveling in the opposite direction (from right to left in the figure as indicated as "BACKWARD" as well). Note, however, that these density distribution diagrams were prepared by first printing color images with a color printer and then copying them with a black-and-white copying machine and that densities do not always correspond to densities of light (also in the description made below). Furthermore, because of the constraint of the sheet size, the images are downsized in the lateral direction. The results shown in FIGS. 11 through 19 demonstrate that in the light of the wavelengths 470 nm, 500 nm, 525 nm, 540 nm, 580 nm, 600 nm, 645 nm and 675 nm, only the part traveling in the forward direction strongly exists, and the light reaches the right end of the particle layer and then exits rightward from its surface. In contrast, the part of the light traveling in the opposite direction exists merely inside the bulk, and even though it reaches the left end of the particle layer, almost no light exits leftward from its surface. However, as shown in FIG. 17, in the light of the wavelength 625 nm, the part traveling in the opposite direction is strongly generated near the surface, and light intensively exits leftward from is surface. It is also appreciated that, because of intensive light traveling in the opposite direction, the light in the forward direction does not enter ahead from the surface to a depth beyond 8 through 15 cycles. Especially, 11 cycles or so are considered to be the boundary. These results coincide with the result of an experiment, which demonstrates that intensive reflection occurs with light of wavelengths near 625 nm. FIGS. 20 through 31 show results of detailed analysis using wavelengths near 625 nm. These results demonstrate that reflection occurs with wavelengths in the range from 605 nm to 632 nm, and they coincide well with the result of the experiment that the full width at half maximum of the reflectance peak was as narrow as ~30 nm (FIG. 5). A possible reason of the narrow full width at half maximum of the reflectance peak by particles as compared with the multi-layered film may be that, in case of particles, Bragg's reflection occurs also in the lateral direction and leads to a strong effect of confinement. Additionally, in case of the light having the wavelength of 625 nm causing Bragg's reflection, the light cannot enter beyond 8 through 15 cycles from the surface, and this corresponds to the fact that scattered light is suppressed.

Figure 32:
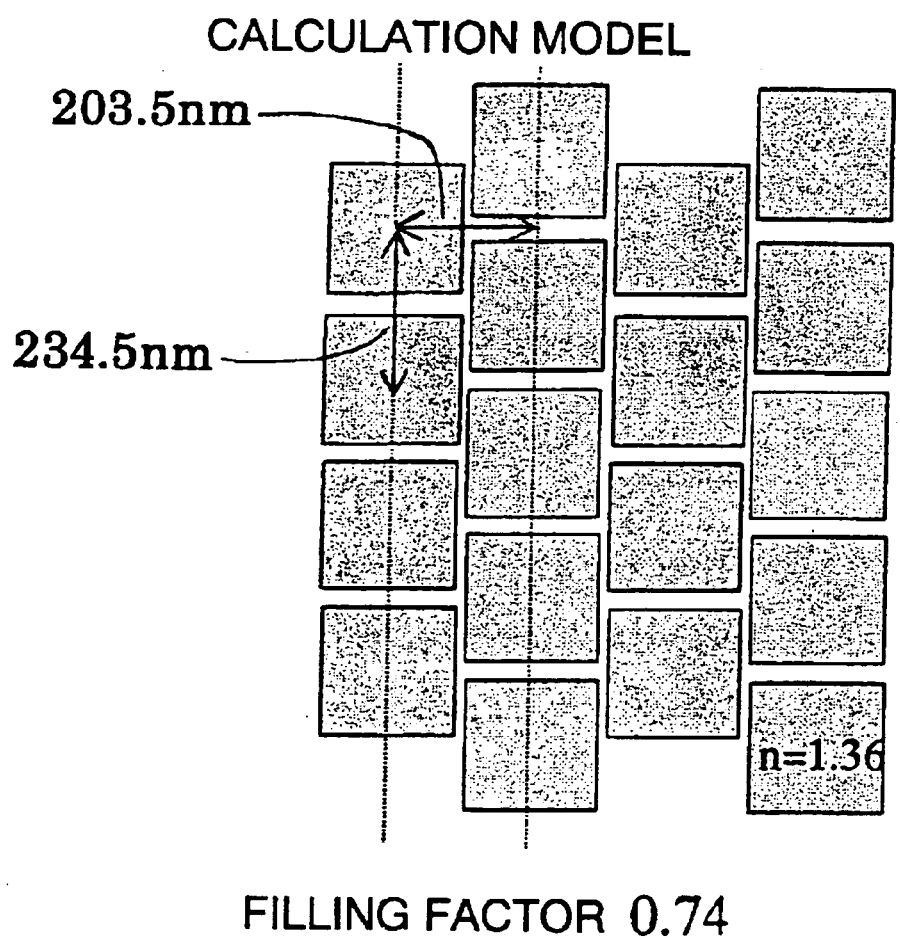
FIG. 32 is a schematic diagram that shows a model used for calculation of a light field of particles for green reflection.
Figure 33A:
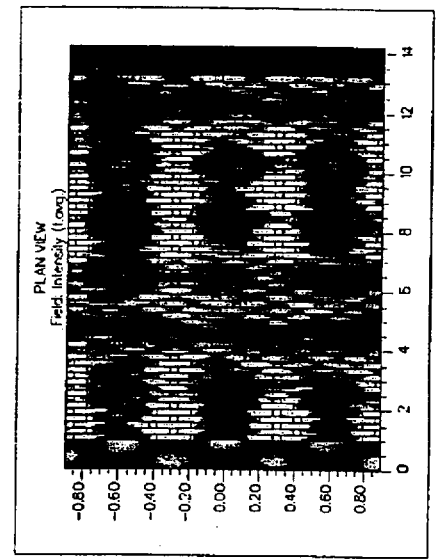
FIGS. 33A through 39B are schematic diagrams that show results of calculation of light fields of particles for green reflection.
Figure 33B:
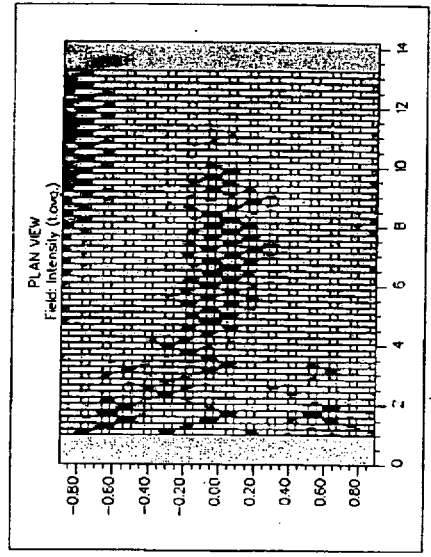
Figures 34A, 34B:
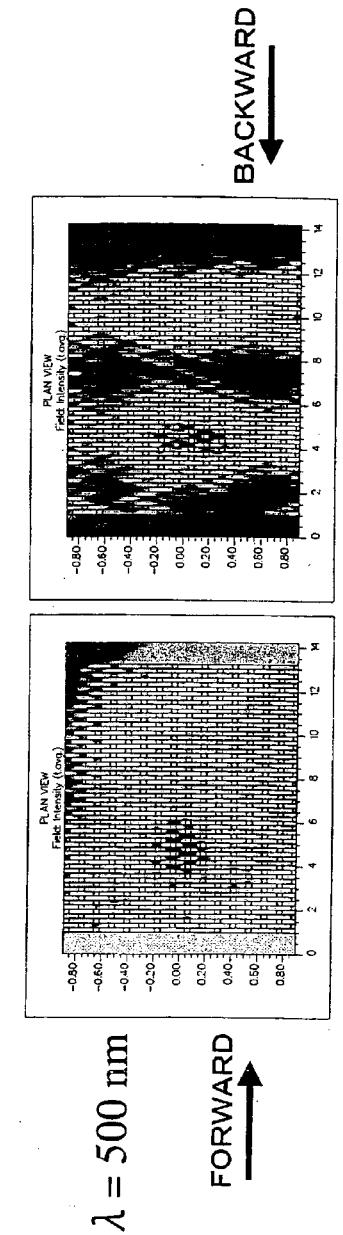
Figure 35B:
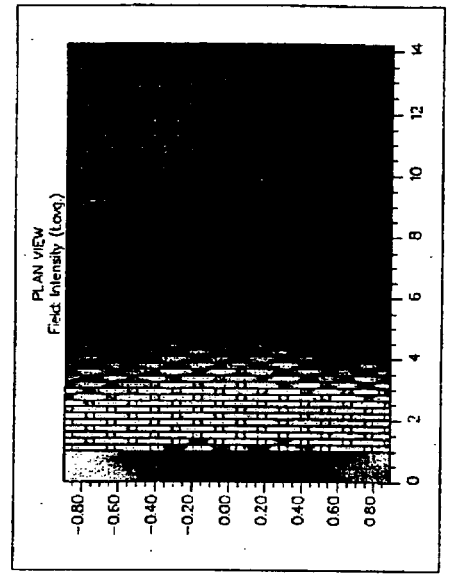
Figure 35A:
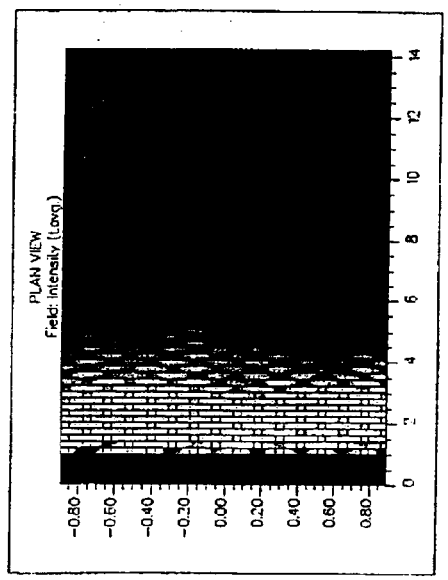
Figure 36B:
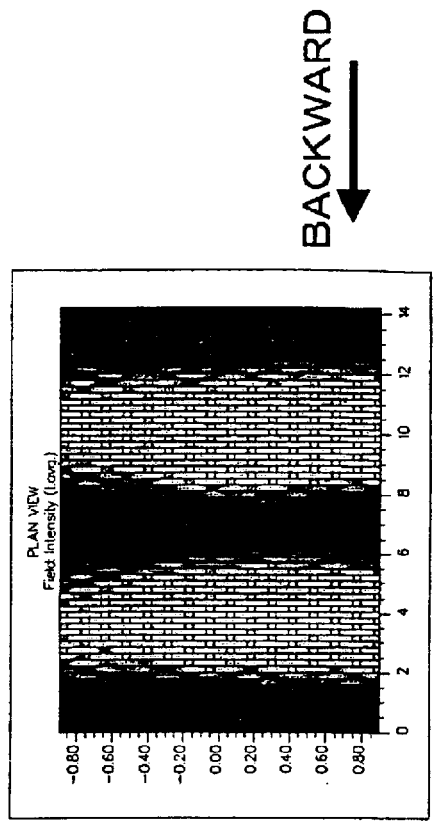
Figure 36A:
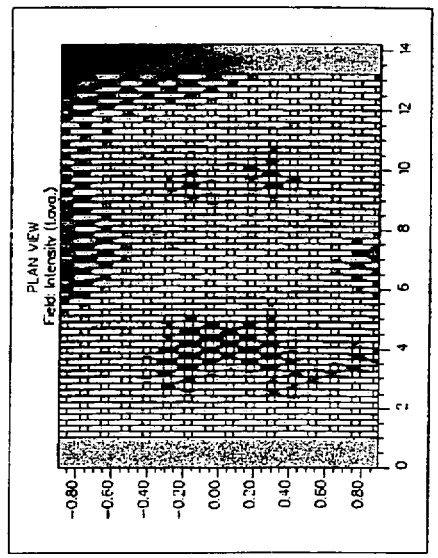
Figure 37B:
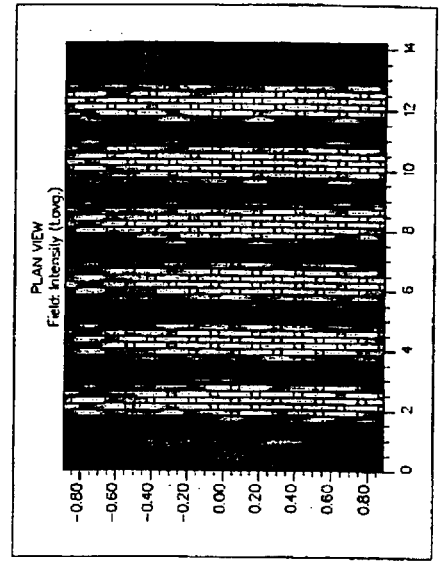
Figure 37A:
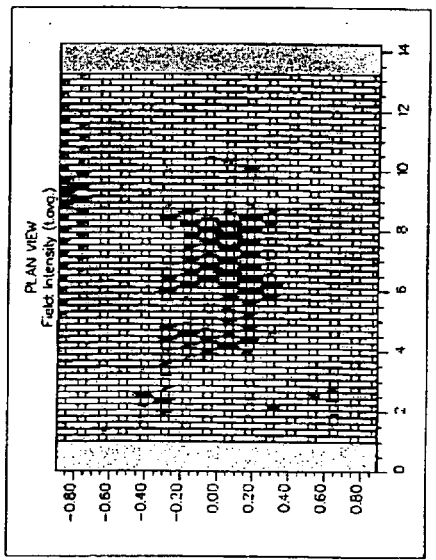
Figure 38B:
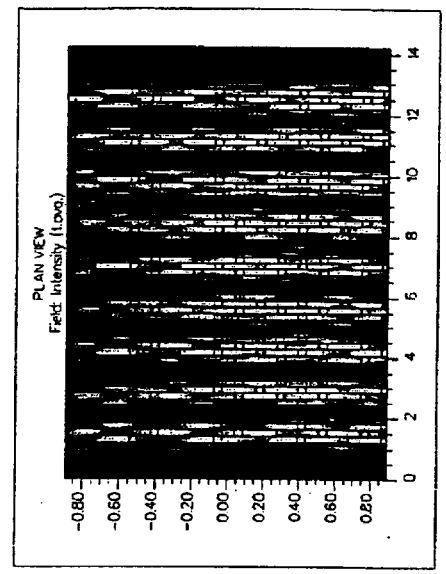
Figure 38A:
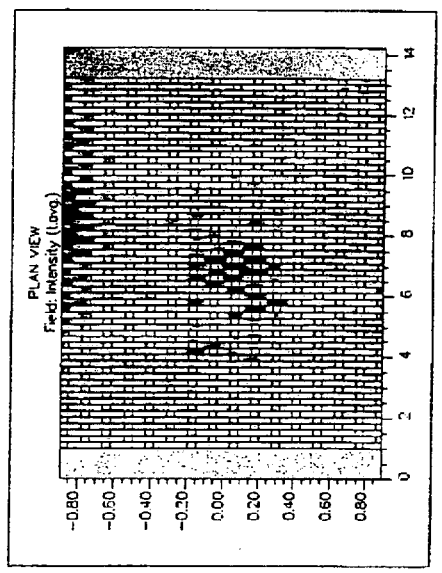
Figure 39B:
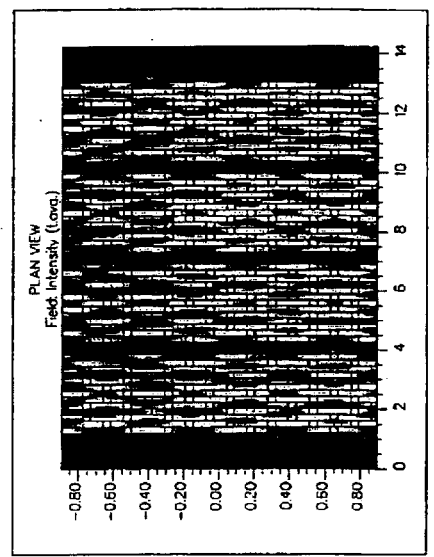
Figure 39A:
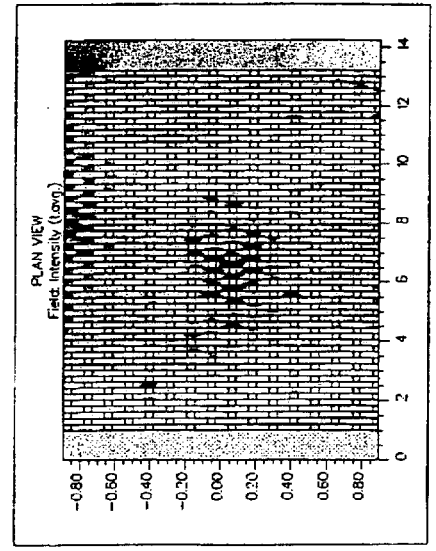
Figure 40:
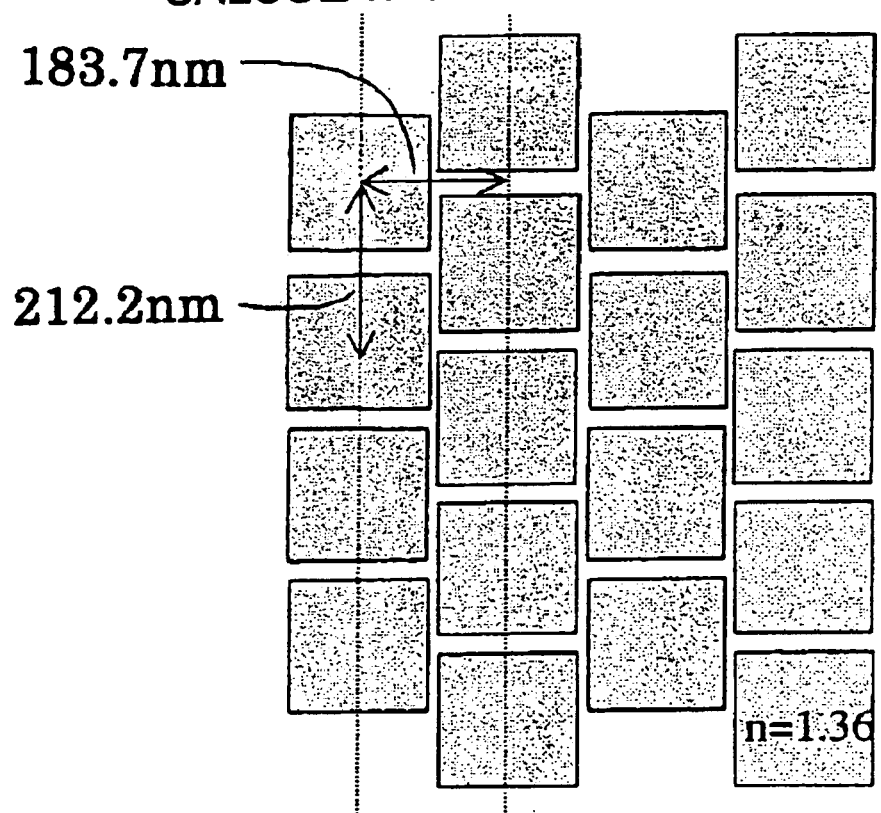
FIG. 40 is a schematic diagram that shows a model used for calculation of a light field of particles for blue reflection.
Figure 41A:
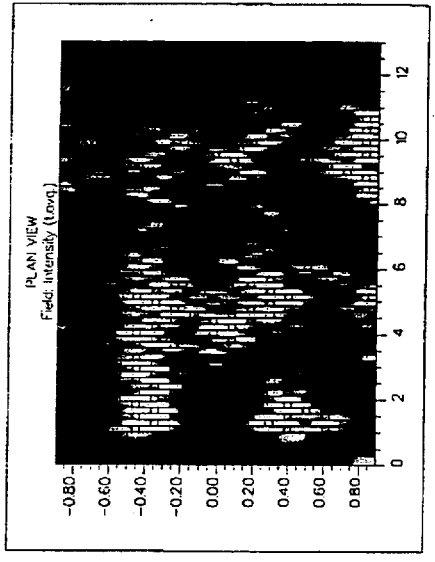
FIGS. 41A through 47B are schematic diagrams that show results of calculation of light fields of particles for blue reflection.
Figure 41B:
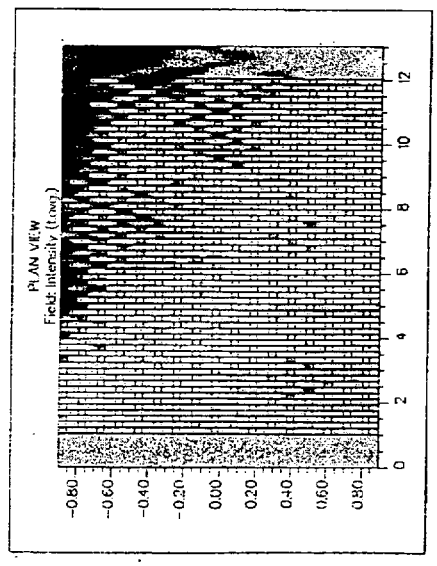
Figure 42B:
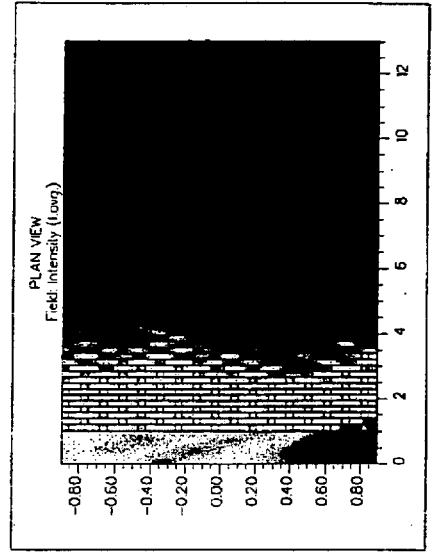
Figure 42A:
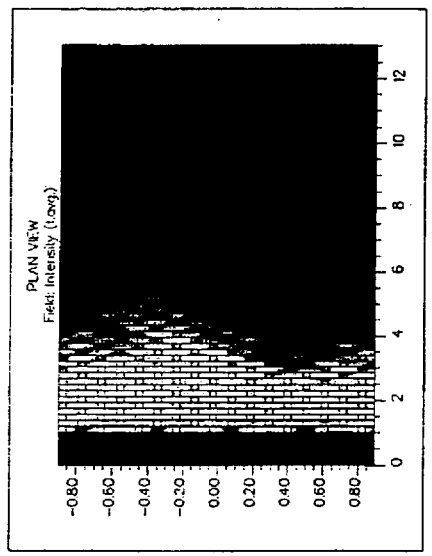
Figure 43B:
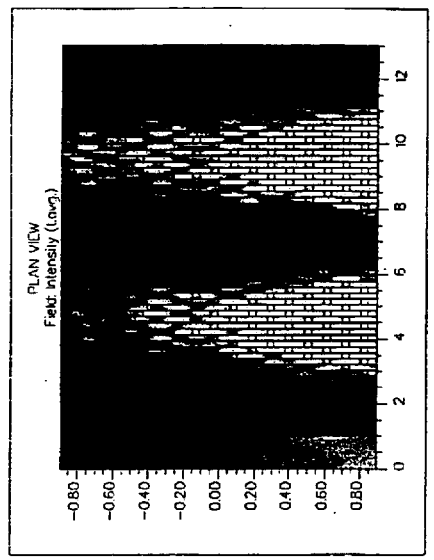
Figure 43A:
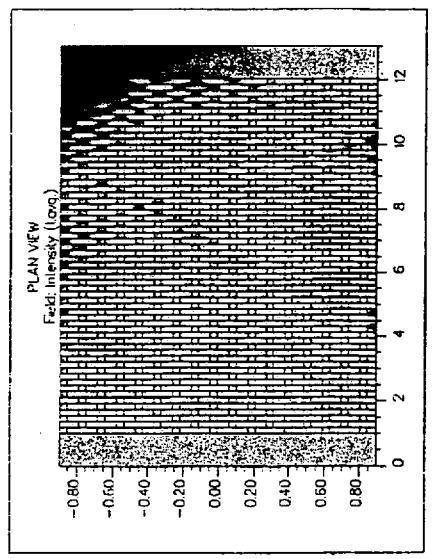
Figure 44B:
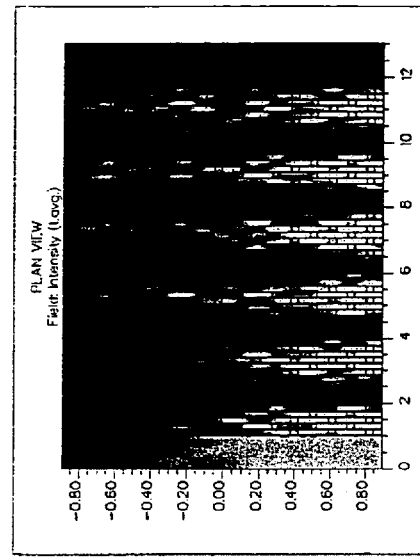
Figure 44A:
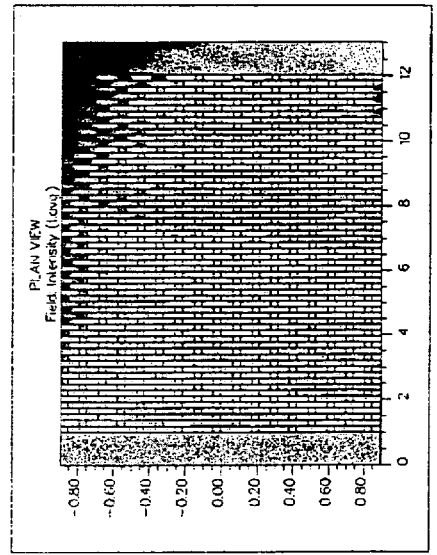
Figure 45A:
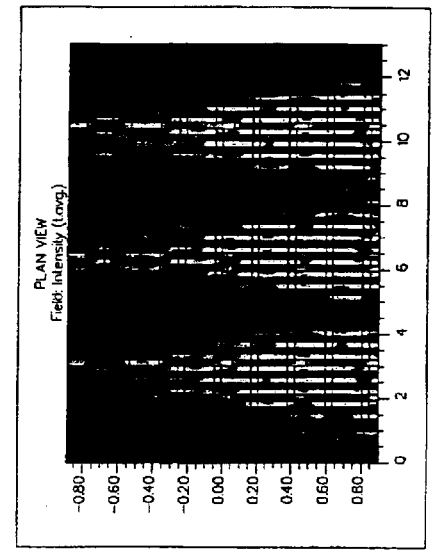
Figure 45B:
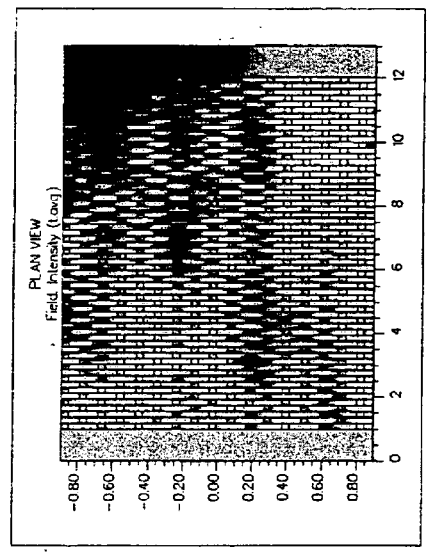
Figure 46B:
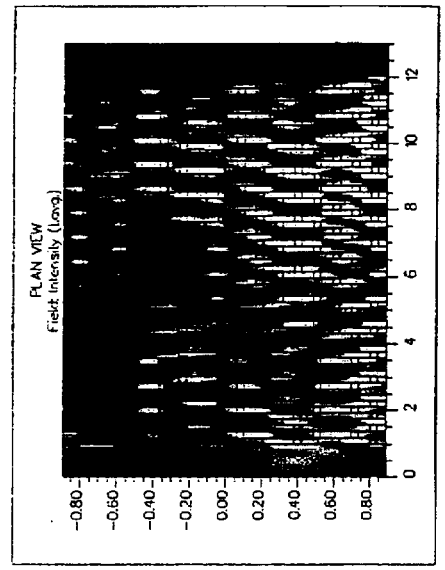
Figure 46A:
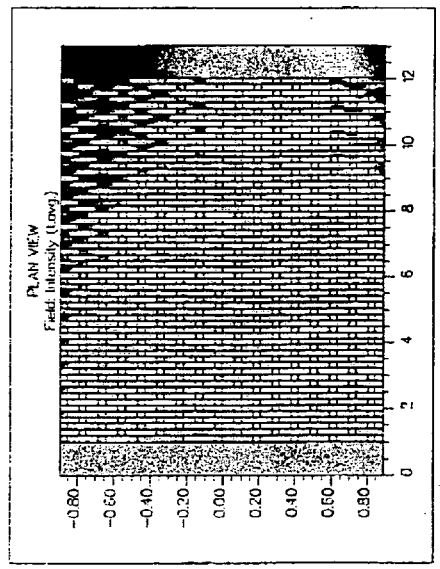
Figure 47A:
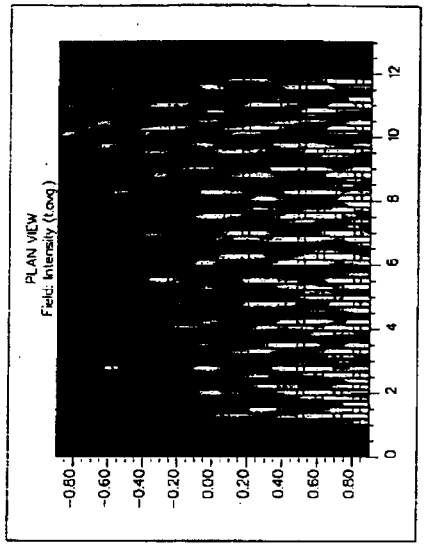
Figure 47B:
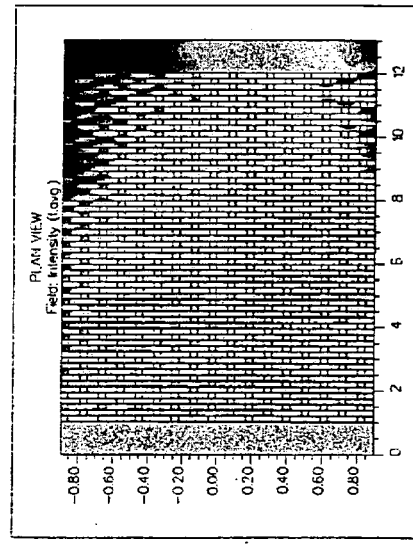

Next explanation is directed to how green and blue light is reflected. Since the diameter D of each particle and the wavelength $\lambda$ of light reflected by the particles are approximately proportional, if the wavelength of light to be reflected is $\lambda_0$, then the diameters D=235 nm and D=212 nm are obtained respectively for green ($\lambda_0$=525 nm) and blue ($\lambda_0$=475 nm) from the relation $\lambda_0$=625 nm relative to D=280 nm. For respective cases, calculation of light fields was conducted. A model of green reflection is shown in FIG. 32, and results of the calculation are shown in FIGS. 33 through 39. A model of blue reflection is shown in FIG. 40, and results of the calculation are shown in FIGS. 41 through 47. These results demonstrate that strong reflection occurs only with the wavelength of 525 nm for green reflection and 475 nm for blue reflection, respectively, and that the light travels deep approximately to 8 through 15 cycles similarly to red reflection.

Figure 48:
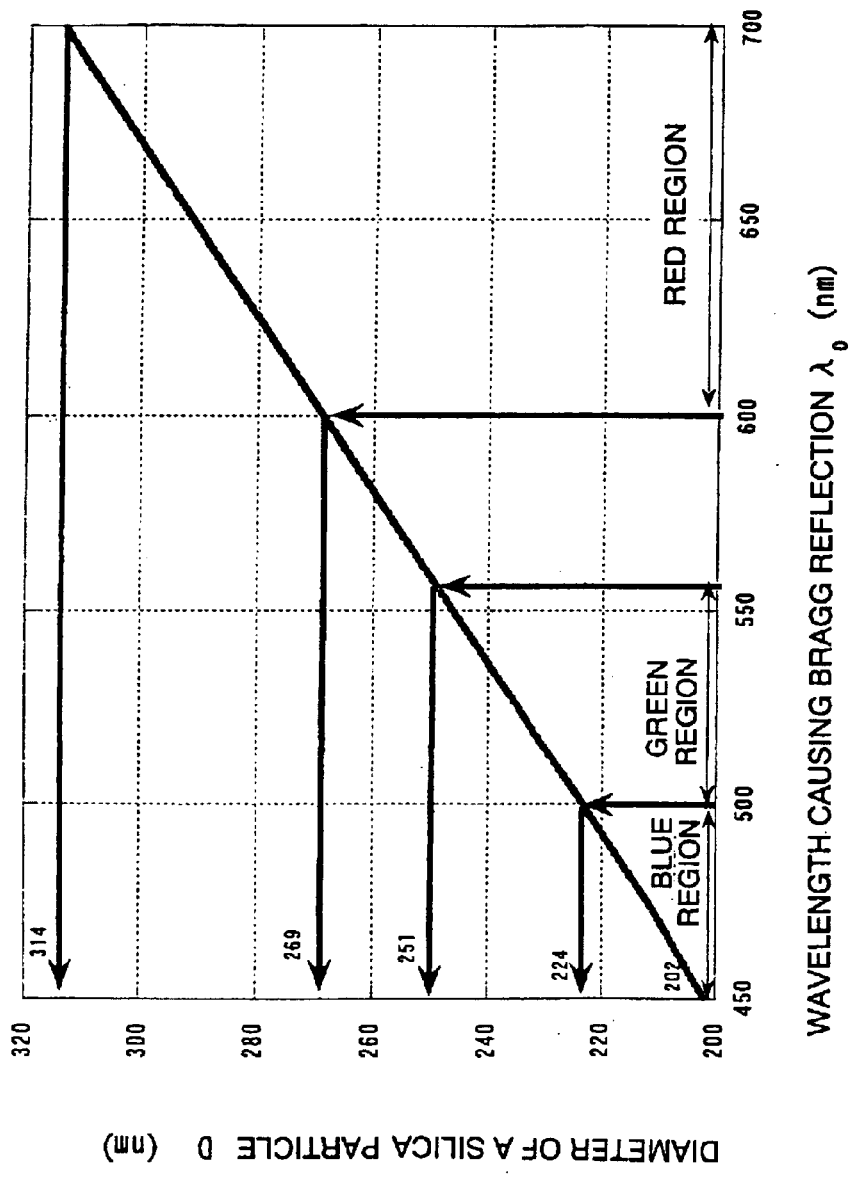
FIG. 48 is a schematic diagram that shows a relation between the diameter of a silica particle and the wavelength inviting Bragg reflection.

Since the diameter D of the particle and the wavelength $\lambda$ are substantially proportional, they exhibit the relation shown in FIG. 48. Here is shown that the diameter is D=202~224 nm for blue reflection, D=224~251 nm for green reflection and D=269~314 nm for red reflection. Especially for pure three primary colors on a chromaticity diagram, D=208~217 nm with $\lambda_0$=475±10 nm for blue reflection, D=224~237 nm with $\lambda_0$=515±15 nm for green reflection, and D=278~305 with $\lambda_0$=650±30 nm.

Figure 49:
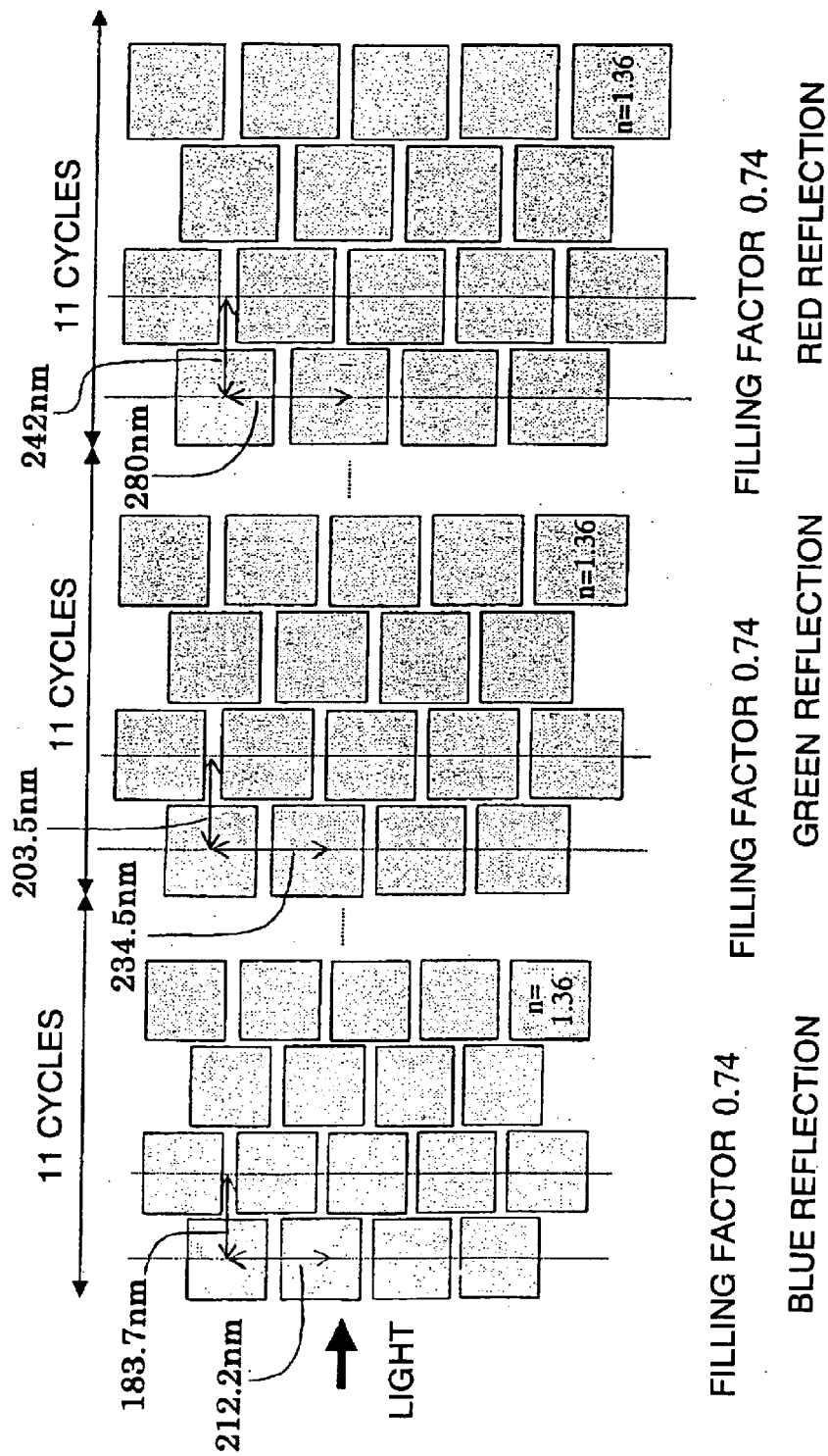
FIG. 49 is a schematic diagram that shows a model used for calculation of a light field of particles for reflection of three primary colors.
Figure 50A:
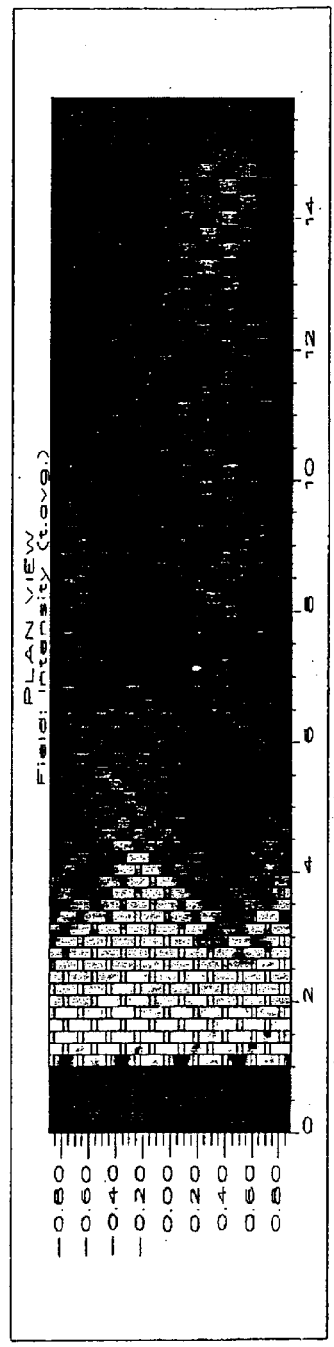
Figure 50B:
Figure 51A:
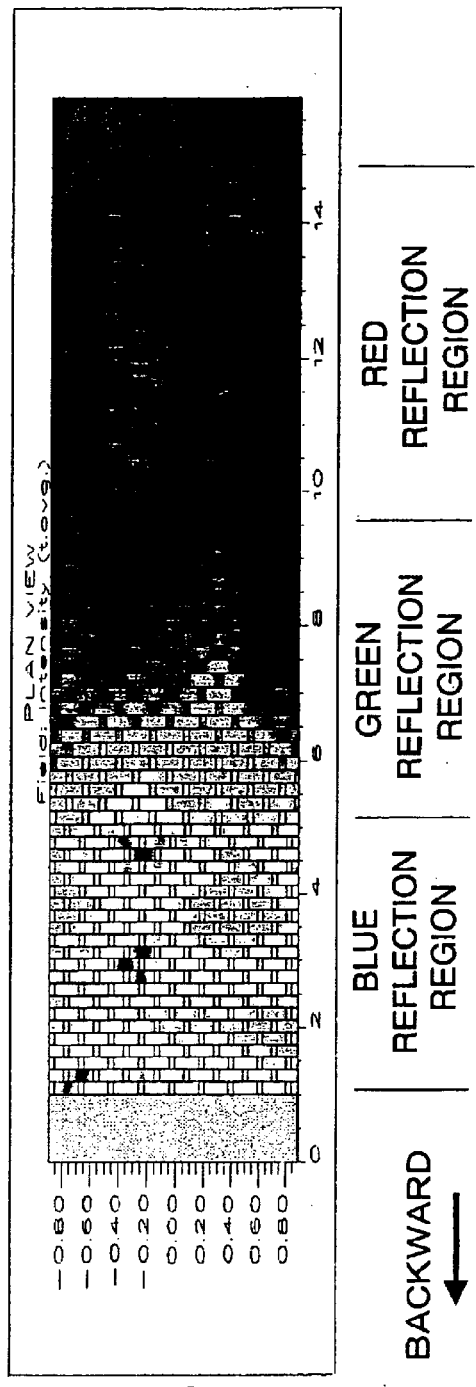
Figure 51B:
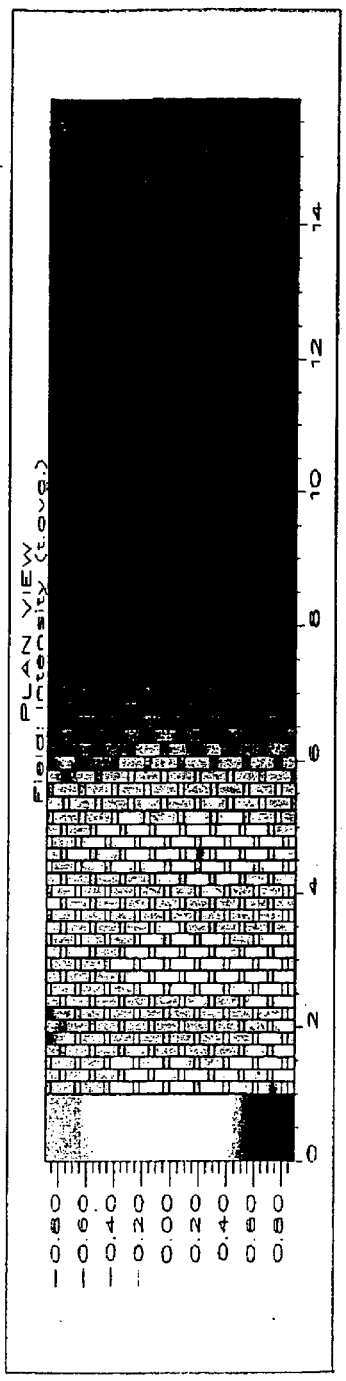
Figure 53A:
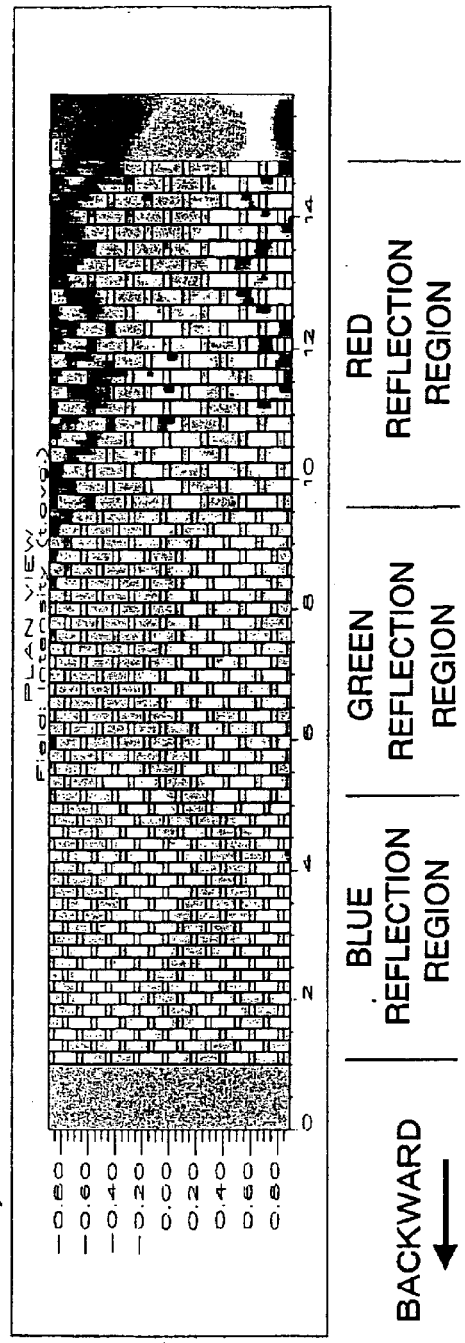
Figure 53B:
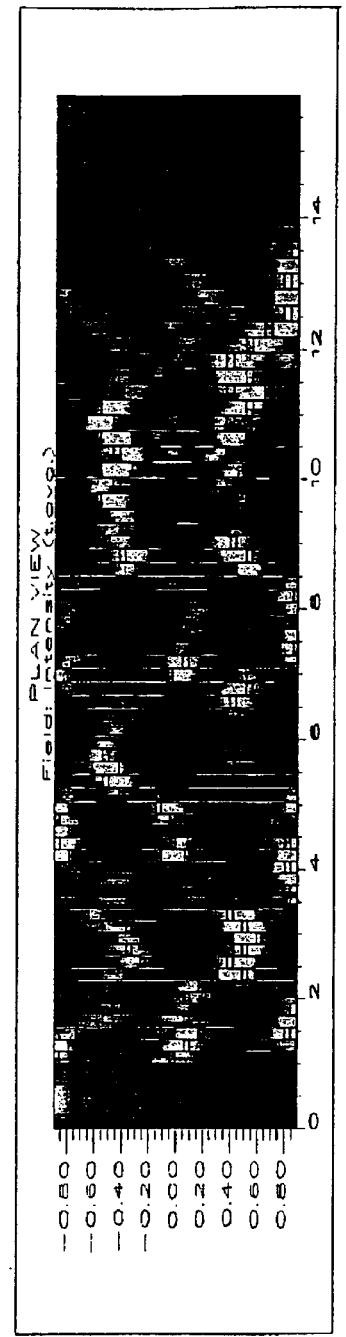

It is appreciated from those results that it is possible to reflect light only of the three primary colors and transmit light of the other wavelengths by stacking 11 cycles of particles layers for red reflection on a substrate, 11 cycles of particles layers for green reflection thereon, and 11 cycles of particle layers for blue reflection thereon. They were similarly estimated by calculation of light fields. The model used therefor is shown in FIG. 49, and results of calculation are shown in FIGS. 50 through 54. These results demonstrate that strong reflection occurs in the portions of particle layers for blue reflection, green reflection and red reflection, respectively, when the wavelength is 475 nm, 525 nm and 623 nm and that the light does not travel deeper. In contrast, with wavelengths such as 590 nm and 555 nm other than those of three primary colors, almost no reflection occurs, and the light therefore reaches to the right end of the particle layer for red reflection and exits therefrom rightward. Therefore, light of colors other than three primary colors can be cut efficiently by locating a light-absorbing material at a deep portion, e.g. by locating a light-absorbing material as the substrate.

Taking it into consideration, the first embodiment of the invention configures the screen to have a cross-sectional structure shown in FIG. 55. That is, the screen is made by stacking 11 cycles of particles layers 2 of D=280 nm for red reflection on the substrate 1, 11 cycles of particles layers 3 of D=234.5 nm for green reflection thereon, and 11 cycles of particle layers 4 of D=212 nm for blue reflection thereon. In any of the particle layer 2 through 4, particles 5 are aligned into a close-packed structure. Particles of the particle layers 2 to 4 may be silica particles. Used as the substrate 1 is any material that can absorb light of wavelengths other than three primary colors. For example, a black substrate of carbon may be used. Thickness of the substrate 1 is in the range from 20 $\mu$m to 500 $\mu$m, and it may be around 50 $\mu$m. If the thickness of the substrate 1 is around 50 $\mu$m, then the screen is unlikely to break, and at the same time, because of a high flexibility, it can be readily rolled. The area of the screen may be determined appropriately in accordance with its use.

Figure 56:
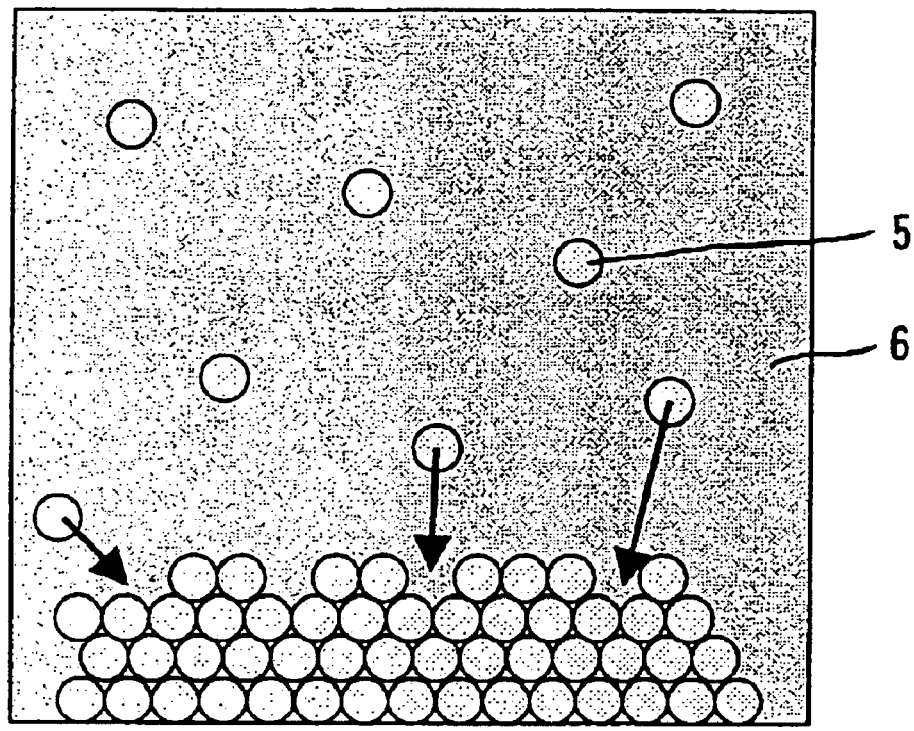
FIG. 56 is a schematic diagram for explaining a manufacturing method of the screen according to the first embodiment of the invention.

The screen shown in FIG. 55 can be easily manufactured by using a self-organized technique, for example. That is, as shown in FIG. 56, for example, if a water solution 6 containing dispersed particles 5 is used to let the particles 5 slowly accumulate in the water solution 6, the particles 5 regularly align by its self-organization. Thus, by using this self-organized technique, particle layers 2 through 4 can be sequentially stacked in a regular alignment on the substrate 1, thereby to manufacture the screen.

The manufacturing method of the screen will be explained below in greater detail. Generally used methods for manufacturing a screen of this kind include natural precipitation (for example, Masuda, et al. (2001) Material Integration 14, 37–44) and immerse-pull-up single-layered particle film manufacturing method (single-layered particle film pull-up) (for example, Nagayama (1995) Powder Technology 32, 476–485). In a natural precipitation process, a low-concentrated particle solution is poured onto a substrate, or a substrate is vertically dipped in a low-concentrated particle solution. Then, particles precipitating onto the substrate are crystallized on the substrate in a self-organized manner by vaporization of the solvent. Natural precipitation is a method of obtaining a thin film of three-dimensional crystals of particles on a substrate through this process. A problem with this method is the need of at least several hours for vaporization of the solvent. It therefore takes a long time to dry the substrate, and since the solvent vaporizes from the substrate unevenly along the surface, the thin film becomes uneven in thickness along the surface especially upon making a large-area thin film of crystals as large as several cm$^2$. On the other hand, single-layered particle film pull-up technique is a method using a process of forming a thin film of two-dimensional crystals in a single layer of particles by immersing a substrate into a low-concentrated particle solution and pulling it up into the air. In this method, a thin film of three-dimensional crystals having any desired thickness is obtained by repeating that process to stack thin films each of a single layer of particles. Problems with this method are that the process of stacking films each of a single layer of particles is complicated and needs a long time for fabrication and that the pull-up speed must be kept low for ensuring two-dimensional uniform crystallization along the surface. In case of a large-area thin-film as large as several cm$^2$, long-time control is required to keep the air-liquid interface meniscus in order, and this is not easy.

Taking them into consideration, here is used a pull-up-and-rotate process as the method of significantly reducing the fabrication time by making use of both the fabrication of three-dimensional crystals by natural precipitation and alleviation of uneven thickness along the surface by single-layered particle film pull-up technique. Although the single-layered particle film pull-up technique can make a thin film of only a single-layered two-dimensional alignment of particles in one cycle of immersion and pull-up, the pull-up-and-rotate method can make a thin film of three-dimensional alignment of crystals in one cycle of immersion and pull-up similar to the single-layered particle pull-up technique by using a high-concentrated particle solution. As a result, this method can make three-dimensional crystals like that by natural precipitation. Then, by rotating the substrate, unevenness of the thickness along the surface can be reduced like the single-layered particle pull-up method. Additionally, this method can remarkably reduce the time required for the fabrication process.

In this pull-up-and-rotate method, when a substrate is immersed into a high-concentrated particle solution and pulled up therefrom into the air, the thickness becomes uneven because it takes a long time for the substrate to dry and particles concentrate to wetter portions. Unevenness of the thickness occurs from a lower portion in the perpendicular direction and right and left ends in the horizontal direction of the substrate. Thus the substrate was rotated in parallel to its surface before immersion, during immersion or immediately after pulling it up to control the wetness. As a result, the unevenness of the thickness was alleviated, and a thin film having a uniform thickness throughout the entire extension thereof was obtained.

Referring to FIGS. 57 through 60, the pull-up-and-rotate method is explained below in a more practical manner.

As shown in FIG. 57A, first prepared is a solution vessel 7 containing a particle solution 8 of a high concentration- (for example, from 2 weight % to 50 weight %). After that, as shown in FIG. 57B, the substrate 1 is lowered from above the solution vessel 7 into the particle solution 8. Then, after the substrate 1 is pulled up as shown in FIG. 57C at a high speed (for example, in the range from 30 $\mu$m/s to 3 m/s), it is naturally dried in the air as shown in FIG. 57D.

In these steps, the particle solution 8 once adhering on the substrate 1 moves down due to the gravity as it dries. Therefore, distribution of particles is localized to a lower portion of the substrate 1, and after the substrate 1 dries, the thin film obtained results in producing an uneven distribution having a thick lower portion and a thin upper portion in the perpendicular direction within the extension thereof. In the perpendicular direction, the unevenness in thickness in the extension of the thin film can be prevented by carrying out the following steps.

As shown in FIG. 58A, the substrate 1 after being dried in the step shown in FIG. 57D is rotated upside down by 180° in parallel to its plane. After that, as shown in FIG. 58B, the substrate 1 is lowered from above the solution vessel 7 into the particle solution 8. After that, in the same manner as already explained, the step of high-speed pull-up of the substrate 1 (FIG. 58C) and natural drying in the air (FIG. 58D) are carried out. As a result, although the thickness of the particle layer has-the distribution including a locally thick portion on a lower part of the substrate 1 and a locally thin portion on an upper part of the substrate 1, since it is opposite from the thickness distribution of the particle layer stacked earlier, the thickness distribution of the entire substrate 1 is uniformed in the perpendicular direction. Also when the upside-down rotation of the substrate 1 is carried out during immersion or immediately after pull-up instead of rotation before immersion, the same effect is obtained.

In order to uniform the thickness distribution on the entire substrate 1 also in the horizontal direction, steps similar to those of FIGS. 57 and 58 are carried out.

That is, as shown in FIG. 59A, the substrate 1 after being dried in the step shown in FIG. 58D is rotated by 90° clockwise in parallel to its plane. After that, in the same manner as already explained, immersion of the substrate 1 into the particle solution 8 (FIG. 59B), quick pull-up of the substrate 1 (FIG. 59C) and natural drying in the air (FIG. 59D) are carried out.

After that, as shown in FIG. 60A, the substrate 1 after being dried in the step shown in FIG. 59D is rotated upside down by 180°. Subsequently, in the same manner as already explained, immersion of the substrate 1 into the particle solution 8 (FIG. 60B), quick pull-up of the substrate 1 (FIG. 60C) and natural drying in the air (FIG. 60D) are carried out.

By the method explained above, a wide-area particle thin film crystallized with no visible unevenness throughout the extension thereof can be obtained in a short time.

It could be possible to employ an alternative way of reducing the thickness unevenness by laying the substrate 1 horizontally, thereby uniforming the liquid-holding ability of the substrate 1 throughout its entire surface, and thereafter drying it. However, as far as the Inventor actually tried it, the liquid-holding ability could not be kept uniform, and unevenness of thickness was produced within the plane thereof.

Here is explained a result of comparison in unevenness of thickness between a particle thin film prepared by natural precipitation and a particle thin film prepared by the pull-up-and-rotate method.

In this comparison, silica particles having the diameter of 280 nm (Product KE-P30 by Nippon Catalyst) were used as the particles, pure water as the solvent, and commercially available plasma-washed aluminum foil (in form of a rectangle sized 26 mm each shorter side and 76 mm each longer side) as the substrate.

In preparation of a sample by natural precipitation, the quantity of 20 μl of water solution containing 20 weight % of silica was poured and spread on one surface of a substrate. The substrate was maintained horizontal and dried for three days within a sample case of a resin.

In preparation of a sample by the pull-up-and rotate method, a substrate was immersed in a water solution containing 20 weight % of silica, with the longer sides of the substrate being oriented perpendicularly, then pulled up vertically at the speed of 10 m/s keeping that posture, and dried. After it was dried, the substrate was rotated upside down, and similarly immersed, pulled up and dried. Subsequently, the substrate was rotated by 90° in parallel to its surface, then immersed with its shorter sides being oriented perpendicularly, pulled up vertically at the speed of 10 mm/s while keeping the posture, and dried. After it was dried, the substrate is rotated upside down, and similarly immersed, pulled up and dried. In this manner, four cycles of immersion and pull-up steps were repeated.

As a result of visual comparison of both samples, unevenness in thickness was smaller in the sample by the pull-up-and-rotate method than in the sample by natural precipitation. In addition, both exhibited Bragg's reflection, and silica particles were confirmed to form three-dimensional crystals.

Thickness of each prepared thin film were measured at five points along a line connecting its opposite shorter sides (center point, and points distant by 10 mm and 20 mm from the center point). Thickness was measured by optical measurement as the perpendicular distance between the surface of the aluminum foil as the substrate and the surface of each prepared thin film. Its result is was as follows.

| | |
|---|---|
| Natural Precipitation: | |
| Average value: | 14.8 μm |
| Standard difference: | 3.1 μm |
| Pull-up-and-Rotate Method: | |
| Average Value: | 9.9 μm |
| Standard Difference: | 0.6 μm |

It has been confirmed from the difference between those standard differences that the variance of the film thickness by the pull-up-and-rotate method is much smaller than that by natural precipitation. Through four cycles of the pull-up-and-rotate process, a silica thin film of three-dimensional crystals made up of about 35 layers with small unevenness in thickness could be obtained.

As explained above, according to the first embodiment, since it is possible to reflect the light of three primary colors exclusively while absorbing the light of other wavelengths on the part of the substrate 1, a screen lowering the luminance level of black-displaying portions can be obtained. In this case, even when external light irrelevant to images enters into the screen, it is cut because of the difference in wavelength, and deterioration of the contrast is prevented. Especially when images are formed with light having a narrow full width at half maximum of the emission peak and excellent in color purity, such as light from a semiconductor laser or LED, it is possible to maintain a high contrast and lower the luminance level of black-displaying portions by efficiently selectively reflecting only the light for images and cutting light of other wavelengths. Therefore, deterioration of images does not occur even in circumstances other than dark rooms. Furthermore, even when light with a wide spectral full width at half maximum is projected from, for example, a liquid crystal projector, since the light is selectively narrowed in wavelength, the chromatically reproducible range on the chromaticity diagram is enlarged, and the color purity is also improved.

Next explained is a method of expanding the far field pattern (FFP) of reflected light by making use of the diffraction effect.

Figure 61:
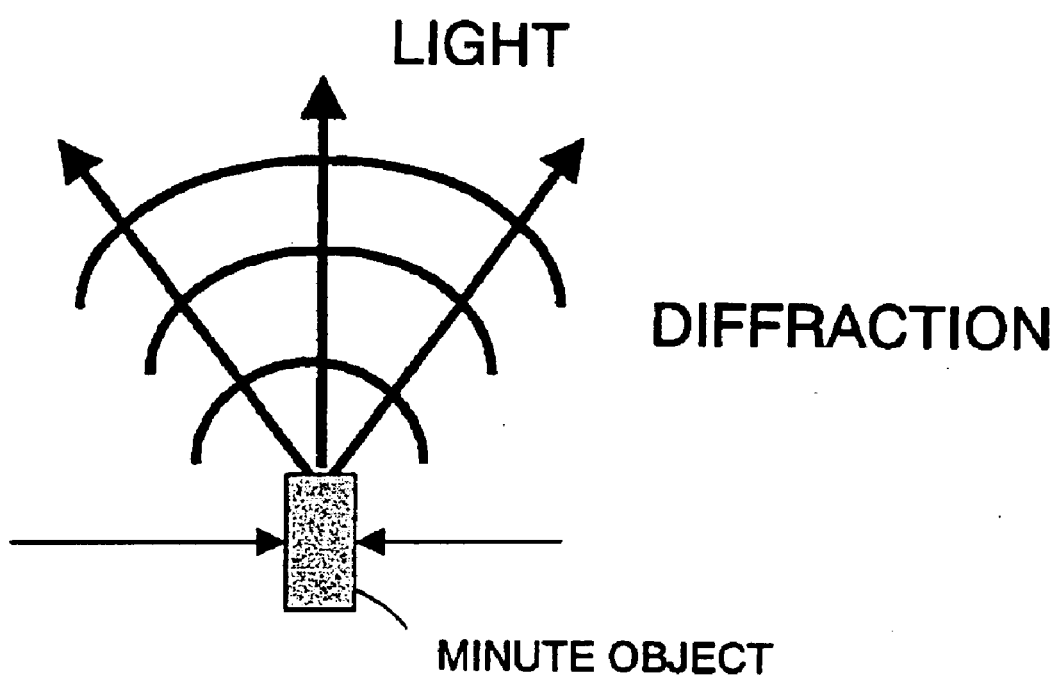
FIG. 61 is a schematic diagram that shows how light spreads by deflection.
Figure 62A:
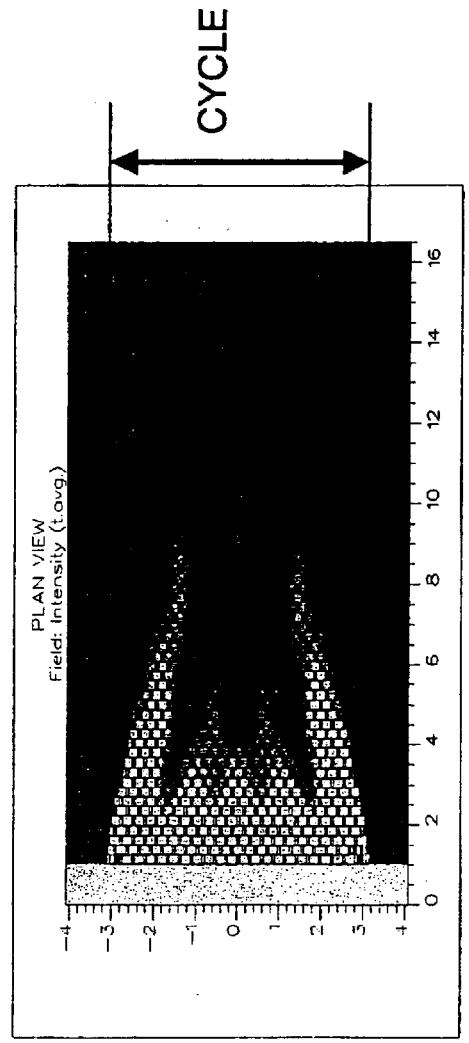
Figure 62B:
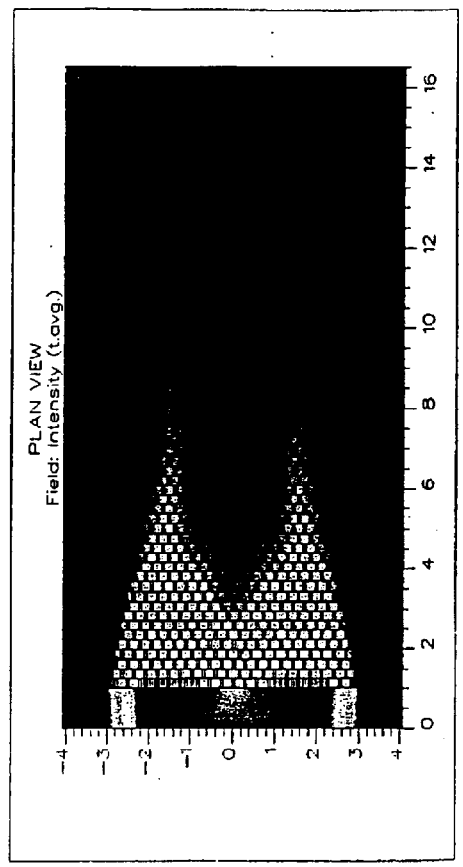
Figure 63A:
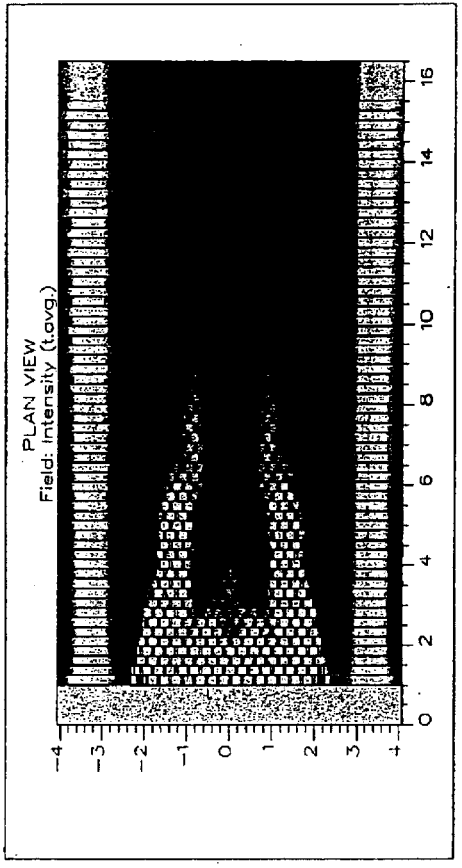
Figure 63B:
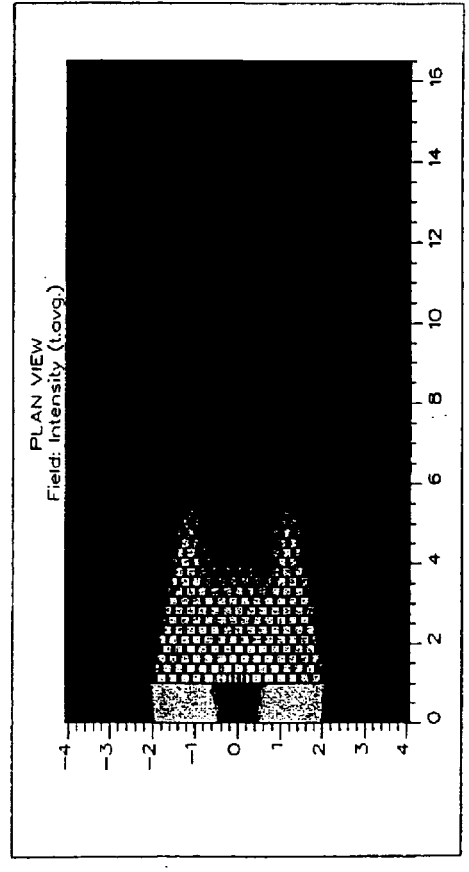
Figure 64A:
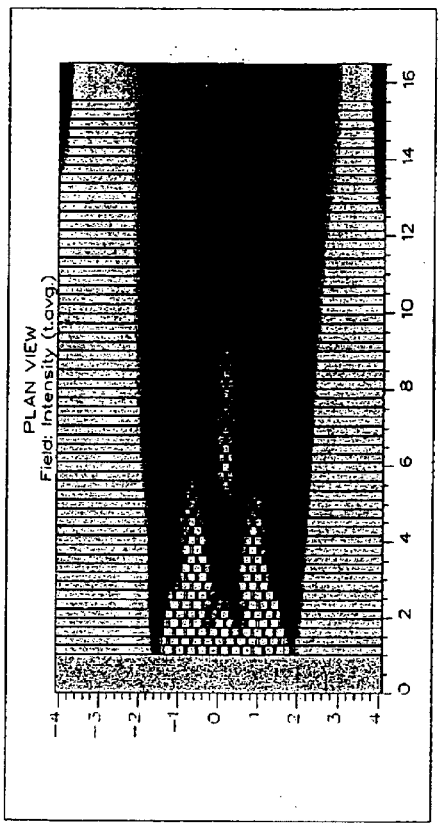
Figure 64B:
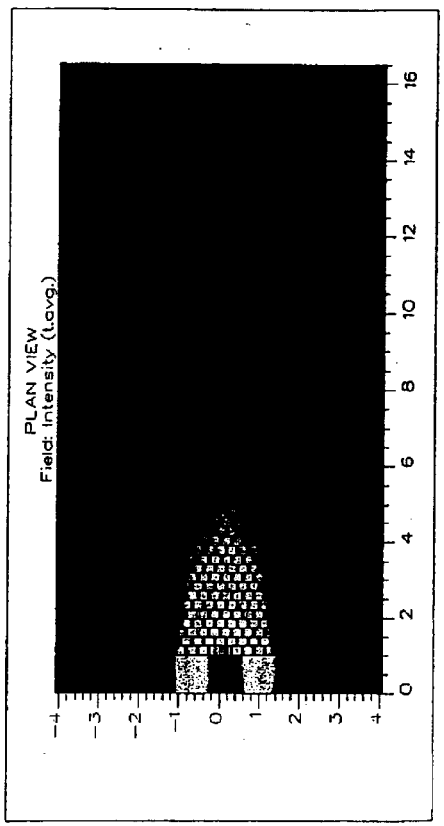

As shown in FIG. 61, in general, if the size of an object is sufficiently small in the direction normal to the direction of incidence of light, then the light is diffracted and spread by the object. Taking it into consideration, by making up the screen of an aggregate of particles, it will be possible to make an extension of FFP of reflected light with the diffraction effect by the particles. This corresponds to laterally extending the lattice point on the space of the reciprocal lattice. Taking it into account, reflected waves in case of the lateral size being 22 cycles, 16 cycles and 11 cycles were calculated in a wide area (100 μm×30 μm). Its results are shown in FIGS. 62 through 65. It is appreciated from these results that FFP becomes wider as the lateral cycles decreases. More specifically, although FFP is as narrow as ~8° when the lateral size is 22 cycles, FFP is enlarged as the cycles decreases, to ~11° with 16 cycles and ~17° with 11 cycles.

In case images are displayed on a screen in a big site like a theatre, the angle of the field of view may be relatively narrow, and brightness is rather requested. In this case, it is possible to relatively narrow FFP as narrow as 10–17° to give a certain directivity and to thereby increase the density of light, that is, to make the screen brighter.

Next explained is a method of expanding FFP of reflected light by making use of refraction.

Figure 66:
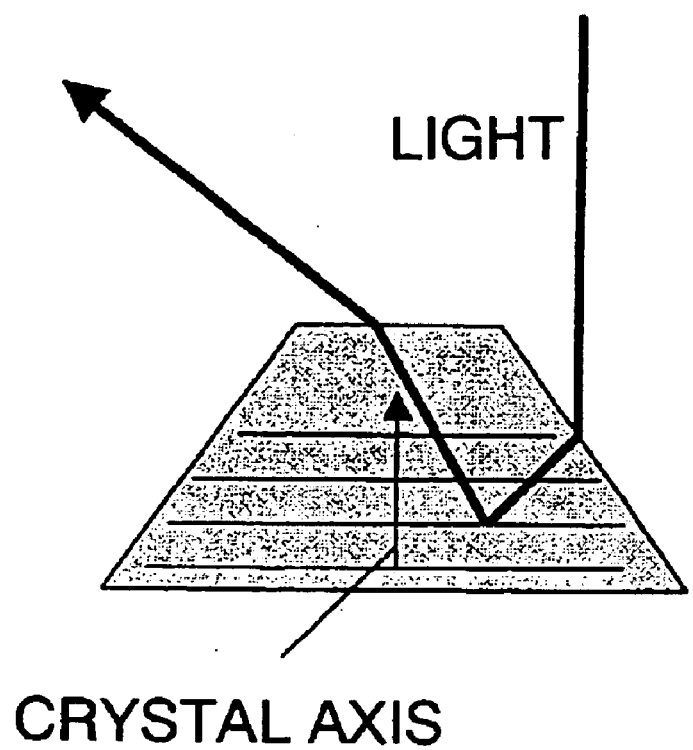
FIGS. 66 and 67 are schematic diagrams that show how light spreads by deflection.
Figure 67:
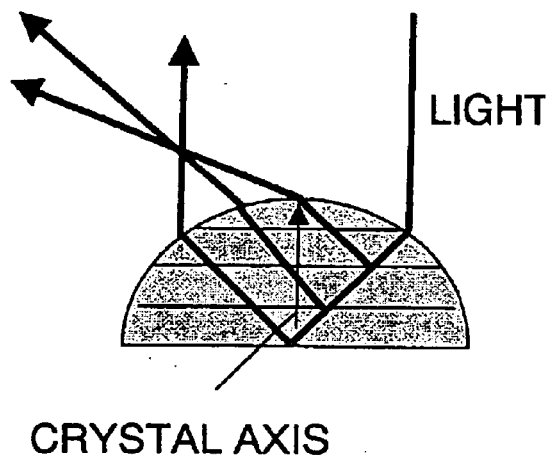

In order to provide FFP of reflected light with an extension by refraction, it will be possible to shape the aggregate of particles into a structure having a horizontal surface and sloping surfaces as shown in FIG. 66 or to shape the surface of the aggregate of particles into a surface-curved structure as shown in FIG. 67. In the example shown in FIG. 66, reflected light is emitted obliquely only in a specific surface, but in the example shown in FIG. 67, reflected light is emitted in any directions in accordance with the curved surface.

Figure 68:
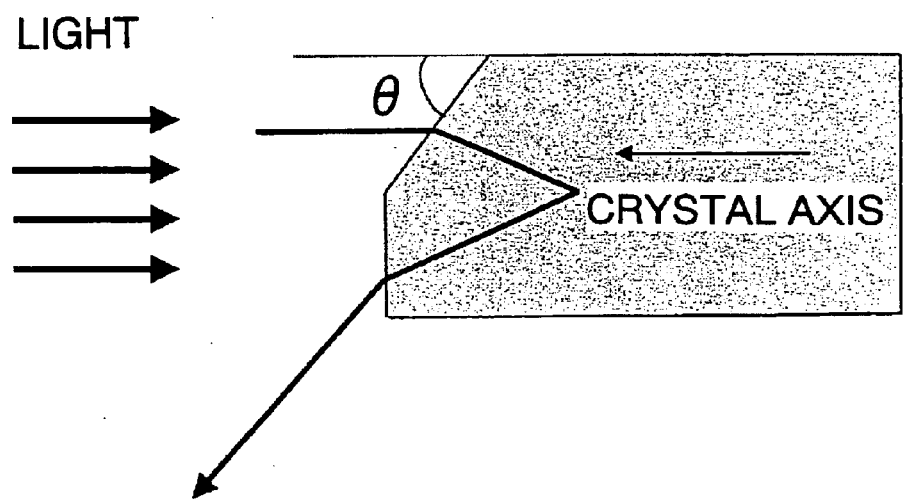
FIG. 68 is a schematic diagram that shows a model used for calculation of a light field of particles.
Figure 69A:
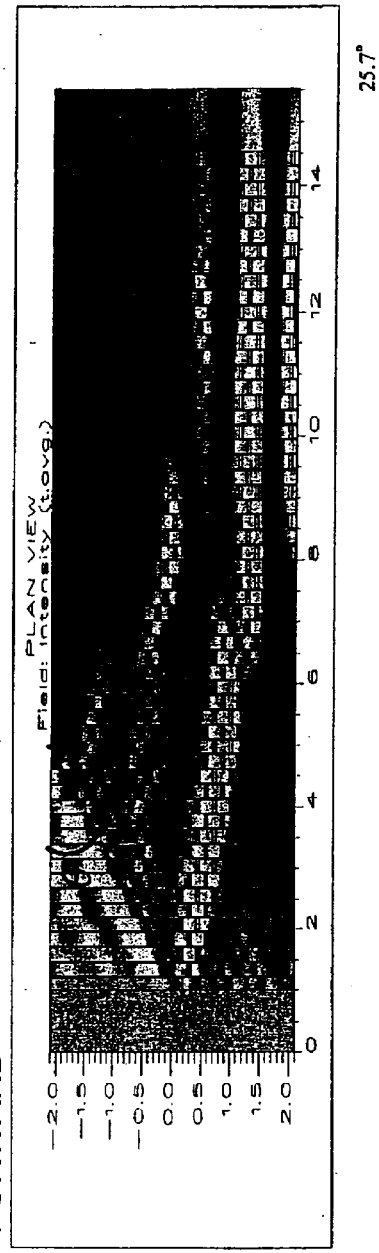
Figure 69B:
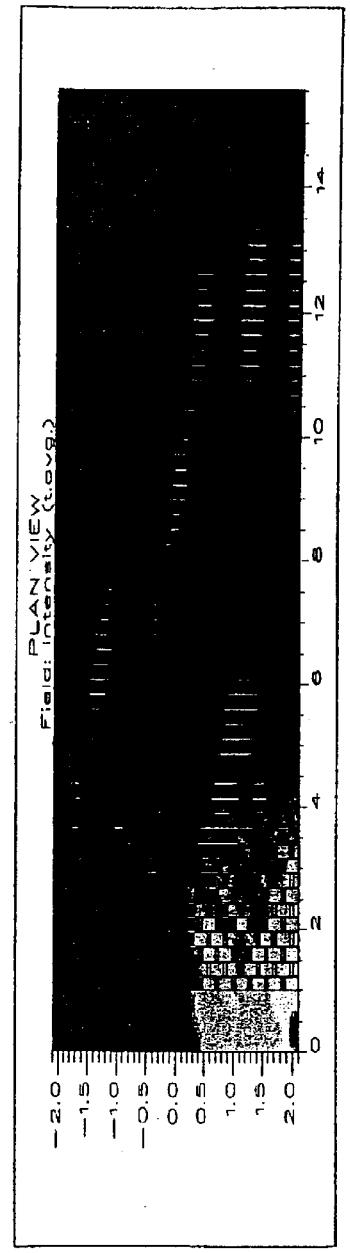
Figure 70A:
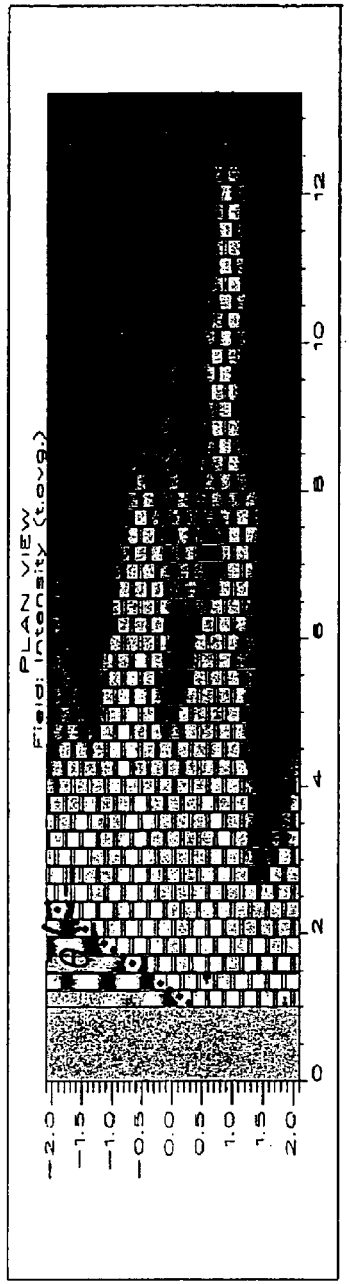
Figure 70B:
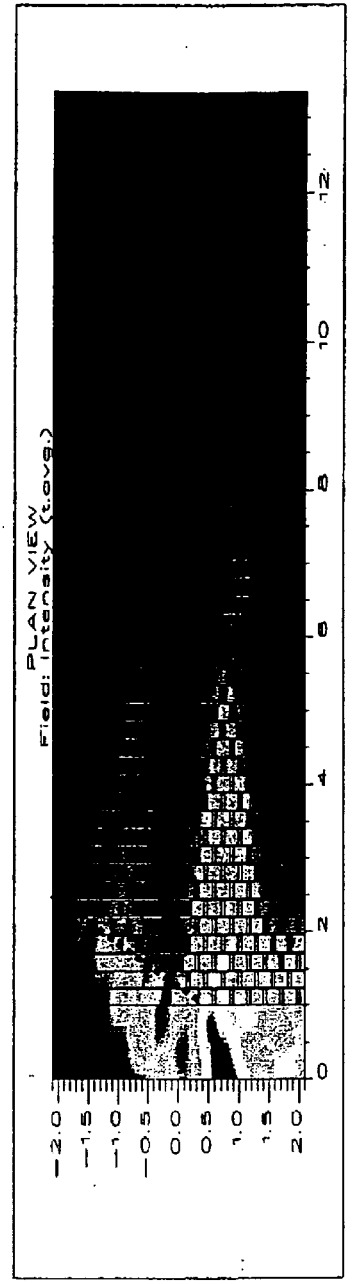
Figure 72A:
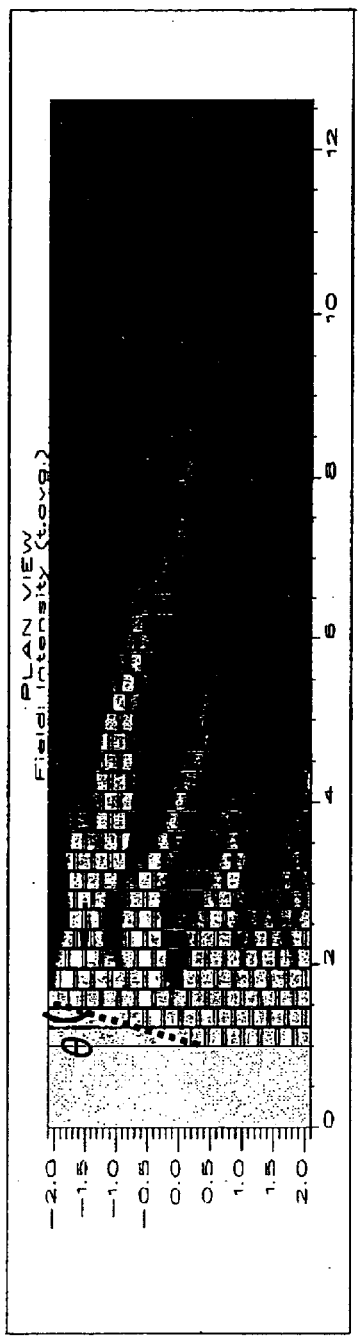
Figure 72B:
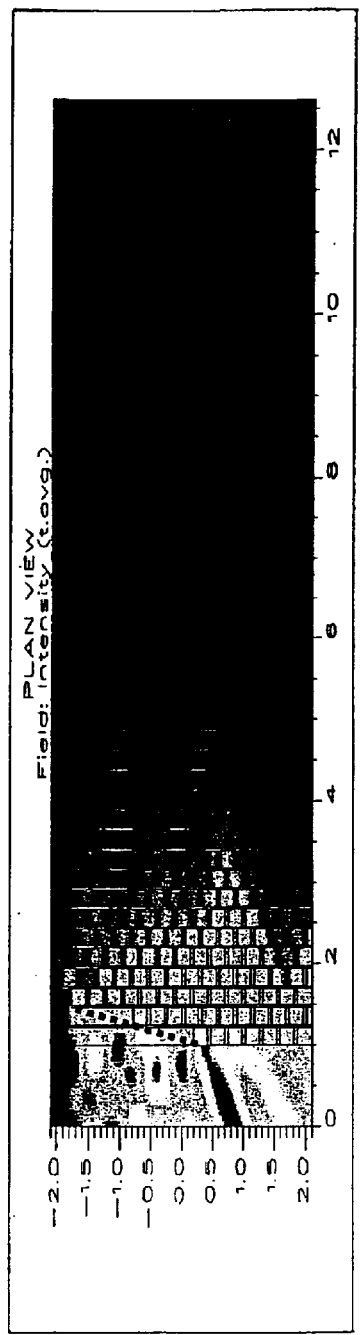
Figure 73A:
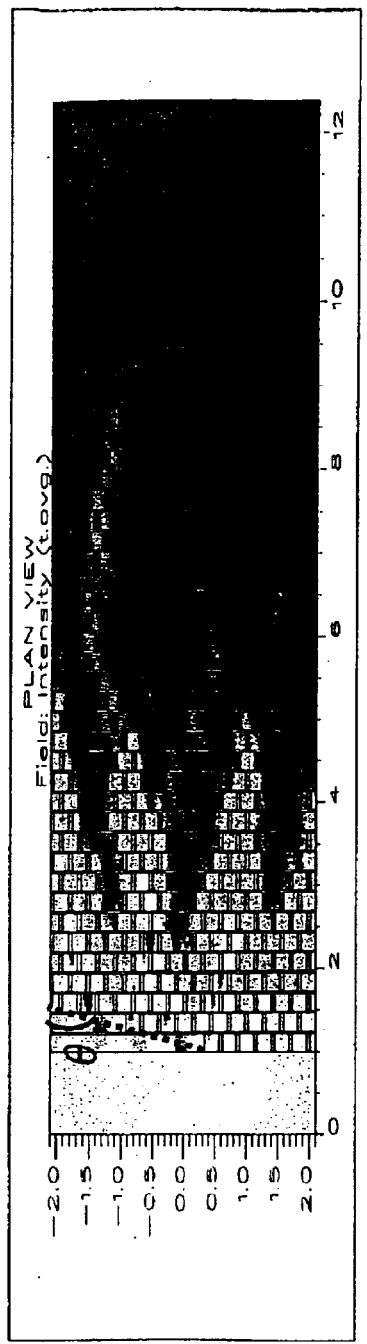
Figure 73B:
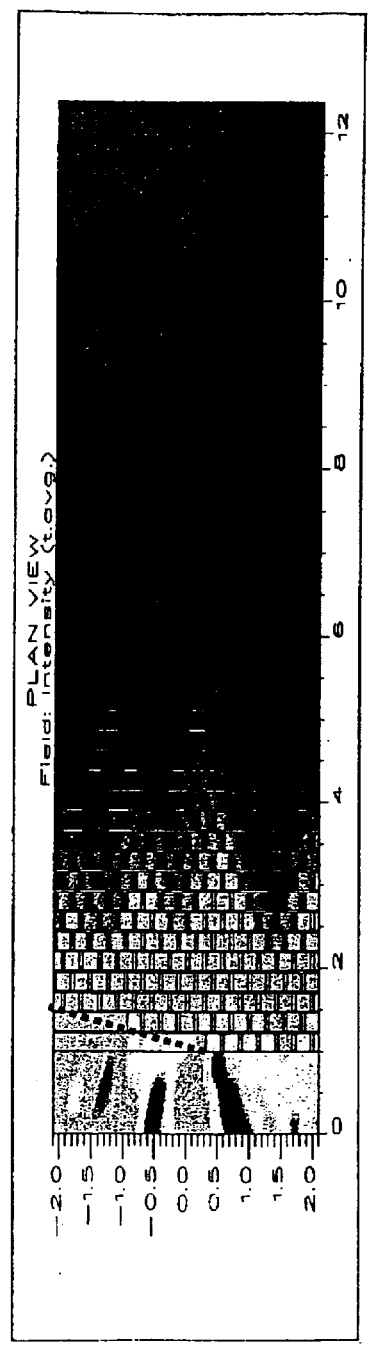

Calculation was carried out by changing the angle θ of the sloping surface of the aggregate of particles relative to the normal direction (direction of the crystal axis) as shown in FIG. 68. In this calculation, wavelength of the incident light was 625 nm, and diameter of each particle was 280 nm (these are conditions causing Bragg's reflection when light enters normally to the horizontal surface (left end surface in FIG. 68). Its results are show in FIGS. 69 through 73. It is appreciated from these results that almost no Bragg's reflection occurred and light could pass through even when light impinges surfaces of θ=14.4° and θ=58.2°. In contrast, light was reflected on sloping surfaces of θ=70.2°, θ=75.7° and θ=78.9°.

Figure 74A:
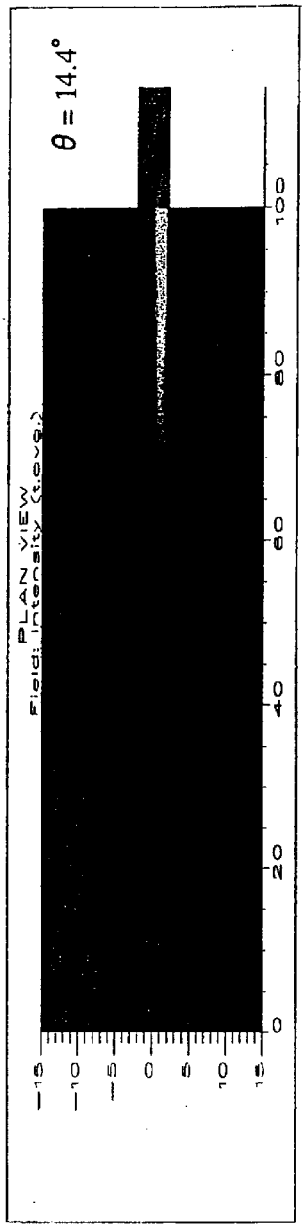
Figure 74B:
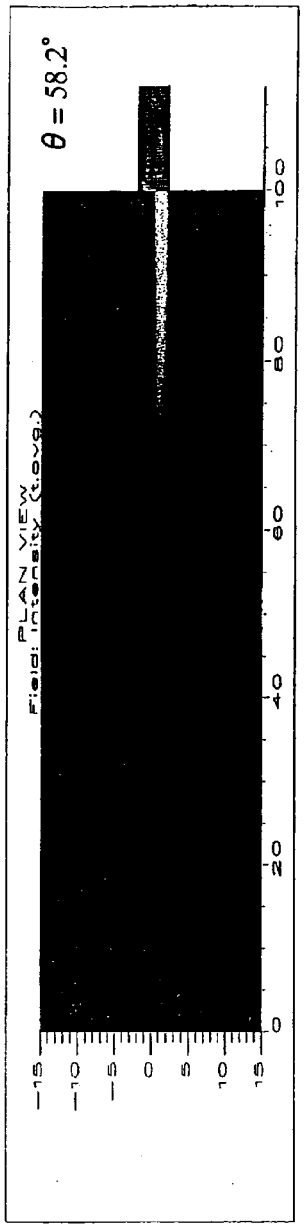
Figure 74C:
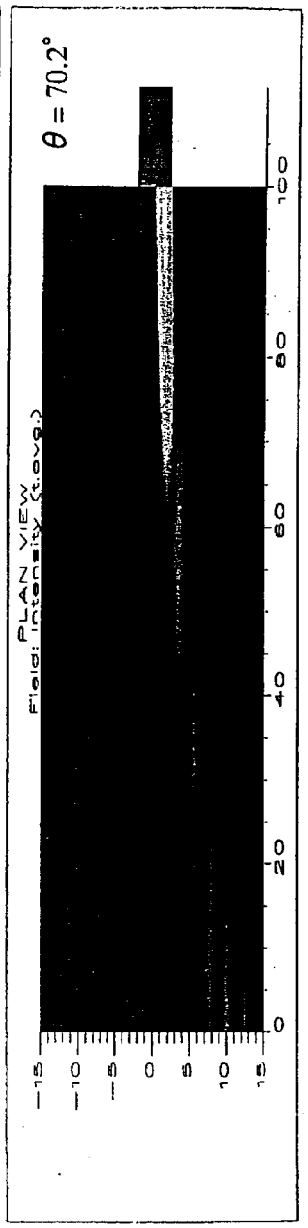
Figure 75A:
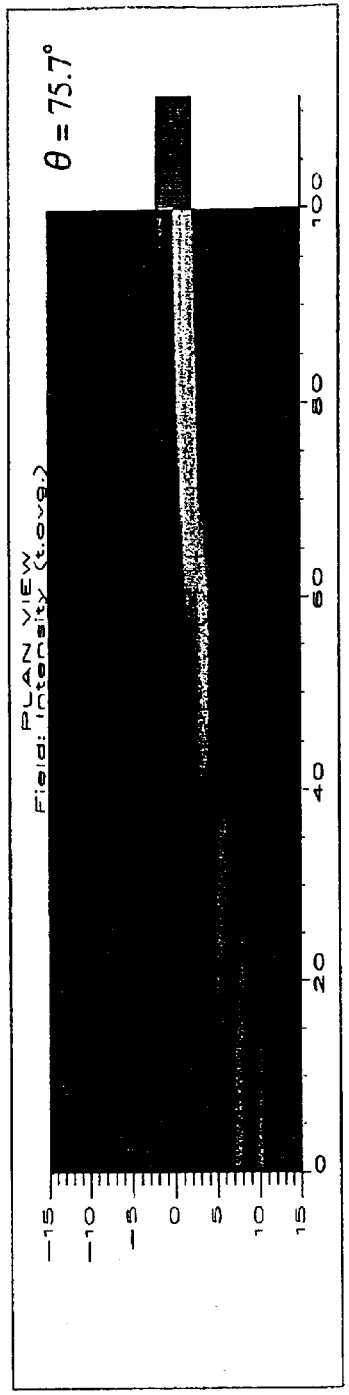
Figure 75B:
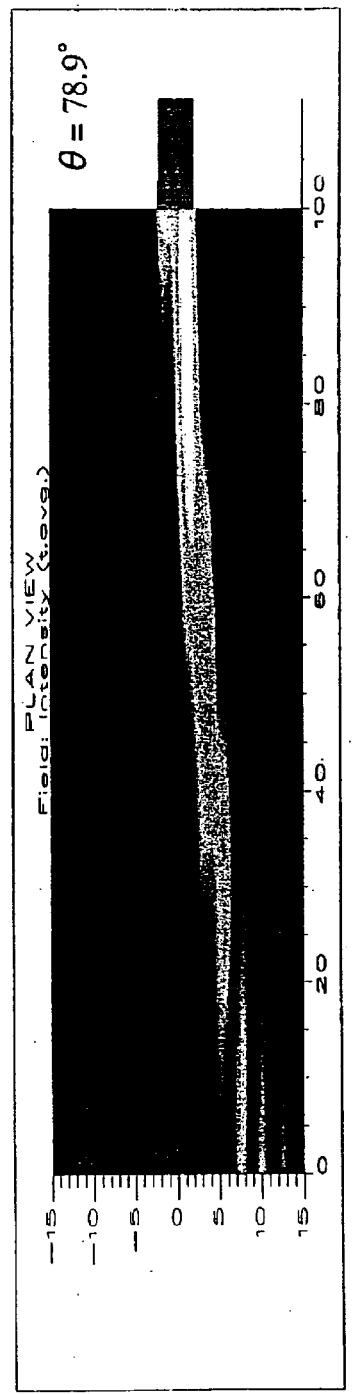
Figure 76:
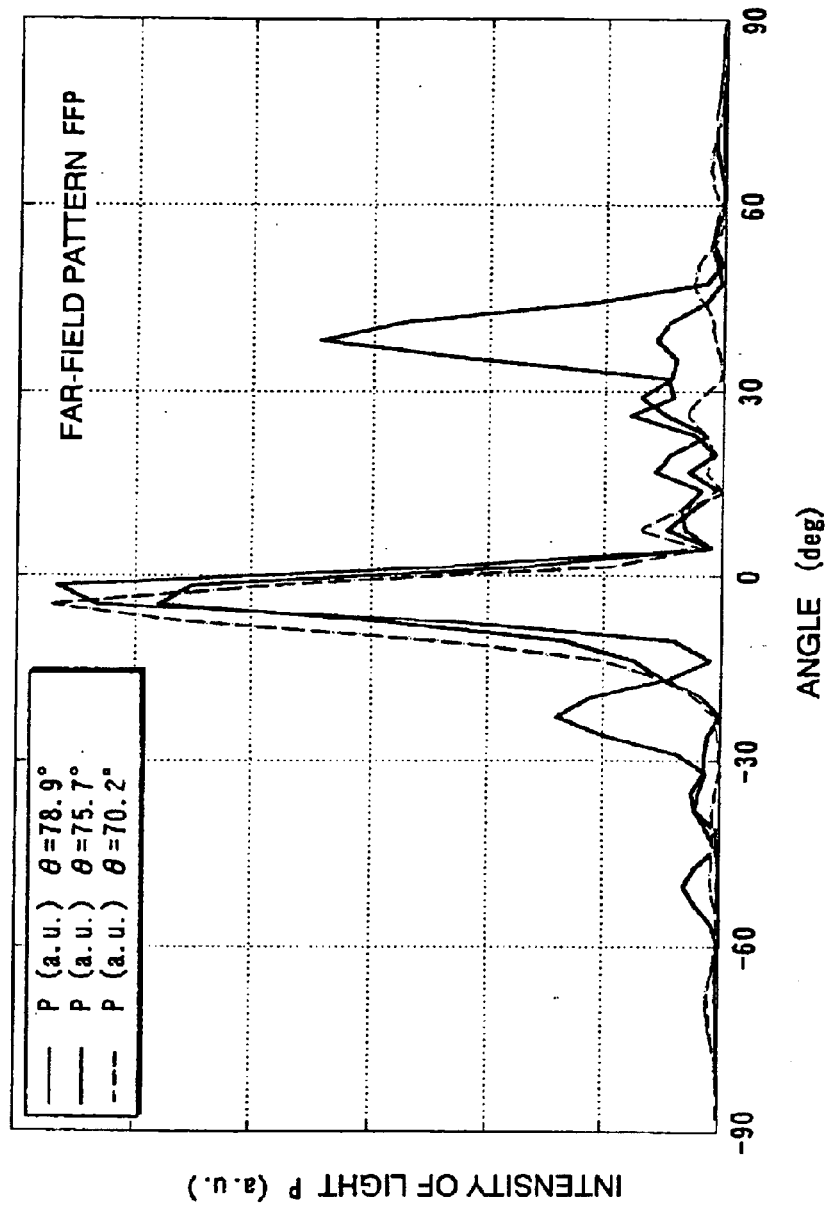
FIG. 76 is a schematic diagram that shows extension of reflected light as extension of a far-field pattern.

Furthermore, results of BACKWARD on the wider reflection side are shown in FIGS. 74 and 75. It is appreciated from these results that oblique reflection did not occur when θ=14.4° and θ=58.2° but occurred when θ=70.2°, θ=75.7° and θ=78.9°. FIG. 76 is a graph that shows a result thereof as FFP. This result demonstrates that a peak appeared near 35°. It is appreciated from these results that the method of refraction can provide FFP with an extension up to 70° if a sloping surface is formed in the range of θ=90~70°.

Figure 77A:
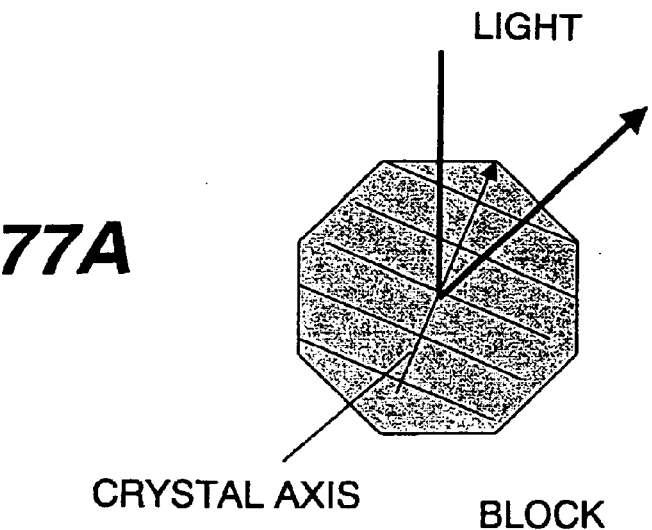
FIGS. 77A and 77B are schematic diagrams for explaining results of inclination of the crystal axis.
Figure 77B:
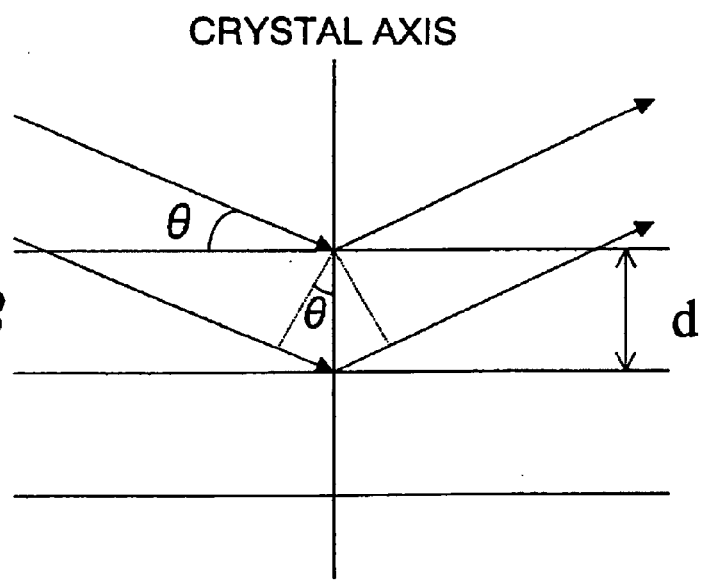
Figure 78:
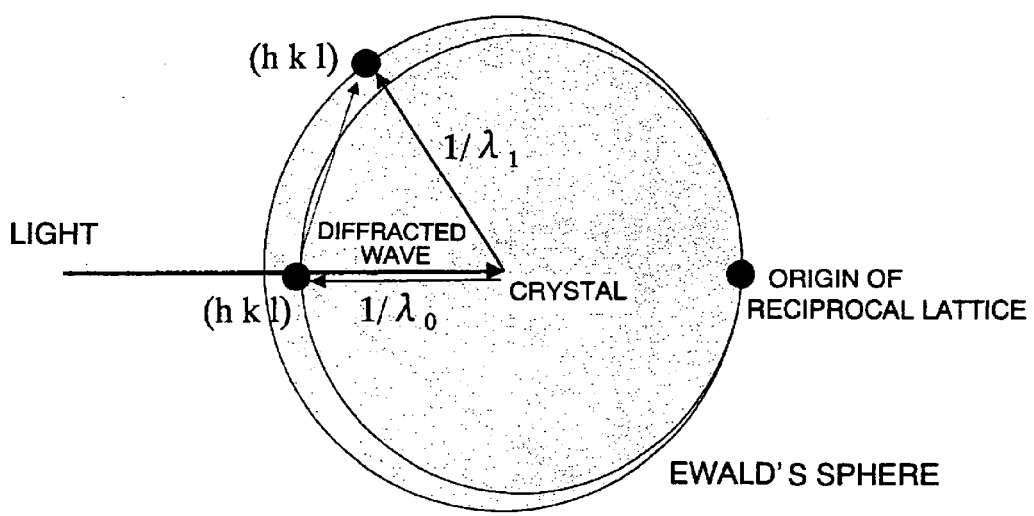
FIG. 78 is a schematic diagram that shows a reciprocal lattice space.
Figure 79:
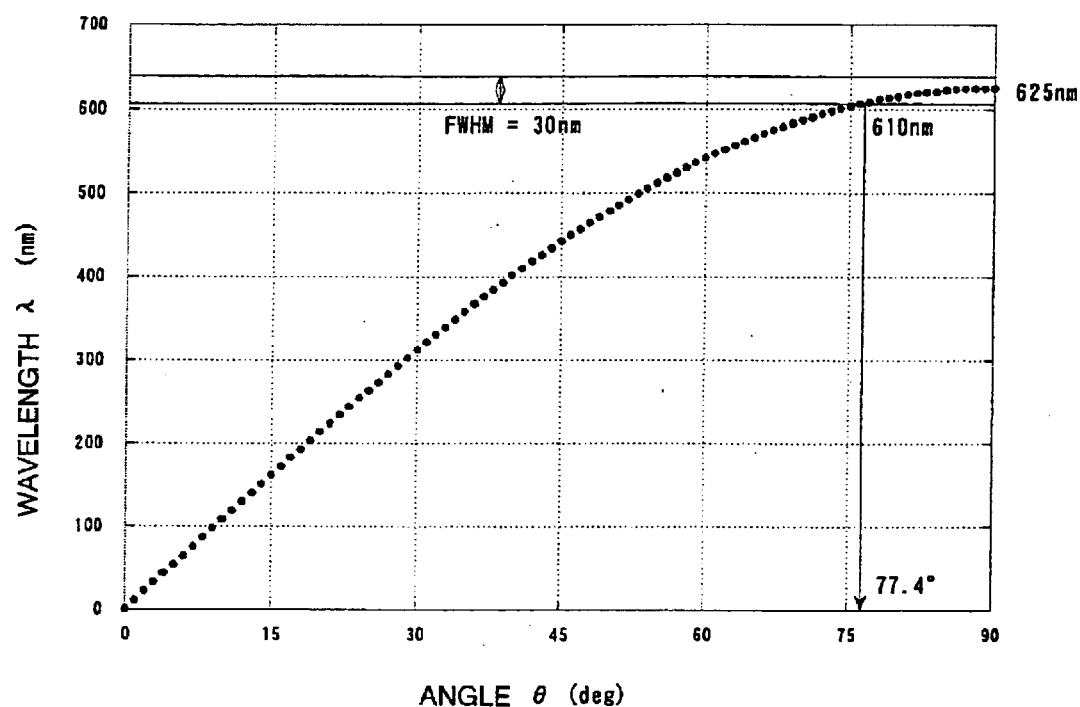
FIG. 79 is a schematic diagram that shows relations between inclination of the crystal axis and wavelengths satisfying the Bragg's condition.

Next explained is the case where the crystal axis inclines from the direction of incidence of light as shown in FIG. 77. In this case, the wavelength satisfying the Bragg's condition shifts. If the wavelength upon vertical incidence (the direction of incidence is parallel to the crystal axis) is $\lambda_0$, the wavelength satisfying the Bragg's condition becomes $\lambda(\theta) = \lambda_0 \sin \theta$. This means that a lattice point rotates about the origin in a space of reciprocal lattice due to deviation of the direction of incidence of light and results in failing to ride on the surface of the same Ewald's sphere (sphere having the radius $1/\lambda$). A result of calculation taking this effect into consideration is shown in FIG. 79. This result demonstrates that Bragg's reflection occurs in the range of θ=77.4~90° when the full width at half maximum of the spectrum is 30 nm. In case of θ=77.4°, light will be reflected in the direction inclined by 2θ=25.6° from the normal direction. However, if the axis is inclined in the opposite direction, namely, by θ=−77.4°, then FFP is enlarged to FFP=51.6° in total.

The method of using refraction and the method of inclining the crystal axis are suitable for use in projection onto a screen in a narrow space in a private house, for example, because high directivity will make images invisible from offset positions.

Figure 80:
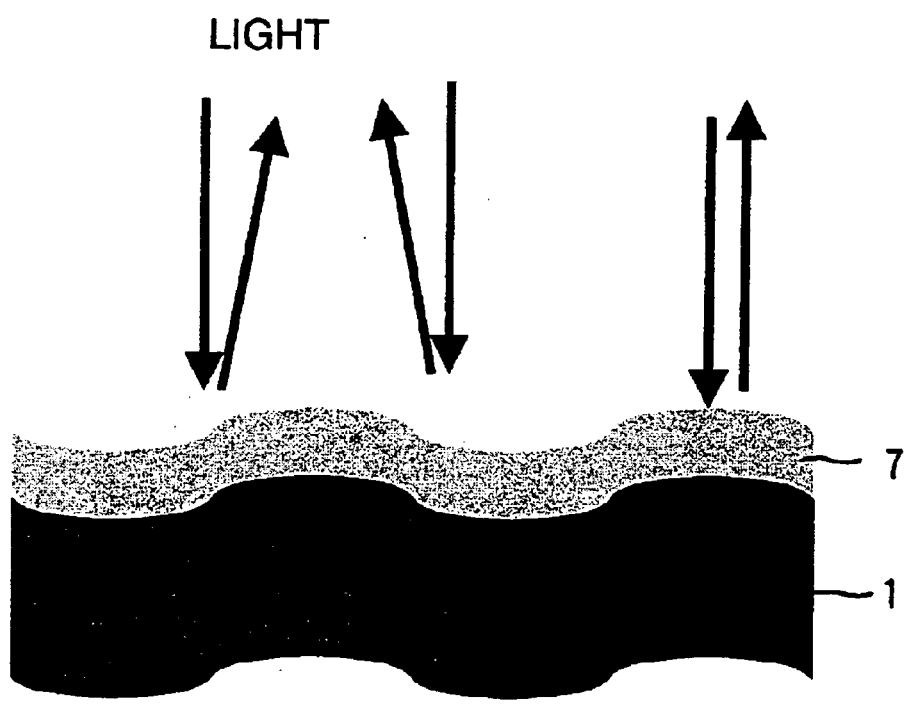
FIG. 80 is a schematic diagram that shows an example of a structure relaxing the directivity.

In order to moderate the directivity, the aggregate 9 of particles may have undulation as shown in FIG. 80.

Next explained is the wavelength selectivity of the screen.

Figure 81:
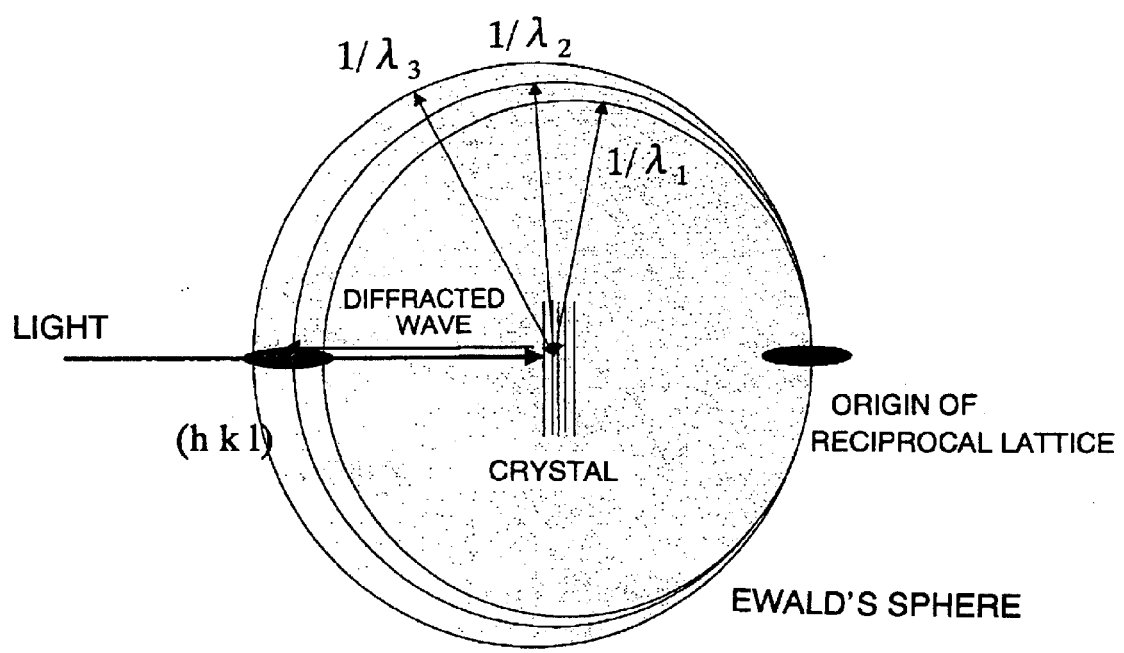
FIG. 81 is a schematic diagram that shows a reciprocal lattice space.
Figure 82:
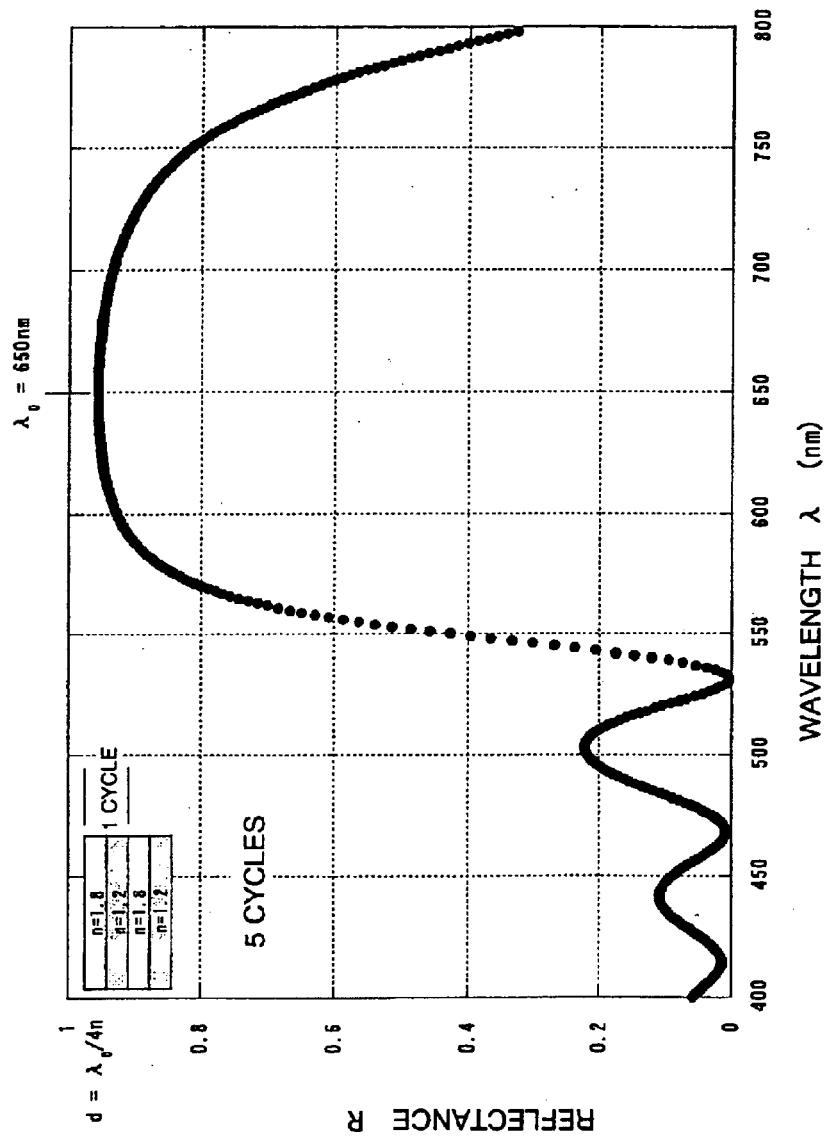
FIGS. 82 and 83 are schematic diagrams that show reflection spectrums of dielectric multi-layered films.
Figure 83:
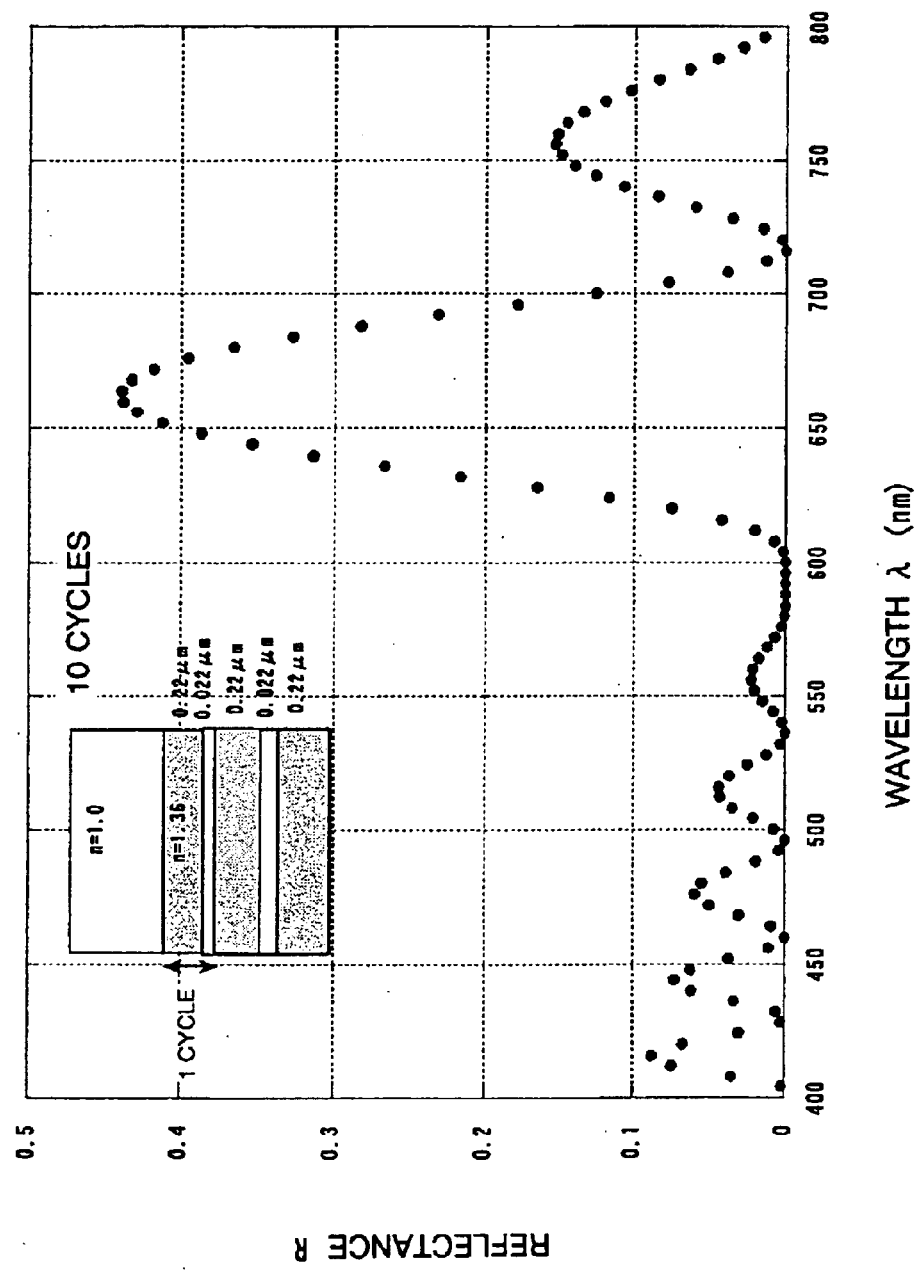

The wavelength selectivity can be also explained by using the space of a reciprocal lattice. That is, as shown in FIG. 81, in case the size in the incident direction of light is small, the lattice point in the reciprocal lattice space extends in that direction. It results in existence of a number of Ewald's spheres that intersect the lattice point, and results in expanding the range of wavelengths k that satisfying the Bragg's condition. Taking dielectric multi-layered films stacking five layers and ten layers, respectively, their reflection spectrums were calculated by the effective Fresnel's coefficient method. Its results are shown in FIGS. 82 and 83. It is appreciated from these results that the full width at half maximum is about 200 nm in the five-layered film, but it is as narrow as 50 nm in the ten-layered film. However, it is insufficient to simply increase the layers for the purpose of improving the wavelength selectivity, but it is necessary to increase the effective size for light. Even if stacking layers, which reflect by 100% in combination of several layers, up to 100 layers or so, the effective size is only those several layers, the wavelength selectivity remains bad. Therefore, it is desirable to minimize the reflection efficiency of individual diffraction gratings by particles to make up a structure in which diffraction takes place over many layers.

As explained above, the use of the screen according to the first embodiment narrows the full width at half maximum of the spectrum of each of three primary colors. It is explained below that it improves the color purity and expands the reproducible range on the chromaticity diagram.

Figure 84:
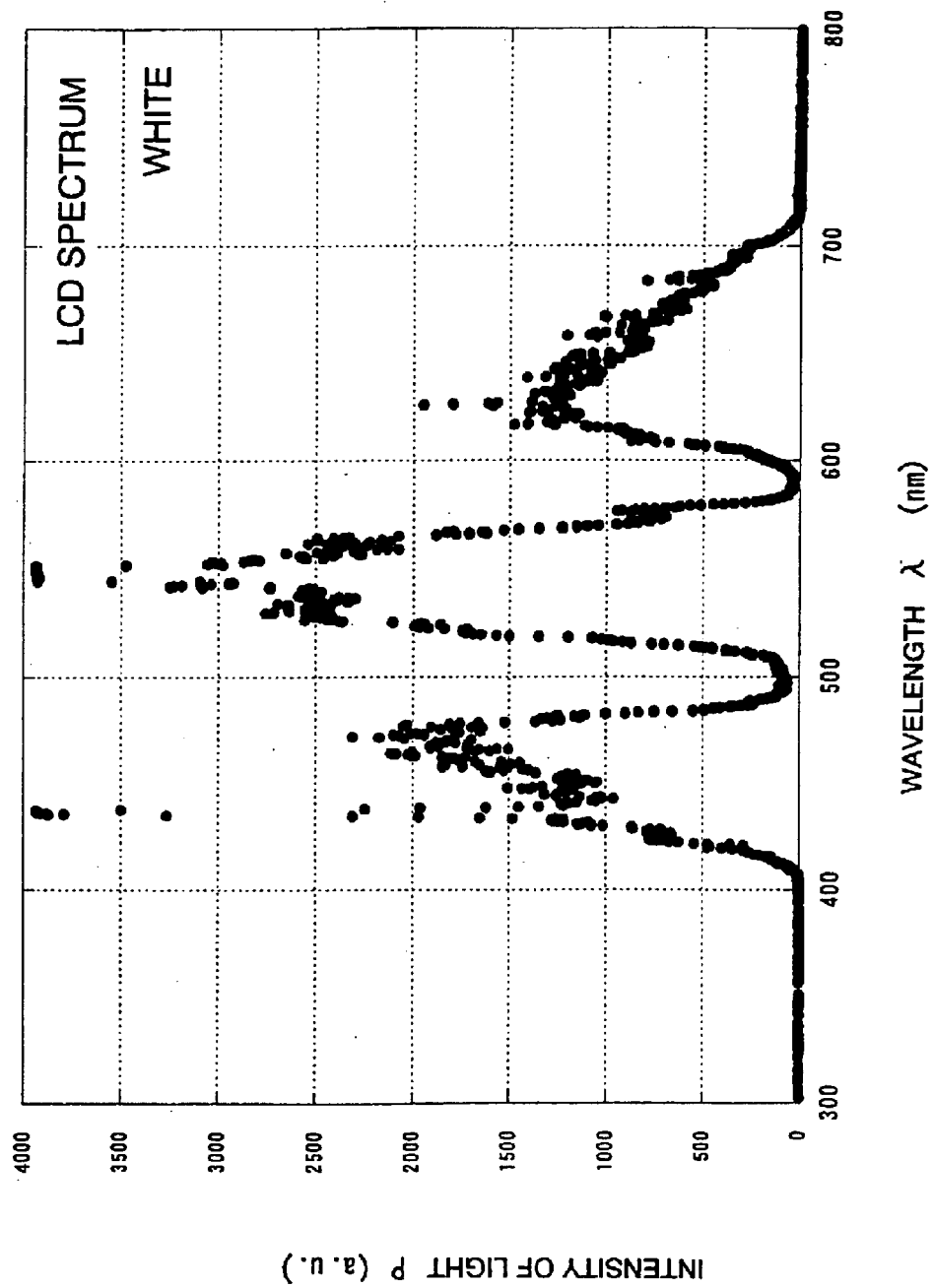
FIGS. 84 through 87 are schematic diagrams that show measured spectrums of light emitted from an LCD projector.
Figure 85:
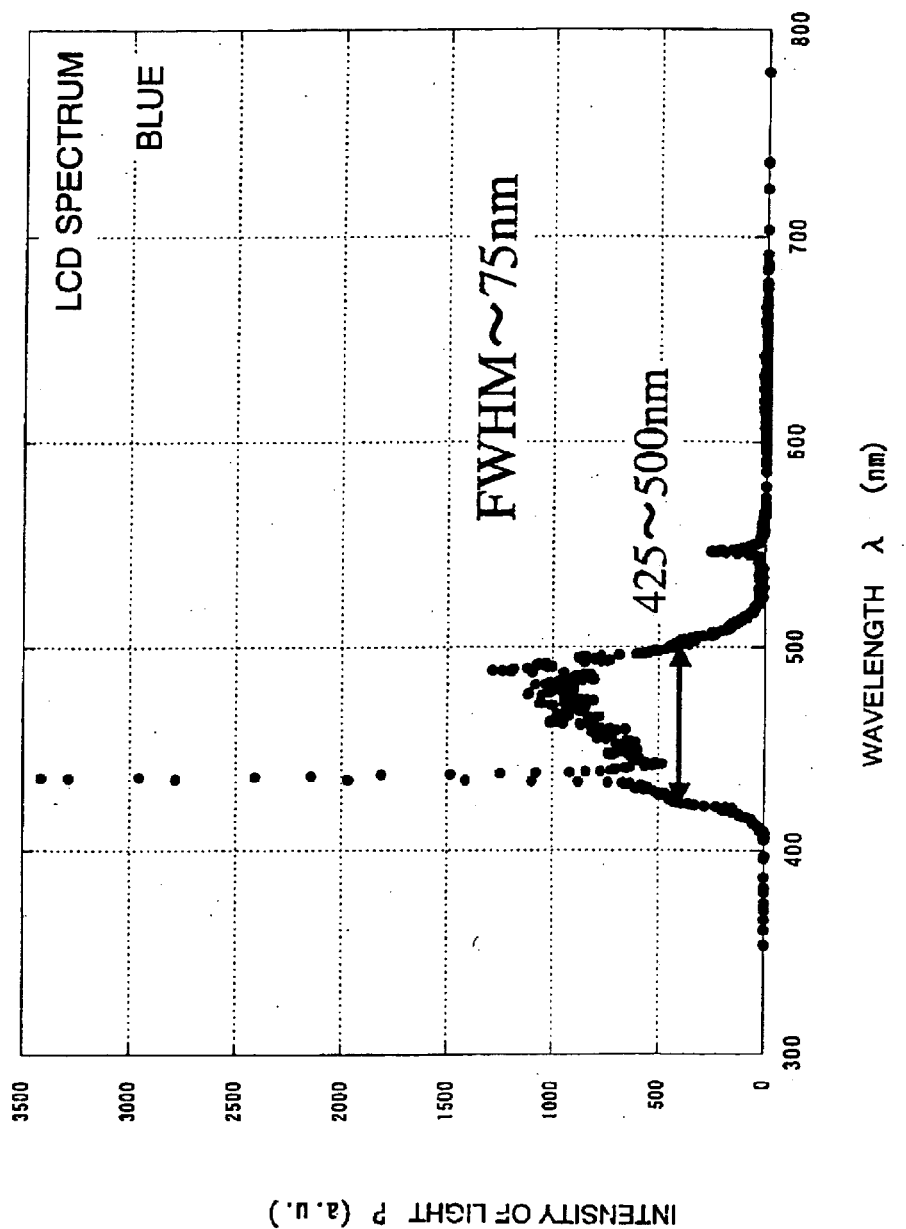
Figure 86:
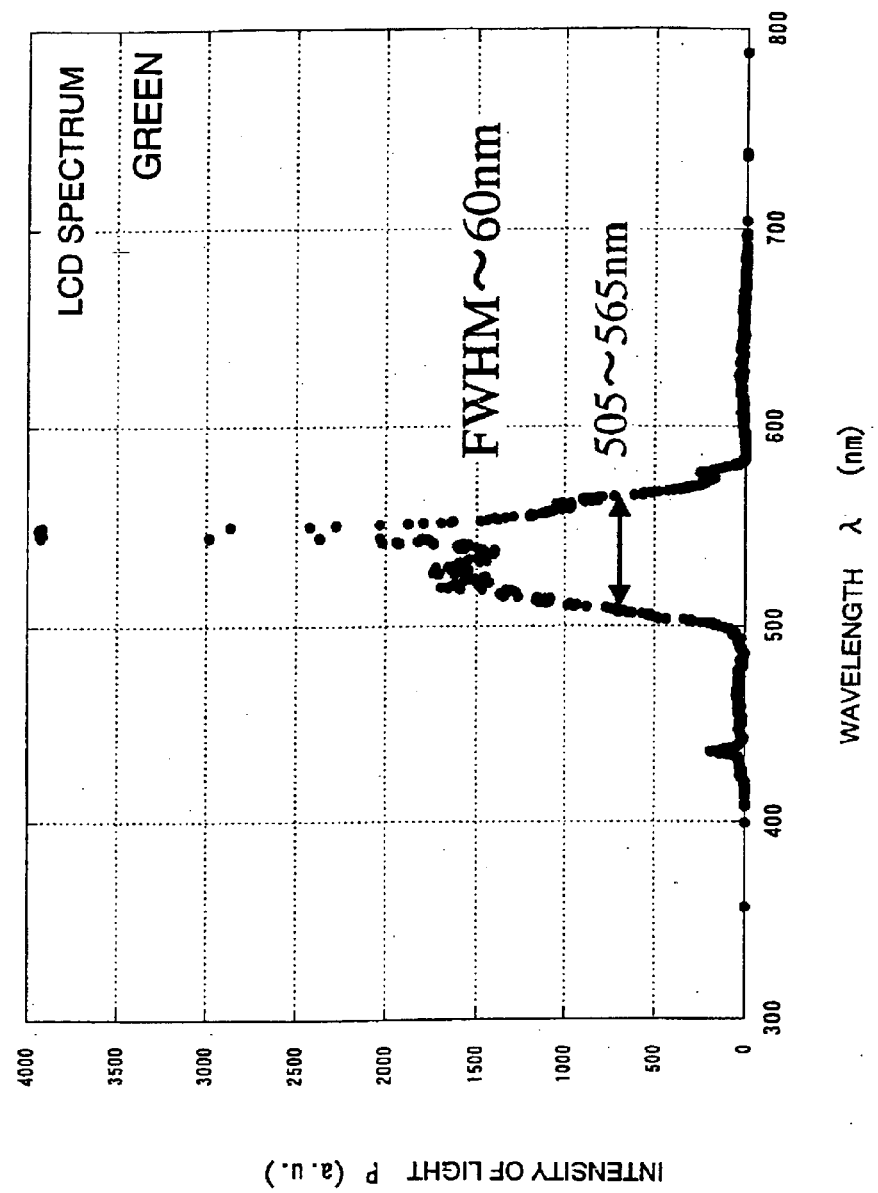
Figure 87:
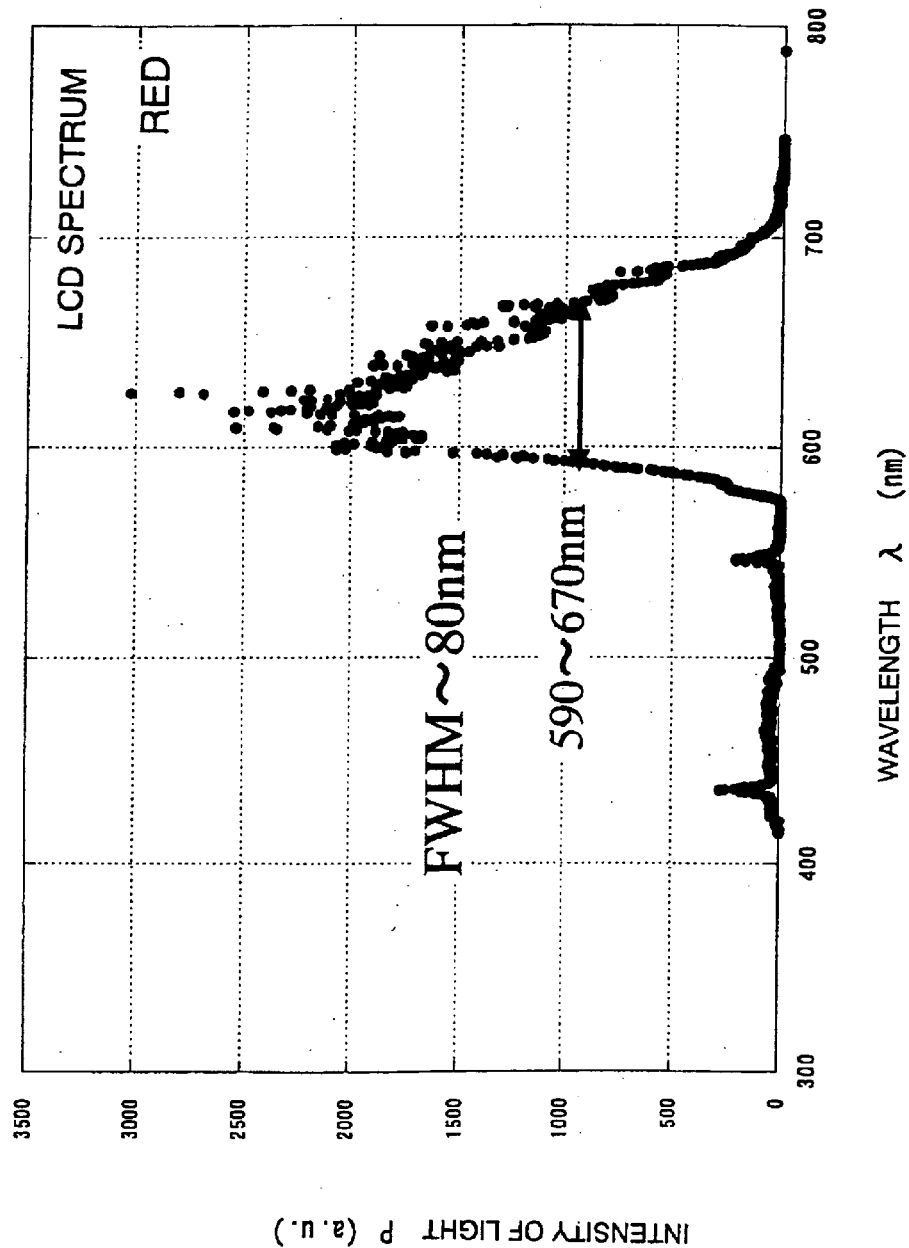
Figure 88:
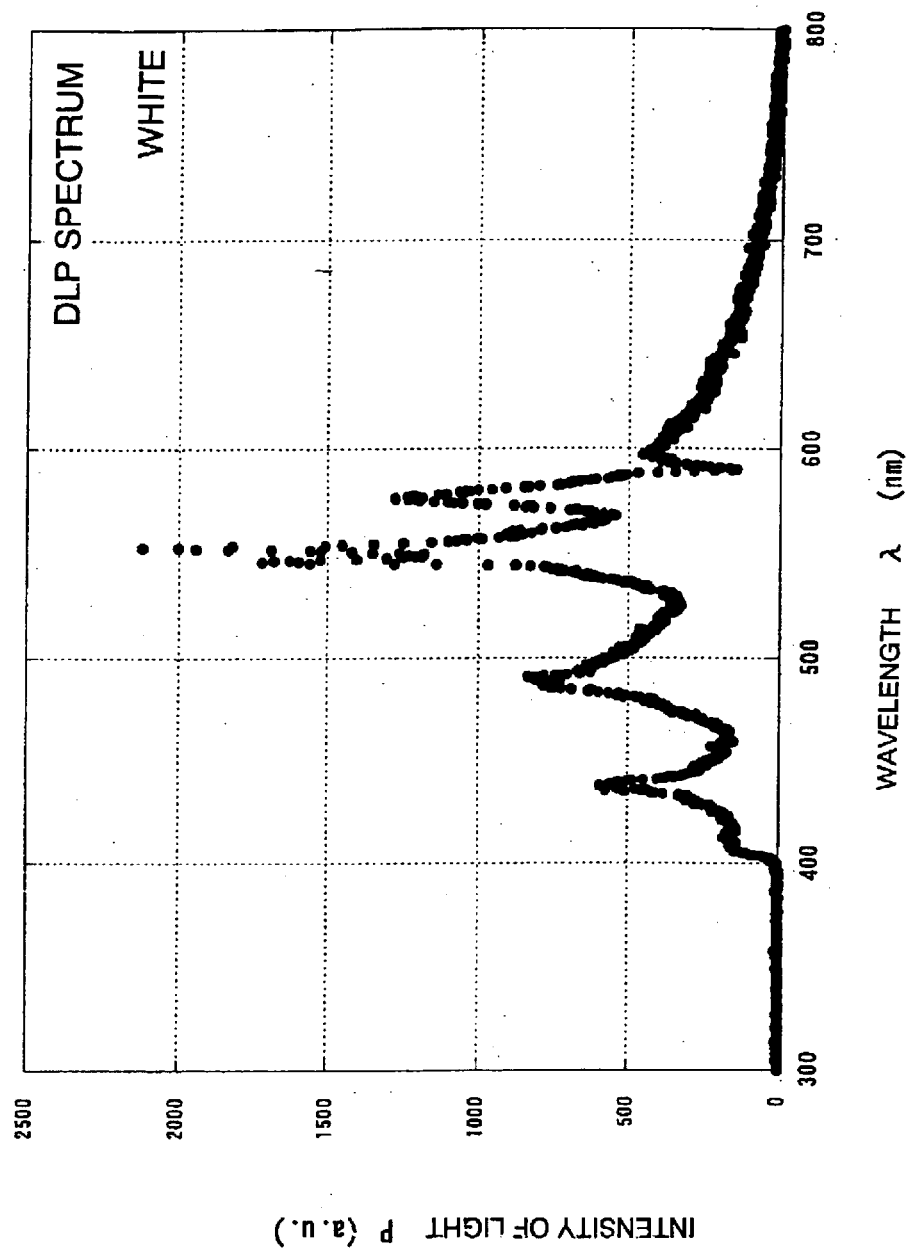
FIGS. 88 through 91 are schematic diagrams that show measured spectrums of light emitted from a DLP projector.
Figure 89:
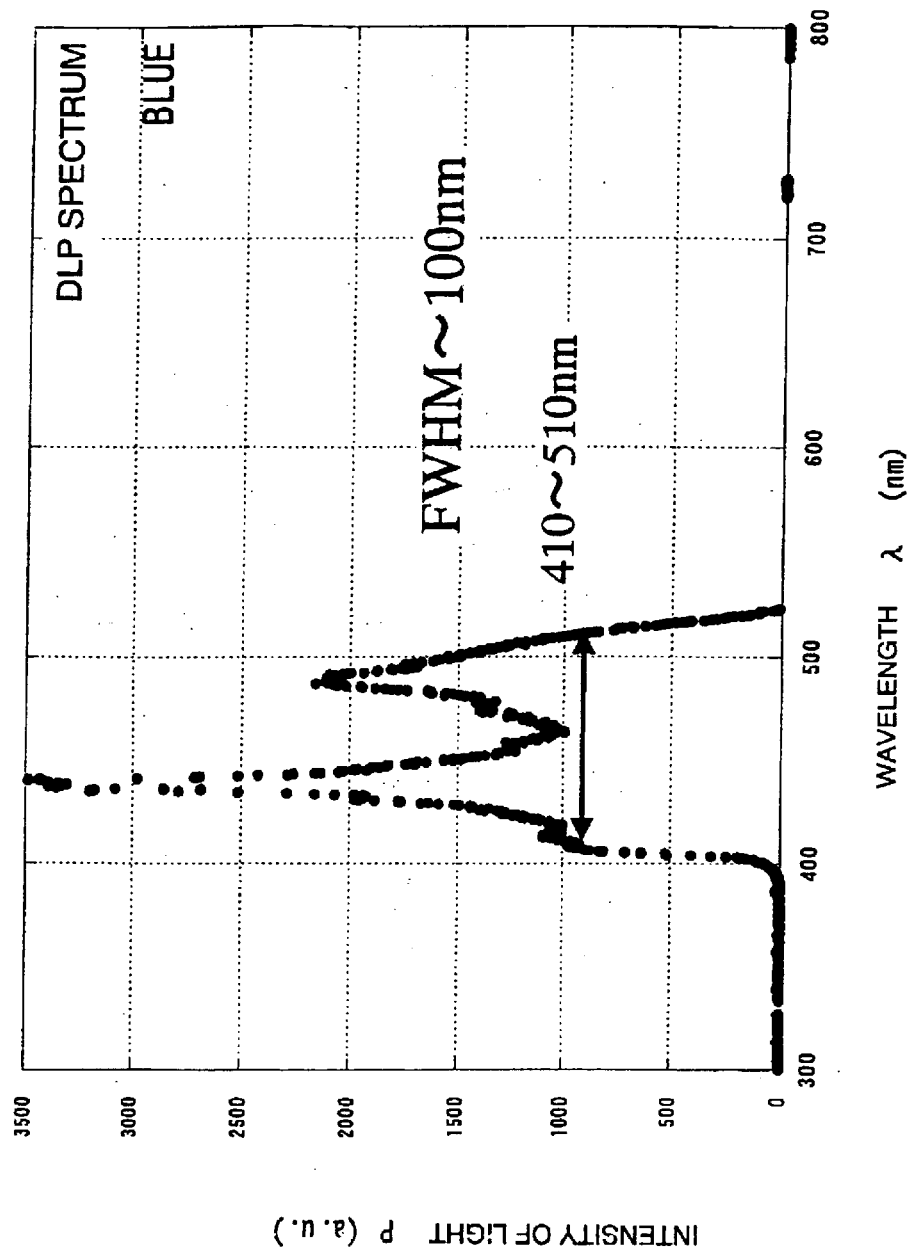
Figure 90:
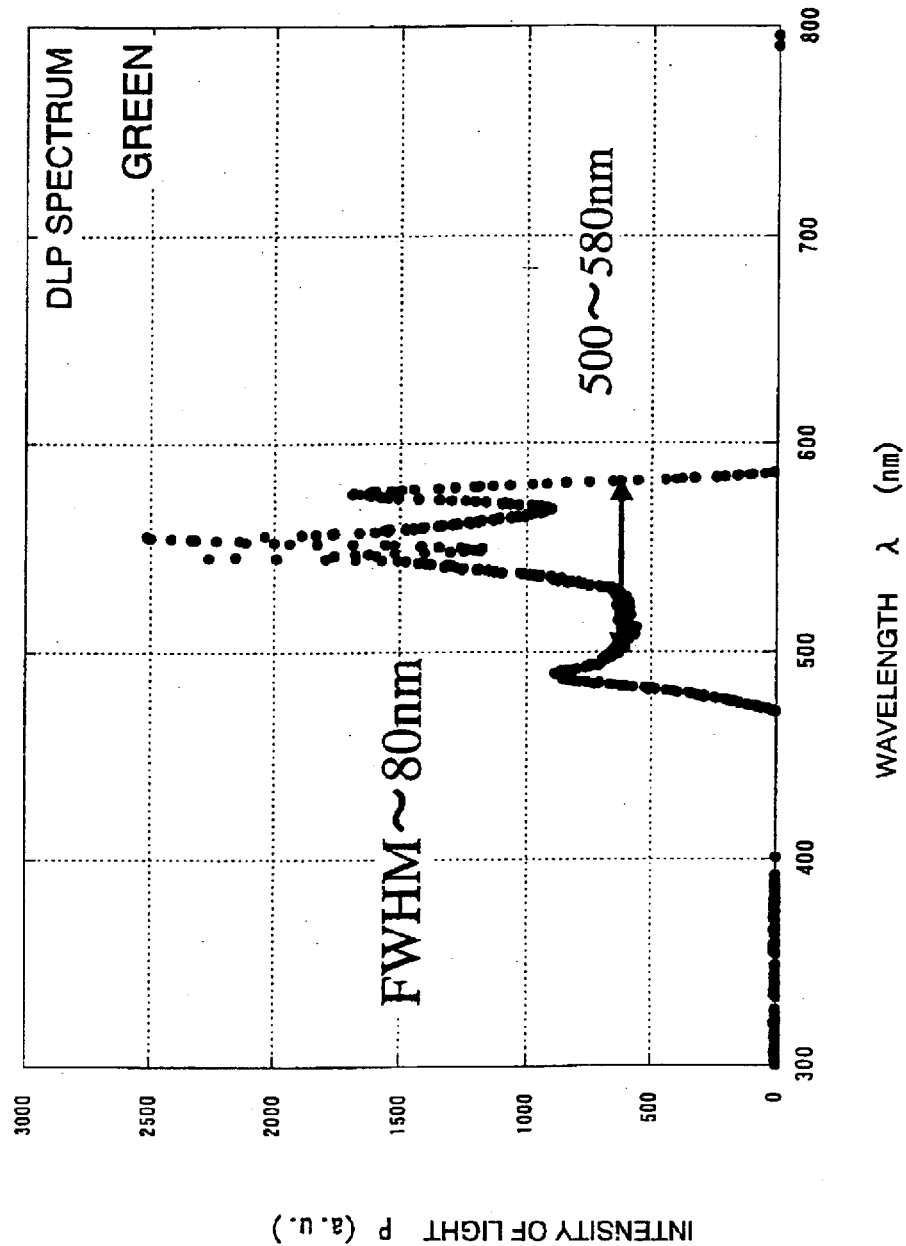
Figure 91:
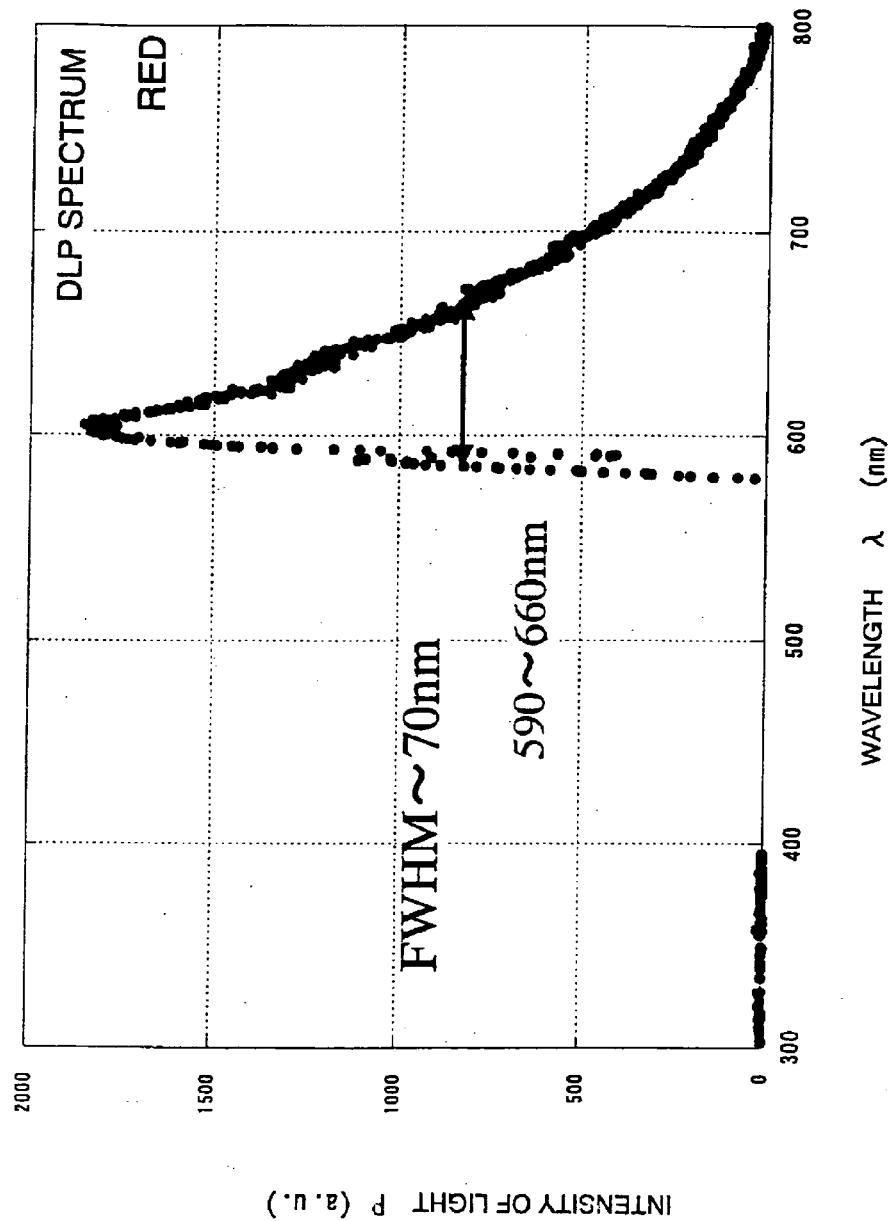
Figure 92:
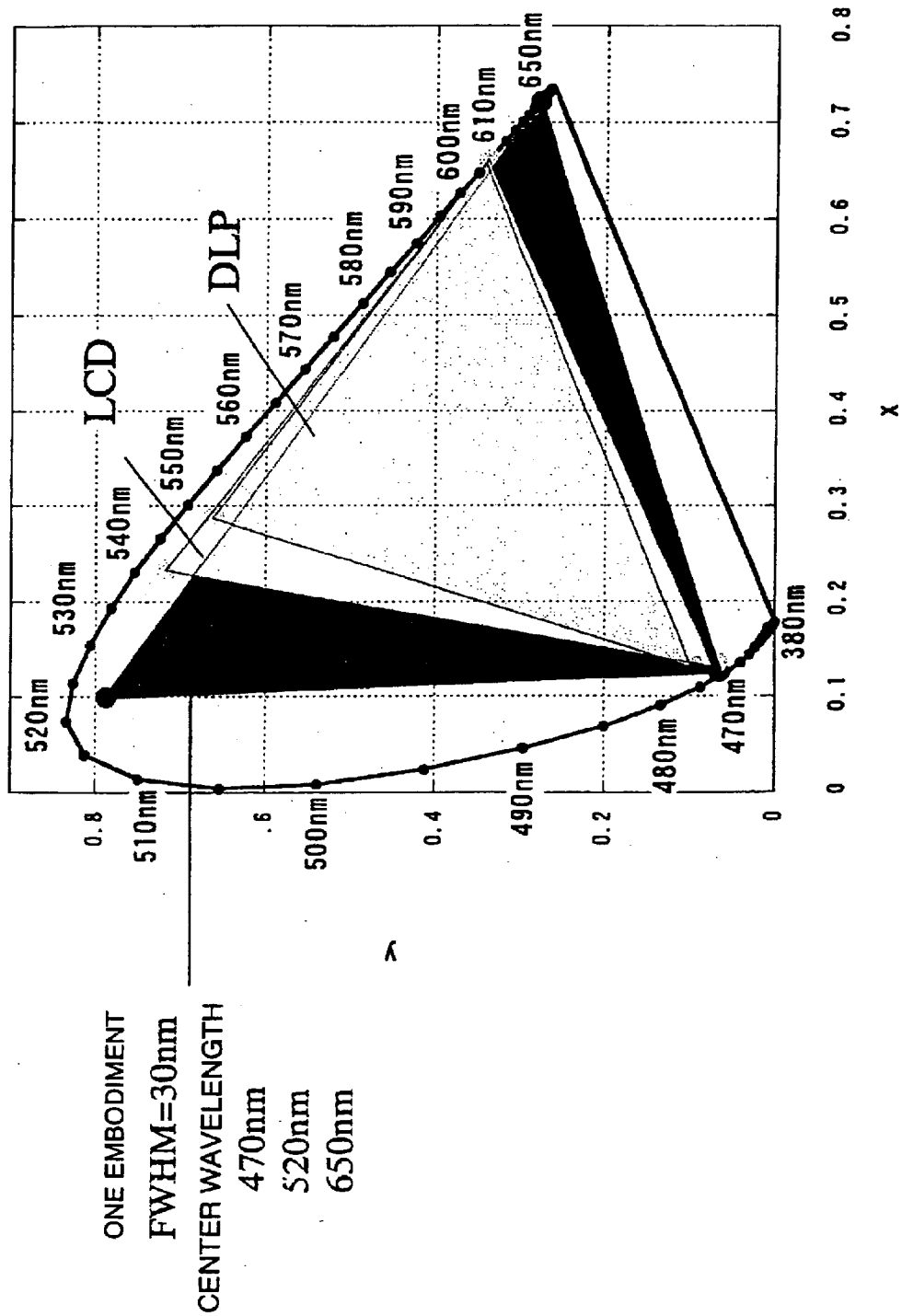
FIG. 92 is a schematic diagram that shows a chromaticity diagram.

FIGS. 84 through 87 and FIGS. 88 through 91 show measured spectrums of light emitted from an LCD (Liquid Crystal Display) projector and a DLP (Digital Light Processing) projector, respectively. FIGS. 84 and 88 show spectrums measured when displaying white, FIGS. 85 and 89 show spectrums when displaying blue, FIGS. 86 and 90 show spectrums measured when displaying green, and FIGS. 87 and 91 show spectrums measured when displaying red. Since a color filter is used to select wavelengths, both the LCD projector and the DLP projector emit light in which the full width at half maximum of the spectrum of each primary color is as wide as 60~100 nm. If here is used an ordinary screen, no change occurs in the full width at half maximum even when light is reflected, and the full width at half maximum of the spectrum determines the color reproducibility. In contrast, in case the screen according to the first embodiment is used, even when the spectrum of each primary color in the light emitted from the projector has a wide full width at half maximum, the predetermined wavelength is selected when the light is reflected by the screen, and the full width at half maximum is narrowed to 30 nm. At that time, the reproducible range of colors on the chromaticity diagram is enlarged, and the color reproducibility is improved. FIG. 92 shows it on the chromaticity diagram. Although the color reproducible range is narrow with DLP and LCD, the use of the screen according to the first embodiment enlarges the range and simultaneously improves the color reproducibility.

Figure 93:
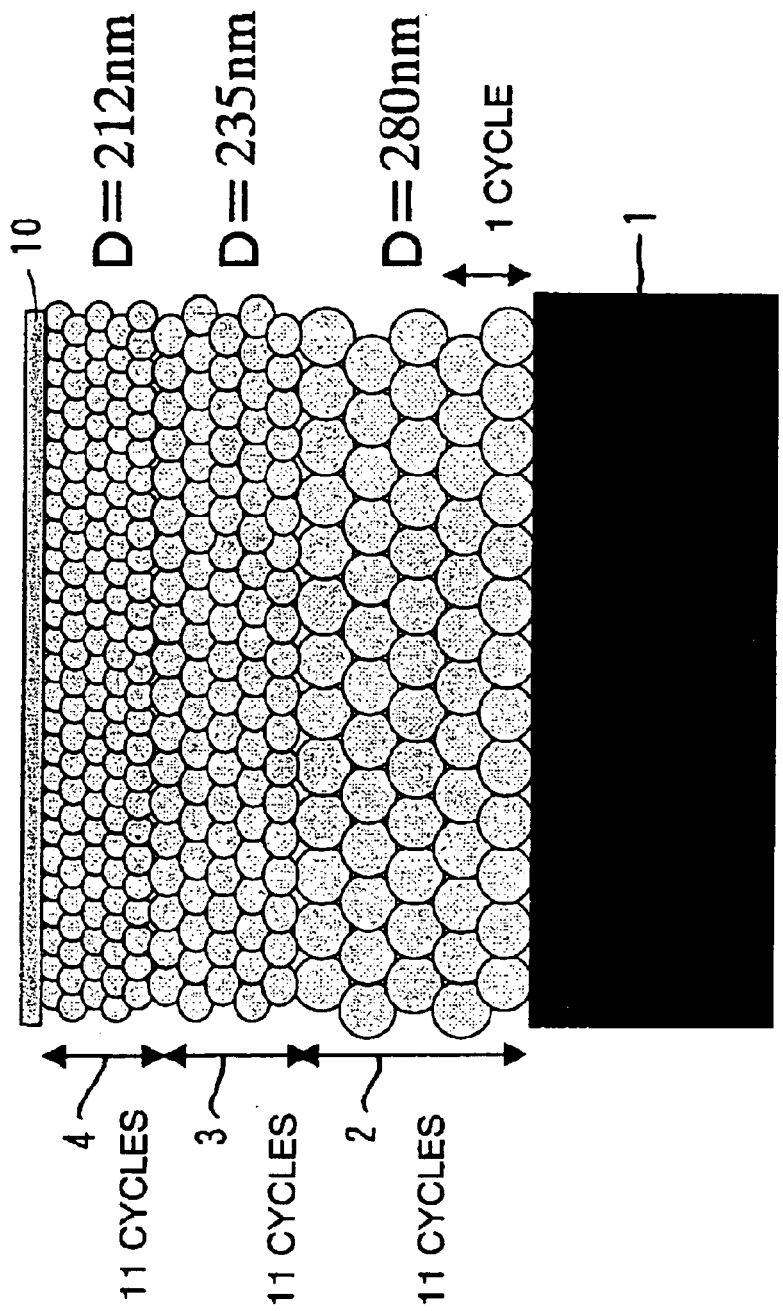
FIG. 93 is a cross-sectional view that shows a screen according to the second embodiment of the invention.

Next explained is a screen according to the second embodiment of the invention. FIG. 93 shows this screen.

As shown in FIG. 93, in the screen according to the second embodiment, a diffusion film 10 is located on the top surface of the particle layer 4. The diffusion film 10 is used to diffuse light and to protect the screen surface. That is, by diffusing the light reflected by the screen with the diffusion film 10, it is possible to moderate the directivity and to uniform the luminosity throughout the screen. In other words, so-called hot spots can be eliminated. The diffusion film 10 can also prevent exfoliation of particles due mechanical damage.

A material transparent in the region of visible light and diffusing light is preferably used as the diffusion film 10. To diffuse light, a distribution of different refractive indices may be made in parallel to the film surface, or undulations may be made on the film surface. Specific materials of the diffusion film 10 include light-diffusing polyethylene films (inherently having a distribution of refractive indices in parallel with the film surface when manufactured), polycarbonate films, polyethylene terephthalate films and polyvinyl chloride films whose surfaces are treated to form undulations. Thickness of the diffusion film 10 is normally not larger than 5 mm, and preferably not larger than 1 mm.

To add the diffusion film 10, after the particle layers 2 through 4 are stacked on the substrate 1, the diffusion film 10 may be spread and bonded on the surface of the particle layer 4 under application of a tensile force. Alternatively, the diffusion layer 10 may be bonded with an adhesive previously coated on the back surface of the diffusion film 10. Furthermore, for the purpose of improving its optical property, the surface of the diffusion film 10 may be processed by ¼ wavelength coating for preventing reflection. In this case, it is important that the coating material has a lower refractive index than that of the film material. More specifically, a $SiO_2$ glass film is coated to a thickness of ~100 nm by mechanical coating or vapor deposition.

In the other respects, the screen taken here is the same as the screen according to the first embodiment, and their detailed explanation is omitted.

Figure 94:
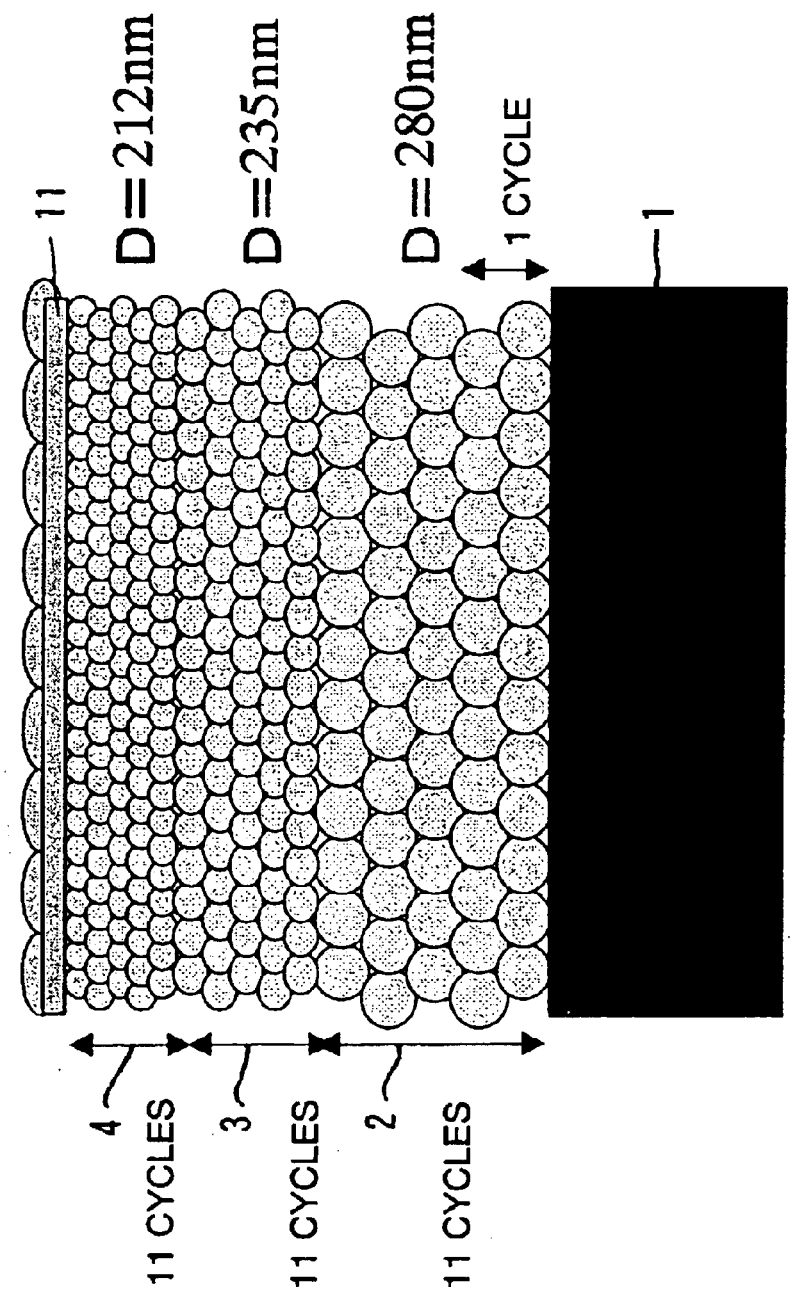
FIG. 94 is a cross-sectional view that shows a screen according to the third embodiment of the invention.

Next explained is a screen according to the third embodiment of the invention. FIG. 94 shows this screen.

As shown in FIG. 94, in the screen according to the third embodiment, a micro lens film 11 having formed a two-dimensional array of micro lenses is located on the top surface of the particle layer 4. The micro lenses of the micro lens film 11 may be any of convex lenses, concave lenses or their mixture. By diffusing light reflected back from the screen with the micro lens film 11, it is possible to moderate the directivity and to uniform the luminosity throughout the screen and thereby eliminate the hot spots. The micro lens film 11 can also prevent exfoliation of particles due mechanical damage.

Any material transparent in the region of visible light is basically usable as the micro lens film 11. For example, polycarbonate, polyethylene terephthalate and polyvinyl chloride are acceptable. It is sufficient for the micro lenses of the micro lens film 11 to be equal or smaller than the pixel size, and lenses sized about 0.1 mm in diameter, for example, may be closely packed along the plane. Furthermore, for the purpose of improving its property, the surface may be processed by ¼ wavelength coating for preventing reflection. In this case, it is important that the coating material has a lower refractive index than that of the lenses of the micro lens film 11. More specifically, a $SiO_2$ glass film may be coated to a thickness of ~100 nm by mechanical coating or vapor deposition.

The same method as that used in the second embodiment is used here again to add the micro lens film 11.

In the other respects, the screen taken here is the same as the screen according to the first embodiment, so their detailed explanation is omitted.

Figure 95:
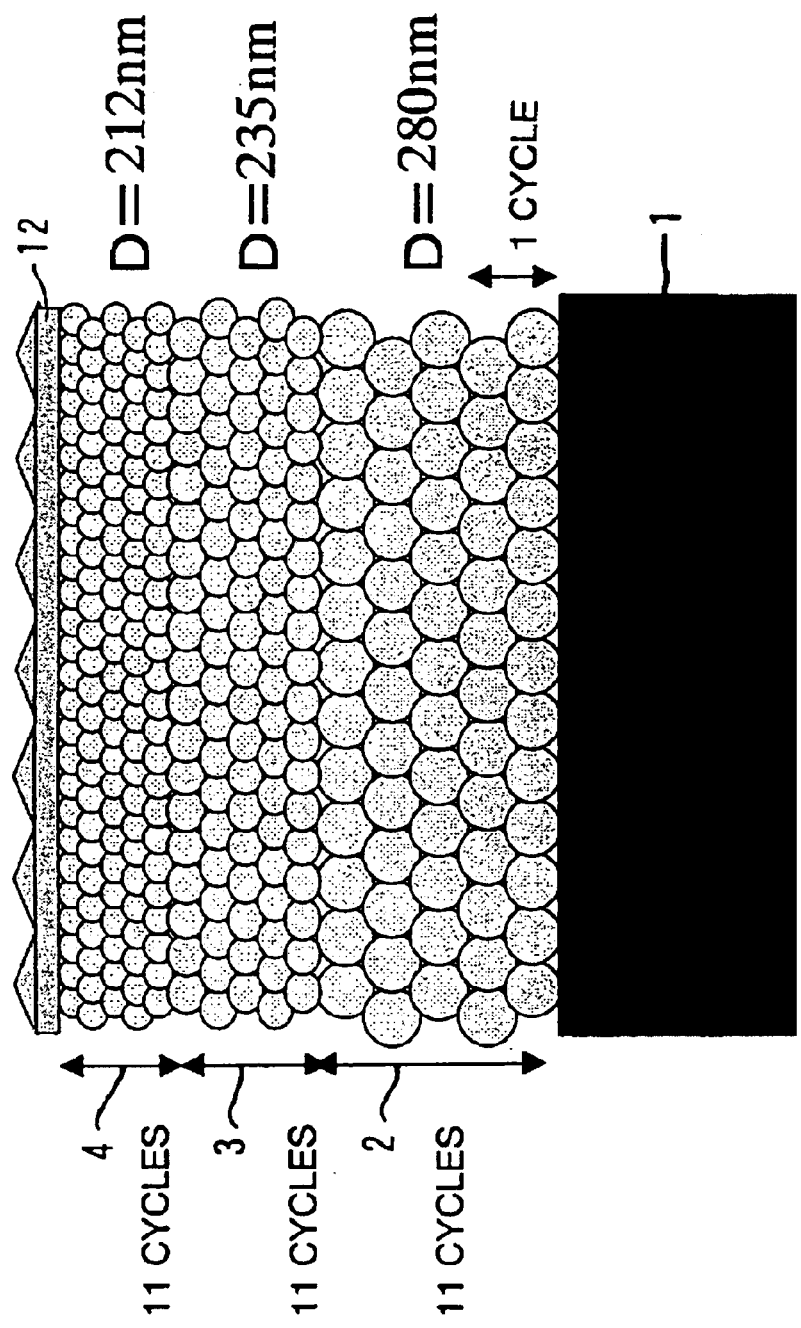
FIG. 95 is a cross-sectional view that shows a screen according to the fourth embodiment of the invention.

Next explained is a screen according to the fourth embodiment of the invention. FIG. 95 shows this screen.

As shown in FIG. 95, in the screen according to the fourth embodiment, a micro prism film 12 having formed a two-dimensional array of micro prisms is located on the top surface of the particle layer 4. By diffusing light reflected back from the screen with the micro prism film 12, it is possible to moderate the directivity and to uniform the luminosity throughout the screen and thereby eliminate the hot spots. The micro prism film 12 can also prevent exfoliation of particles due mechanical damage.

Any material transparent in the region of visible light is basically usable as the micro prism film 12. For example, polycarbonate, polyethylene terephthalate and polyvinyl chloride are acceptable. It is sufficient for the micro lenses of the micro prism film 12 to be equal or smaller than the pixel size, and prisms sized about 0.1 mm in diameter, for example, may be closely packed along the plane. Furthermore, for the purpose of improving its property, the surface may be processed by ¼ wavelength coating for preventing reflection. In this case, it is important that the coating material has a lower refractive index than that of the prisms of the micro prism film 12. More specifically, a $SiO_2$ glass film may be coated to a thickness of ~100 nm by mechanical coating or vapor deposition.

The same method as that used in the second embodiment is used here again to add the micro prism film 12.

In the other respects, the screen taken here is the same as the screen according to the first embodiment, so their detailed explanation is omitted.

Figure 96:
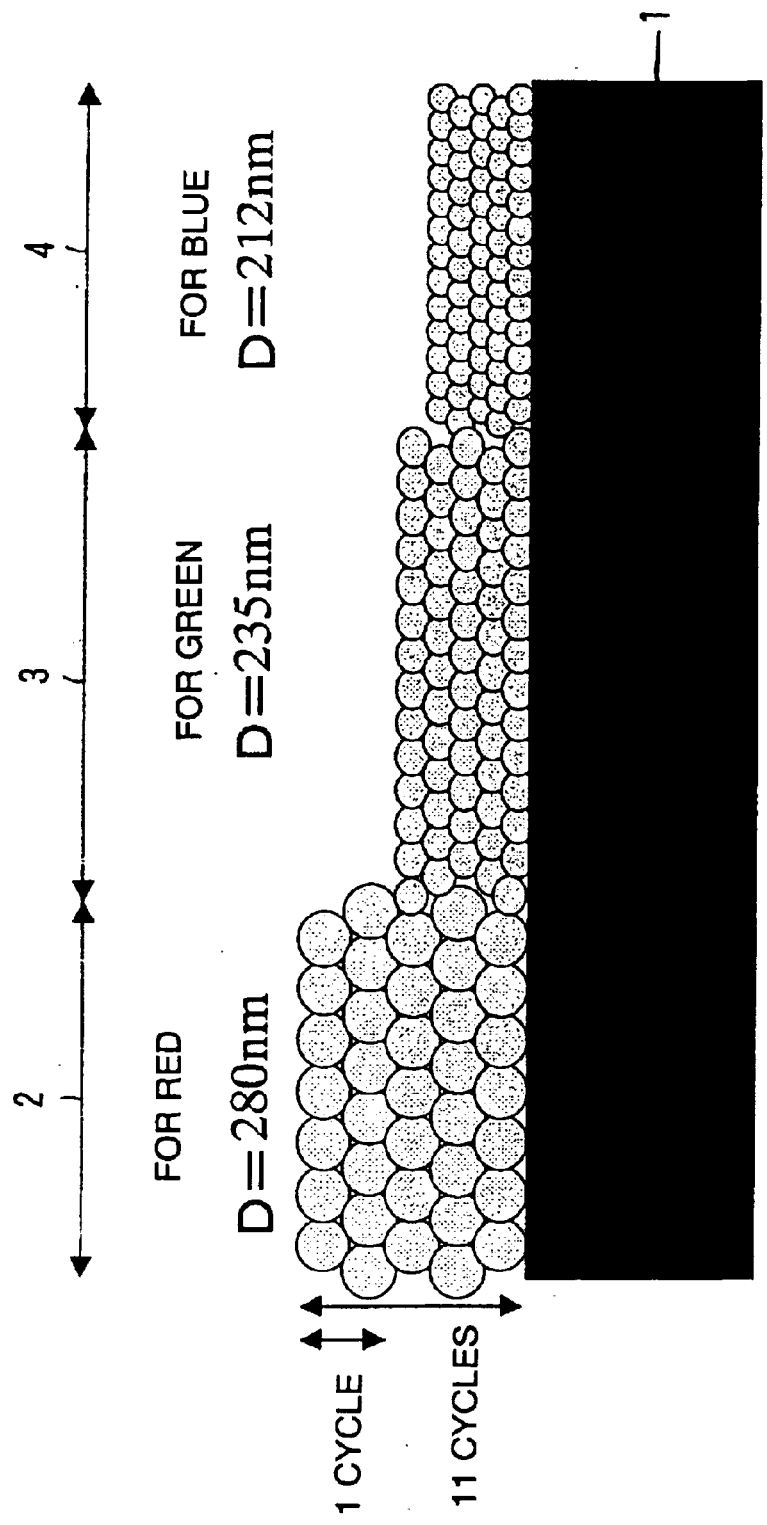
FIG. 96 is a cross-sectional view that shows a screen according to the fifth embodiment of the invention.

Next explained is a screen according to the fifth embodiment of the invention. FIG. 96 shows this screen.

In the first to fourth embodiments already explained, the red-reflecting particle layer 2, green-reflecting particle layer 3 and blue-reflecting particle layer 4 are stacked in the vertical direction (direction normal to the substrate) on the substrate 1. In the fifth embodiment, however, the particle layers 2 through 4 are formed to align in the lateral direction (the direction in parallel to the substrate).

That is, as shown in FIG. 96, in the screen according to the fifth embodiment, the red-reflecting particle layer 2, green-reflecting particle layer 3 and blue-reflecting particle layer 4 are arrayed side by side on the substrate 1.

An example of parallel-to-substrate configurations of the particle layers 2 through 4 and their parallel-to-substrate arrangement pattern are shown in FIG. 97. In FIG. 97A, the particle layers 2 through 4 each having a stripe-shaped parallel-to-substrate configuration are arrayed alternately. Width of each particle layer 2, 3, 4 may be equal to or smaller than ⅓ of the pixel size. In the example shown in FIG. 97B, particle layers 2, 3, 4 each having a rectangular parallel-to-substrate shape are arranged in a checkered pattern. Size of each rectangular particle layer 2, 3, 4 may be equal to or smaller than ⅓ of the pixel size. In the example shown in FIG. 97C, particle layers 2, 3, 4 each having a square parallel-to-substrate shape are arranged in a checkered pattern. Size of each square particle layer 2, 3, 4 may be equal to or smaller than ⅓ of the pixel size.

For forming the particle layers 2 through 4 on the substrate 1, particles for respective colors may be selectively, locally coated on the substrate 1 in an ink-jet manner, or may be selectively, locally coated by screen printing or gravure printing. It is also possible to use masks having openings corresponding to patterns of respective particle layers 2 through 4 to coat particles for respective colors in three steps of coating using the masks, respectively.

In the other respects, the screen taken here is the same as the screen according to the first embodiment, so their detailed explanation is omitted.

According to the fifth embodiment, since the particle layers for three primary colors are arranged in the lateral direction on the substrate 1, the entire particle layers 2 through 4 make a thickness smaller in the vertical direction than that of the particle layers vertically stacked on the substrate 1, and thereby decrease the loss by scattering of light, for example, to ensure efficient absorption of light.

Figure 98:
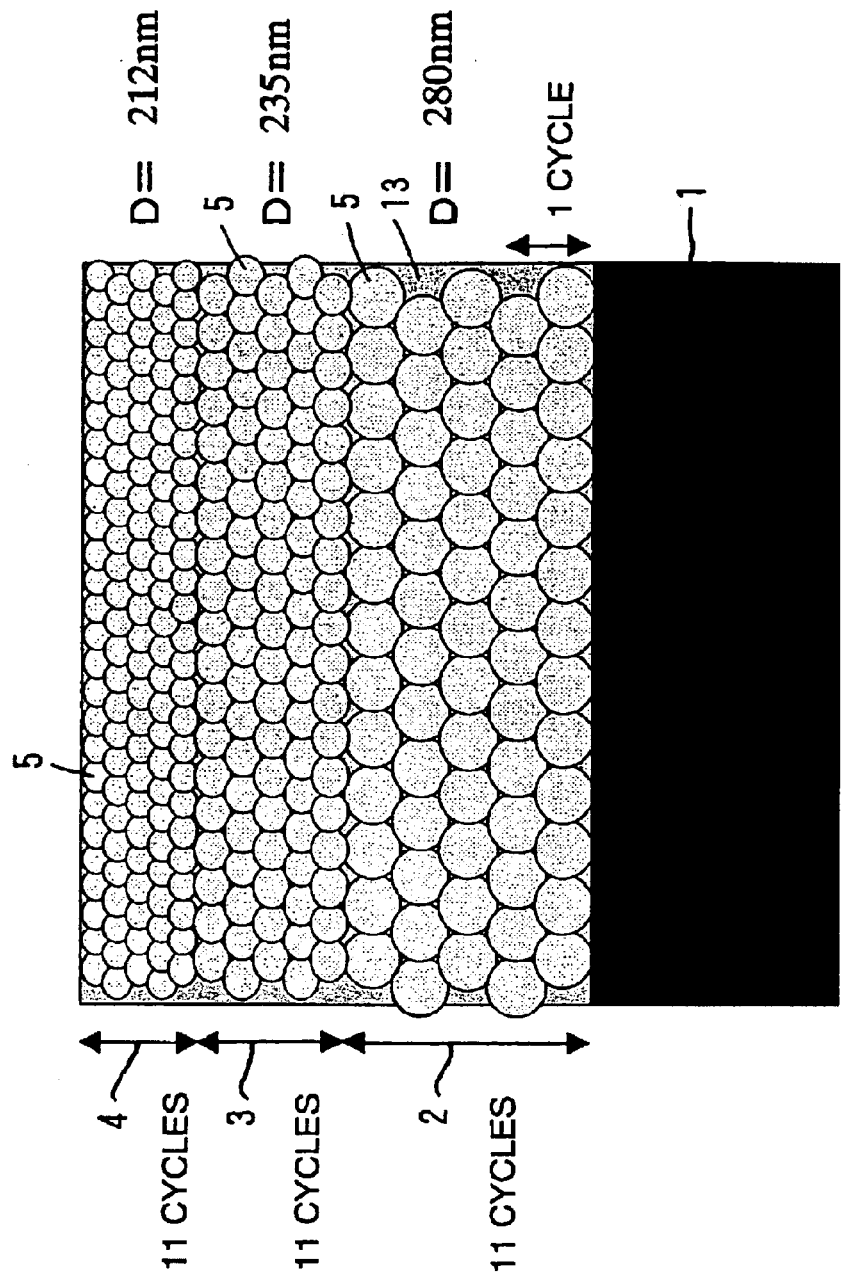
FIG. 98 is a cross-sectional view that shows a screen according to the sixth embodiment of the invention.

Next explained is a screen according to the sixth embodiment of the invention. FIG. 98 shows this screen.

As shown in FIG. 98, in the screen according to the sixth embodiment, a binder 13 buries gaps among particles 5 in the particle layers 2 through 4. It is important to use as the material of the binder 13 a substance having a refractive index different from that of the particles. More specifically, in case the particles are silica particles, for example, polyolefin-based materials such as polypropylene, polyethylene, polyisobutylene and polyvinyl acetate are usable as the binder 13.

For manufacturing this screen, there are some employable methods, such as the method of first forming the particle layers 2 through 4 on the substrate 1, thereafter introducing a solution containing the binder material into the particle layers 2 through 4 and curing it therein, and the method of previously mixing a solution containing the binder material into a colloid solution of particles (such as silica particles) such that the binder material fills gaps among the particles as the particles accumulate.

In the other respects, the screen taken here is the same as the screen according to the first embodiment, so their detailed explanation is omitted.

According to the sixth embodiment, in addition to the same advantages as those of the first embodiment, there are additional advantages, such as improvement of the mechanical strength of the screen by the binder 13 filling gaps among the particles 5 improve, improvement of the optical property such as narrowing the full width at half maximum of the reflection spectrum by controlling the refractive index of the binder 13 relative to the material of the particles 5.

Figure 99:
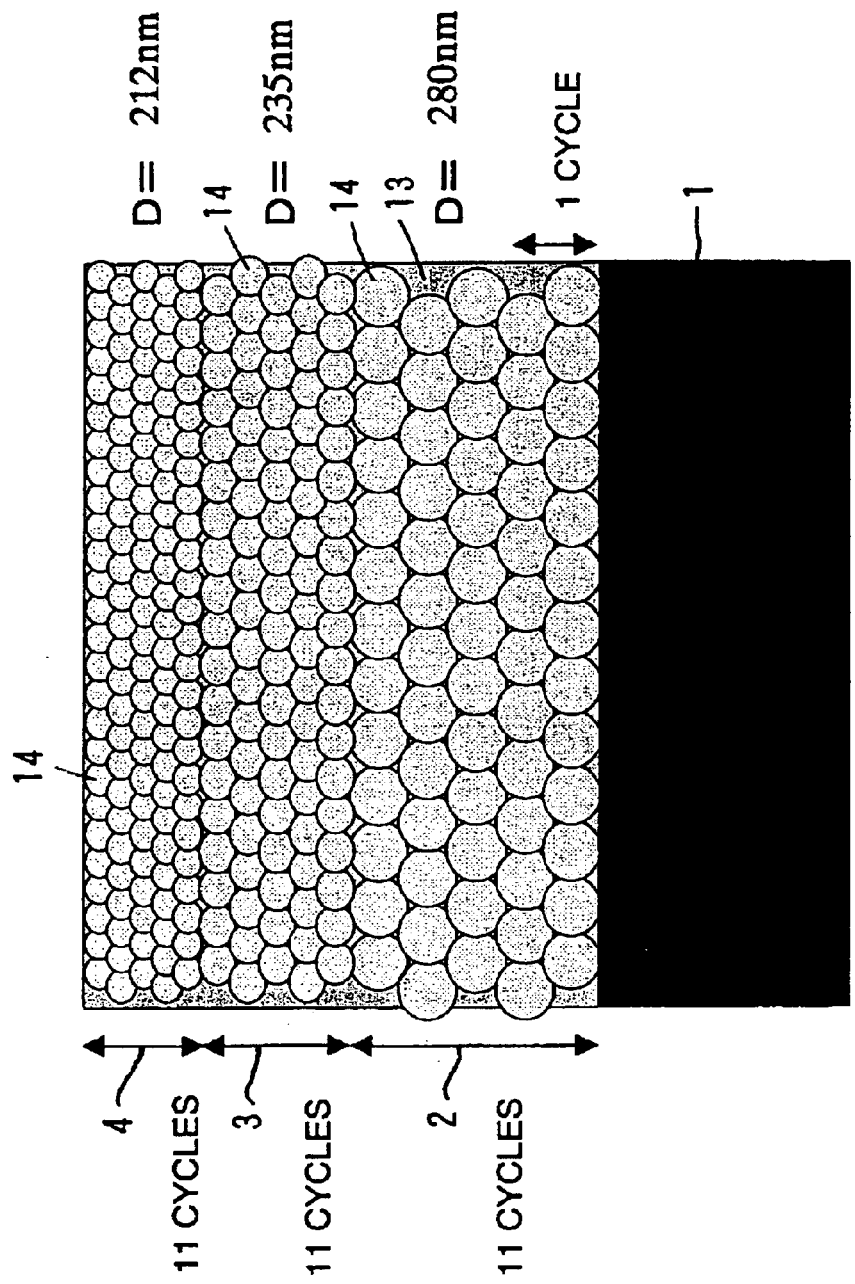
FIG. 99 is a cross-sectional view that shows a screen according to the seventh embodiment of the invention.

Next explained is a screen according to the seventh embodiment of the invention. FIG. 99 shows this screen.

As shown in FIG. 99, in the screen according to the seventh embodiment, the portions corresponding to the particles 5 in the particle layers 2 through 4 of the screen shown in FIG. 98 remain as voids 14 to form a so-called inverse opal structure.

This screen can be manufactured by once forming the particle layers 2 through 4 on the substrate 1, then introducing a binder material into the particle layers 2 through 4, thereafter curing it therein to fill gaps among the particles 5, and thereafter immersing the substrate 1 and the layers 2 to 4 into a predetermined etchant such as a hydrofluoric acid solution to dissolve the particles (such as silica particles).

In the other respects, the screen taken here is the same as the screen according to the first embodiment, so their detailed explanation is omitted.

According to the seventh embodiment, in addition to the same advantages as those of the first embodiment, there is additional advantage that a larger difference of refractive indices can be obtained than that obtained when the particles 5 are silica particles, for example, because the difference of refractive indices between the voids 14 corresponding to particles and the binder 13 is the difference of refractive indices between air and the binder 13. As a result, cycles of lamination of the particle layers that are necessary for ensuring required reflection can be reduced, and this contributes to reducing the thickness of the screen.

Figure 100:
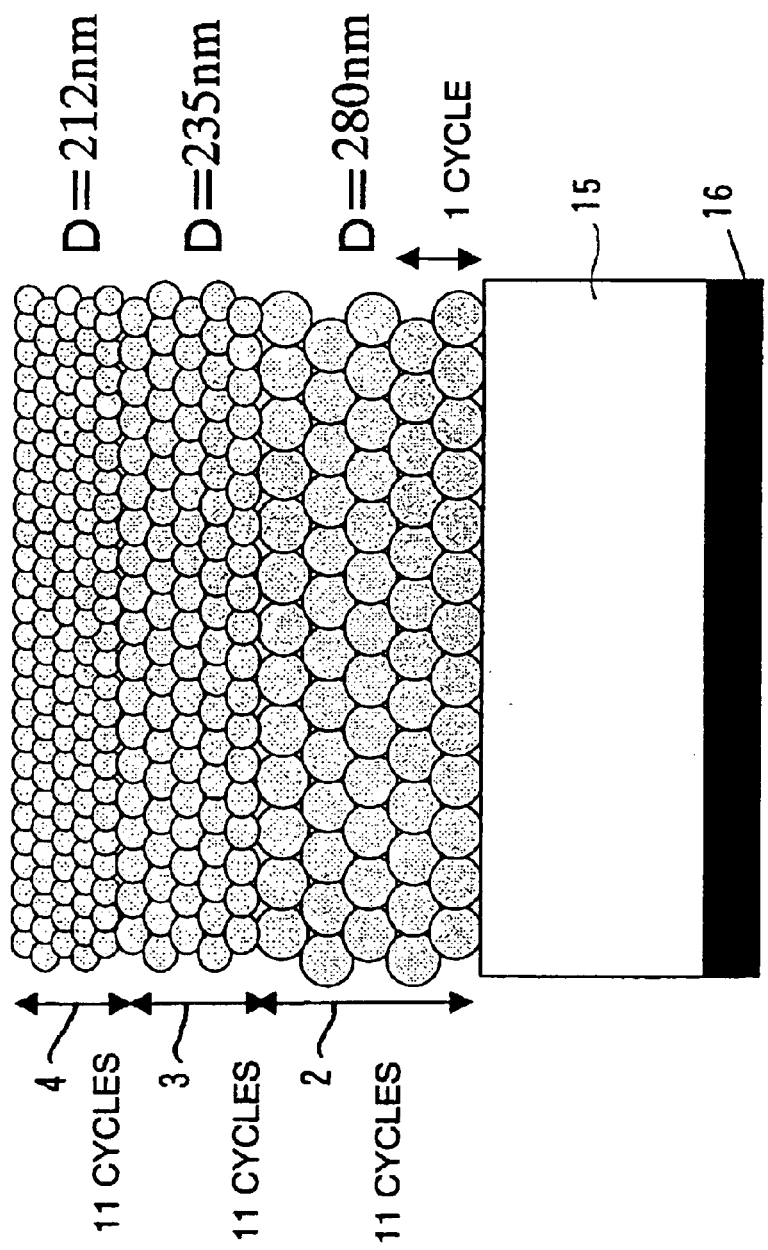
FIG. 100 is a cross-sectional view that shows a screen according to the eighth embodiment of the invention.

Next explained is a screen according to the eighth embodiment of the invention. FIG. 100 shows this screen.

As shown in FIG. 100, in the screen according to the eighth embodiment, a transparent substrate 15 having absorption layer 16 on its back surface is used as the substrate. The absorption layer 16 may be made of a material that can absorb light of wavelengths other than those of three primary colors. For example, a carbon film may be used. More specifically, the transparent substrate 15 may be, for example, a transparent glass substrate or polycarbonate substrate, and the absorption layer 16 may be a carbon film coated on the back surface of the substrate.

Thickness of the absorption layer 16 is determined depending on its material so as to sufficiently absorb light of wavelengths other than three primary colors. Thickness of the absorption layer 16, when it is a carbon film, is explained here. That is, absorption coefficient $\alpha$ of carbon is generally $10^3 \sim 10^5$ cm$^{-1}$, although it depends on the manufacturing method when the traveling distance of light in the absorption layer 16 is x, the intensity of light P is expressed by $P(x)/P(0)=\exp(-\alpha x)$. Therefore, in case of $\alpha=10^5$ cm$^{-1}$, thickness d of the carbon film may be 0.1 $\mu$m for weakening the intensity of light to 1/e (e: base of the natural logarithm) as sufficient absorption. Therefore, thickness at least of d=0.1 $\mu$m is necessary. Further, for weakening the intensity of light to 1/e also under $\alpha=10^3$ cm$^{-1}$, thickness of the carbon film must be d=10 $\mu$m. Taking account of them, it is important that the thickness of the carbon film is not smaller than 0.1 $\mu$m, and more preferably, not less than 10 $\mu$m.

In the other respects, the screen taken here is the same as the screen according to the first embodiment, so their detailed explanation is omitted.

According to the eighth embodiment, in addition to the same advantages as those of the first embodiment, there is the additional advantage that the material of the substrate can be selected more freely because the substrate itself may be incapable of absorbing of light.

Figure 101:
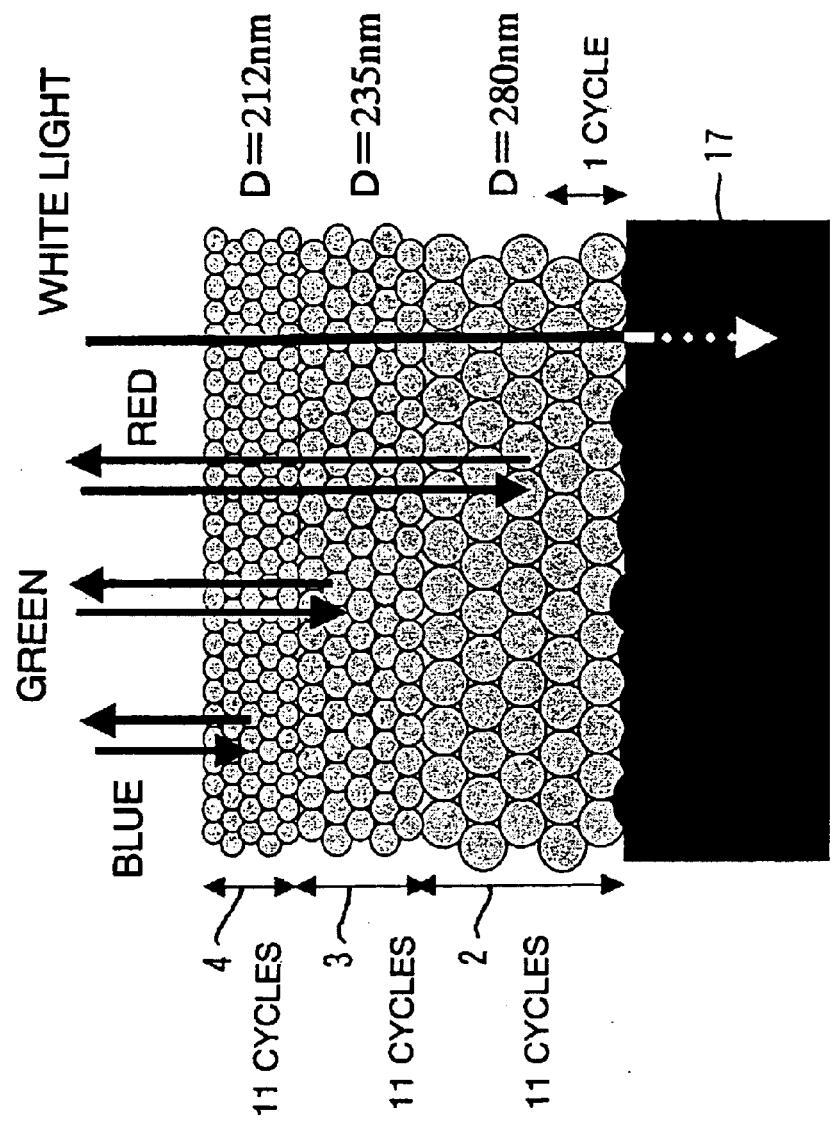
FIG. 101 is a cross-sectional view that shows a screen according to the ninth embodiment of the invention.

Next explained is a screen according to the ninth embodiment of the invention. FIG. 101 shows this screen.

As shown in FIG. 101, in the screen according to the ninth embodiment, a black (capable of absorbing light of wavelengths other than three primary colors) PET film 17 having a rough surface made by surface roughening by sand processing is used as the substrate. Sand processing is a surface treatment for roughening the surface by rubbing it with a file, for example. Height from the bottom to the top of the irregularity on the surface of the PET film 17 may be, for example, 0.8~4 $\mu$m. In this case, the roughed surface of the PET film 17 exhibits a good wettability, a solution 6 containing particles 5 like silica particles diffused therein can be easily coated. Further, since the surface irregularity of the PET film 17 moderates the directivity of light, hot spots are unlikely to generate.

In the other respects, the screen taken here is the same as the screen according to the first embodiment, so their detailed explanation is omitted.

According to the ninth embodiment, in addition to the same advantages as those of the first embodiment, there is the additional advantage that the use of the inexpensive PET film 17 as the substrate decreases the manufacturing cost of the screen.

Figure 102:
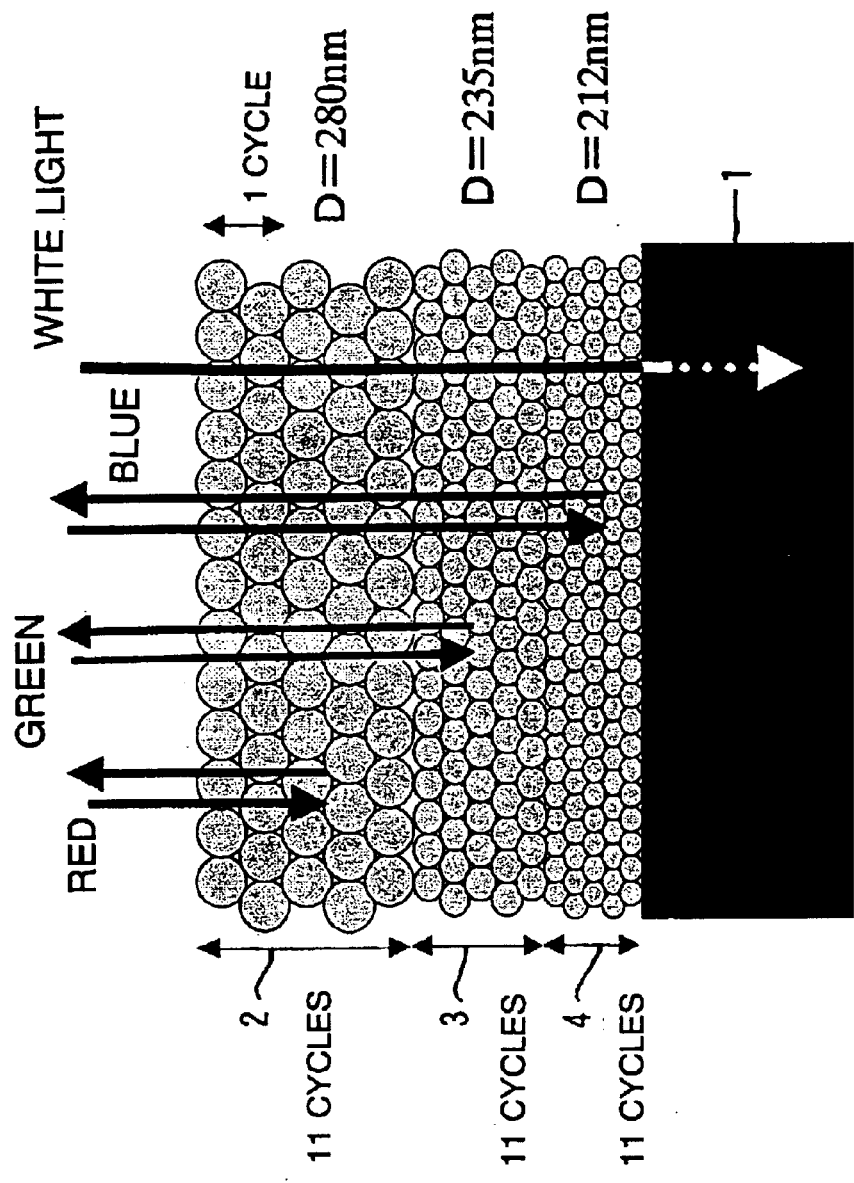
FIG. 102 is a cross-sectional view that shows a screen according to the tenth embodiment of the invention.

Next explained is a screen according to the tenth embodiment of the invention. FIG. 102 shows this screen.

In the first embodiment already explained, the red-reflecting particle layer 2, green-reflecting particle layer 3 and blue-reflecting particle layer 4 are sequentially, vertically stacked on the substrate 1. However, the stacking order of the particle layer 2 to 4 need not always follow this order. From the viewpoint of better alignment (crystal property) of particles 5, the opposite stacking order is rather preferable. In the tenth embodiment, a structure stacking the particle layers 2 to 4 in the opposite order will be explained.

That is, as shown in FIG. 102, in the screen according to the tenth embodiment, the blue-reflecting particle layer 4, green-reflecting particle layer 3 and red-reflecting particle layer 2 are sequentially stacked on the substrate 1. In this case, since the grain size of the particles 5 in the blue-reflecting particle layer 4 is the smallest. Therefore, if the particles 5 are aligned on the substrate 1, the surface irregularity of the particle layer is smallest. In case the particles of the green-reflecting particle layer 3 having the next larger grain size are aligned on the base surface with the smallest irregularity, their alignment is unlikely to get disordered, the their crystal quality is improved. Similarly, also when the particles 5 of the red-reflecting particle layer 2 having the next larger grain size are aligned on the particle layer 3, their alignment is unlikely to get disordered, and the crystal quality is improved. In this manner, the crystal property can be improved in all particle layers 2 to 4.

In the other respects, the screen taken here is the same as the screen according to the first embodiment, so their detailed explanation is omitted.

According to the tenth embodiment, in addition to the same advantages as those of the first embodiment, there is the additional advantage that, because of the good crystal quality in all particle layers, the full width at half maximum of the reflection spectrum is narrow, and it is possible to efficiently reflect three primary colors while reliably absorbing the other part of light into the substrate 1.

Figure 103:
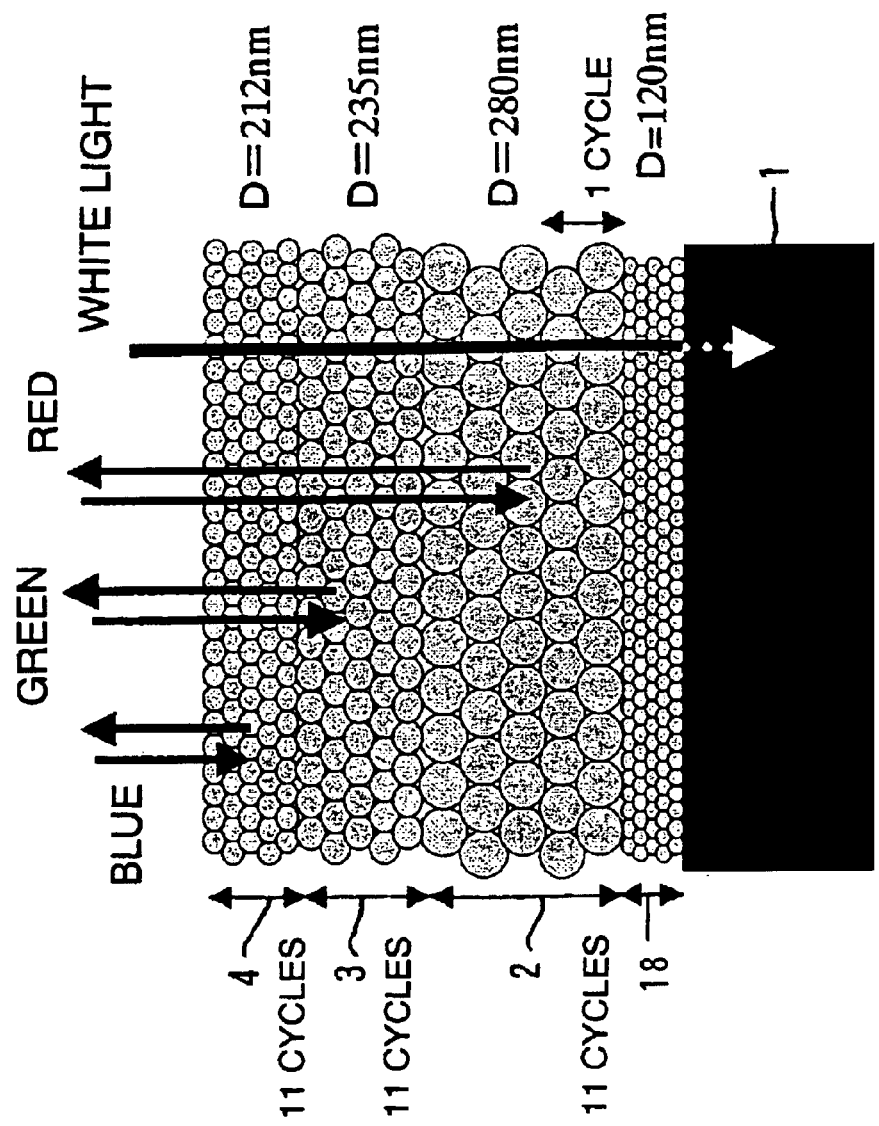
FIG. 103 is a cross-sectional view that shows a screen according to the eleventh embodiment of the invention.

Next explained is a screen according to the eleventh embodiment of the invention. FIG. 103 shows this screen.

As shown in FIG. 103, in the screen according to the eleventh embodiment, the red-reflecting particle layer 2, green-reflecting particle layer 3 and blue-reflecting particle layer 4 are sequentially stacked on the substrate 1 via a buffer layer 18. The buffer layer 18 is a particle layer made up of particles that are smaller in diameter than the particles of the blue-reflecting particle layer 4, namely, particles of D=120 nm, for example.

The screen is manufactured by first stacking the particle layer as the buffer layer 18 on the substrate and thereafter stacking particle layers 2 to 4 thereon.

In the other respects, the screen taken here is the same as the screen according to the first embodiment, so their detailed explanation is omitted.

According to the eleventh embodiment, in addition to the same advantages as those of the first embodiment, there are the following additional advantages. Since the buffer layer 18 in for of the particle layer is first stacked on the substrate 1 and the particle layers 2 to 4 are stacked thereon, the wettability of the base layer of the particle layer 2 to 4 is improved as compared with the structure directly stacking the particle layers 2 to 4 on the substrate 1. As a result, the crystal quality of the particle layers 2 to 4 can be improved. Furthermore, since the diameter of particles of the particle layer as the buffer layer 18 is D=120 nm that is smaller than that of the blue-reflecting particle layer 4, when light is projected onto the screen, wavelength of Bragg's reflection from the buffer layer 18 is shorter than the wavelength of visible light, and the Bragg's reflection does not adversely affects the screen property.

Figure 104:
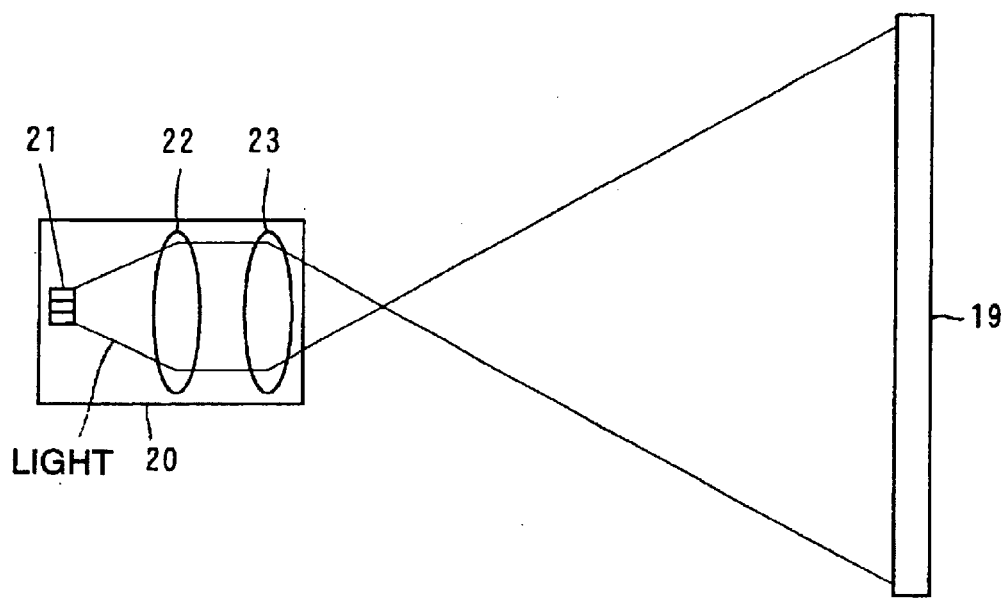
FIGS. 104 and 105 are schematic diagrams that show an image display system according to the twelfth embodiment of the invention.

Next explained is an image display system according to the twelfth embodiment of the invention. FIG. 104 shows configuration of this image display system, and FIG. 105 shows a perspective view of the same image display system.

Figure 105:
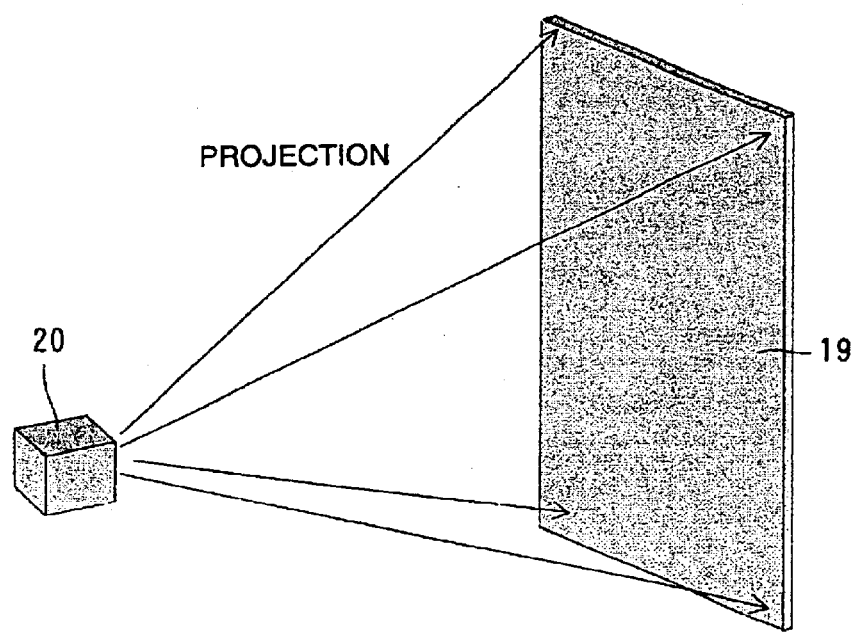

As shown in FIGS. 104 and 105, the image display system according to the twelfth embodiment comprises a screen 19 according to any of the first to eleventh embodiment, and a projector 20 for projecting images onto the screen 19. The projector 20 includes a light source 21 capable of emitting red, green and blue light, and condenser and projector lenses 22, 23. The light source 21 is comprises semiconductor light emitting elements, which may be either semiconductor lasers or light emitting diodes, capable of emitting red, green and blue light. More specifically, in case of using semiconductor lasers as the light source 21, for example, an AlGaInP compound semiconductor laser may be uses as the red-emitting semiconductor laser, a ZnSe compound semiconductor laser as the green-emitting semiconductor laser, and a GaN compound semiconductor laser as the blue-emitting semiconductor laser.

Heretofore, the invention has been explained by way of some embodiments. The invention, however, is not limited to these embodiments but involves various changes or modifications within the technical concept and scope of the invention.

For example, numerical values, structures, shapes, materials and method of stacking particles shown and explained in conjunction with the embodiments are not but mere examples, and other numerical values, structures, shapes, materials and methods for stacking particles may be used alternatively.

Further, although the third embodiment has been explained as providing the micro lens film 11 on the top surface of the particle layer 4 and the fourth embodiment has been explained as providing the micro prism film 12 on the top surface of the particle film 4, it is also acceptable to provide a film made up of a mixture of micro lenses and micro prisms on the top surface of the particle layer 4.

As described above, according to the invention, clean images can be obtained in which black-displaying portions are lowered in luminance level without deterioration of the contrast of the images even when external light irrelevant to the images intrudes onto the screen. In addition, with the screen according to the invention, a dark room need not always used for projection, but even upon projection under normal fluorescent lamps or under open air, the contrast does not degrade.

Furthermore, in case images are formed by projecting light from semiconductor lasers or LEDs, which is narrow in the full width at half maximum and excellent in color purity, by efficiently, selectively reflecting light of images exclusively and cutting light of other wavelengths, it is possible to maintain a high contrast and to significantly lower the luminance level of black-displaying portions. Moreover, even when light having a wide full width at half maximum of the spectrum of each primary color is projected from a liquid crystal projector, for example, the color reproducibility on the chromaticity diagram is improved, and pure colors can be expressed.

What is claimed:

1. A screen comprising a structure in which particles having a size not larger than 1 µm are regularly aligned, said screen including a layer or a bulk substrate for absorbing visible light;
wherein said layer or bulk substrate for absorbing visible light underlies said particles.

2. The screen according to claim 1 wherein said particles are regularly aligned by self-organization.

3. The screen according to claim 1 wherein said particles are aligned into a close-packed structure.

4. The screen according to claim 1 having a structure including three kinds of said particles different in diameter to simultaneously reflect light of wavelengths corresponding to red, green and blue three primary colors.

5. The screen according to claim 1 wherein silica particles or particles equal in refractive index to silica are used as said particles.

6. The screen according to claim 5 wherein particles having a diameter not smaller than 269×(1.36/n) nm and not larger than 314×(1.36/n) nm are used for reflecting red, particles having a diameter not smaller than 224×(1.36/n) nm and not larger than 251×(1.36/n) nm are used for reflecting green, and particles having a diameter not smaller than 202×(1.36/n) nm and not larger than 224×(1.36/n) nm are used for reflecting blue (where n is the refractive index of the particle).

7. The screen according to claim 5 wherein particles having a diameter not smaller than 278×(1.36/n) nm and not larger than 305×(1.36/n) nm are used for reflecting red, particles having a diameter not smaller than 224×(1.36/n) nm and not larger than 237×(1.36/n) nm are used for reflecting green, and particles having a diameter not smaller than 208×(1.36/n) nm and not larger than 217×(1.36/n) nm are used for reflecting blue (where n is the refractive index of the particle).

8. The screen according to claim 1 wherein a red-reflecting particle layer, a green-reflecting particle layer and a blue-reflecting particle layer are stacked in the vertical direction on a substrate.

9. The screen according to claim 8 wherein the stacking cycles are not less than eight and not more than 15.

10. The screen according to claim 8 wherein said substrate is a transparent substrate having a layer for absorbing visible light on the back surface thereof.

11. The screen according to claim 8 wherein said substrate is a PET film.

12. The screen according to claim 8 wherein an irregularity or a film for improving the wettability is formed on the surface of said substrate.

13. The screen according to claim 8 wherein a light diffusion medium is provided on said particle layers.

14. The screen according to claim 13 wherein said light diffusing medium is a diffusion film.

15. The screen according to claim 13 wherein said light diffusing medium is a micro lens film.

16. The screen according to claim 13 wherein said light diffusing medium is a micro prism film.

17. The screen according to claim 8 wherein a red-reflecting particle layer, a green-reflecting particle layer and a blue-reflecting particle layer are formed on said substrate via a buffer layer.

18. The screen according to claim 17 wherein said buffer layer is a layer of particles having a diameter not larger than 208×(1.36/n) nm.

19. The screen according to claim 1 wherein a red-reflecting particle layer, a green-reflecting particle layer and a blue-reflecting particle layer are sequentially stacked in the vertical direction on a substrate.

20. The screen according to claim 1 wherein a blue-reflecting particle layer, a green-reflecting particle layer and a red-reflecting particle layer are sequentially stacked in the normal direction on a substrate.

21. The screen according to claim 1 wherein a red-reflecting particle layer, a green-reflecting particle layer and a blue-reflecting particle layer are arrayed in the lateral direction on a substrate.

22. The screen according to claim 21 wherein the stacking cycles are not less than eight cycles and not more than fifteen cycles.

23. The screen according to claim 21 wherein said red-reflecting particle layer, said green-reflecting particle layer and said blue-reflecting particle layer are stripe-shaped, rectangular-shaped or square-shaped, and said particle layers are arrayed in a predetermined alignment pattern on said substrate.

24. The screen according to claim 1 wherein said layer or bulk substrate for absorbing visible light absorbs of all wavelength bands.

25. The screen according to claim 1 wherein gaps among said particles are filled by a binder.

26. The screen according to claim 25 wherein said particles are voids, said voids being empty cavities or pockets.

27. The screen according to claim 1 including an aggregate of said particles.

28. The screen according to claim 27 wherein the size of said aggregate of said particles in the direction parallel to said substrate is not larger than 22 cycles.

29. The screen according to claim 27 wherein said aggregate of said particles has in combination slanting surfaces inclined from the crystal axis thereof and a surface having an angle different from that of said slanting surfaces.

30. The screen according to claim 29 wherein the angle $\theta$ of said slanting surfaces is in the range of $70° \leq \theta \leq 90°$.

31. The screen according to claim 27 wherein said aggregate of said particles has a curved surface.

32. The screen according to claim 27 wherein the crystal axis of said aggregate of particles inclines from the incident direction of light by an angle a in the range from $77.4° \leq \alpha \leq 90°$.

33. The screen according to claim 27 wherein said aggregate of particles has undulations.

34. A screen configured to reflect light of specific wavelengths by using a photonic crystal, said screen including a layer or a bulk substrate for absorbing visible light;
wherein said layer or bulk substrate for absorbing visible light absorbs visible light of all wavelength bands.

35. The screen according to claim 34 wherein said photonic crystal has a structure of a regular alignment of particles.

36. The screen according to claim 35 wherein said particles are regularly aligned by self-organization.

37. The screen according to claim 35 wherein said particles are aligned into a close-packed structure.

38. The screen according to claim 34 including three kinds of cycles of said photonic crystal to simultaneously reflect light of wavelengths corresponding to red, green and blue three primary colors.

39. The screen according to claim 34 wherein a red-reflecting photonic crystal, a green-reflecting photonic crystal and a blue-reflecting photonic crystal are stacked in the vertical direction on a substrate.

40. The screen according to claim 39 wherein the stacking cycles are not less than eight and not more than 15.

41. The screen according to claim 39 wherein said substrate is a transparent substrate having a layer for absorbing visible light on the back surface thereof.

42. The screen according to claim 39 wherein said substrate is a PET film.

43. The screen according to claim 39 wherein an irregularity or a film for improving the wettability is formed on the surface of said substrate.

44. The screen according to claim 39 wherein a light diffusion medium is provided on said photonic crystals.

45. The screen according to claim 44 wherein said light diffusing medium is a diffusion film.

46. The screen according to claim 44 wherein said light diffusing medium is a micro tens film.

47. The screen according to claim 44 wherein said light diffusing medium is a micro prism film.

48. The screen according to claim 34 wherein a red-reflecting photonic crystal, a green-reflecting photonic crystal and a blue-reflecting photonic crystal are sequentially stacked in the vertical direction on a substrate.

49. The screen according to claim 34 wherein a blue-reflecting photonic crystal, a green-reflecting photonic crystal and a red-reflecting photonic crystal are sequentially stacked in the vertical direction on a substrate.

50. The screen according to claim 34 wherein a red-reflecting photonic crystal, a green-reflecting photonic crystal and a blue-reflecting photonic crystal are arrayed in the lateral direction on a substrate.

51. The screen according to claim 50 wherein said red-reflecting photonic crystal, said green-reflecting photonic crystal and said blue-reflecting photonic crystal are stripe-shaped, rectangular-shaped or square-shaped, and said photonic crystals are arrayed in a predetermined alignment pattern on said substrate.

52. The screen according to claim 50 wherein the stacking cycles are not less than eight and not more than 15.

53. The screen according to claim 34 wherein said layer or bulk substrate for absorbing visible light underlies said particles.

54. The screen according to claim 34 wherein the size of each said photonic crystal in the direction parallel to said substrate is not larger than 22 cycles.

55. The screen according to claim 34 wherein said photonic crystals have in combination slanting surfaces inclined from the crystal axis thereof and a surface having an angle different from that of said slanting surfaces.

56. The screen according to claim 55 wherein the angle $\theta$ of said slanting surfaces is in the range of $70° \leq \theta \leq 90°$.

57. The screen according to claim 34 wherein said photonic crystals have a curved surface.

58. The screen according to claim 34 wherein the crystal axis of said photonic crystals inclines from the incident direction of light by an angle a in the range from $77.4° \leq \alpha \leq 90°$.

59. The screen according to claim 34 wherein said photonic crystals have undulations.

* * * * *